$$(P_p + P_{-3p})X + (P_0 + P_{-2p})Y + P_{-p} = \epsilon_1 \to 0$$
$$(P_0 + P_{-4p})X + (P_{-p} + P_{-3p})Y + P_{-2p} = \epsilon_2 \to 0$$
$$(P_{-p} + P_{-5p})X + (P_{-2p} + P_{-4p})Y + P_{-3p} = \epsilon_3 \to 0$$

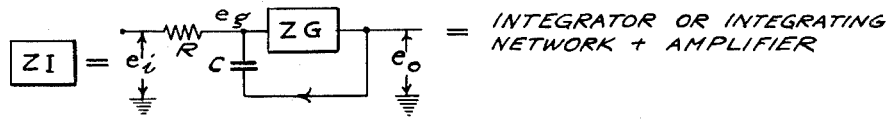 = INTEGRATOR OR INTEGRATING NETWORK + AMPLIFIER
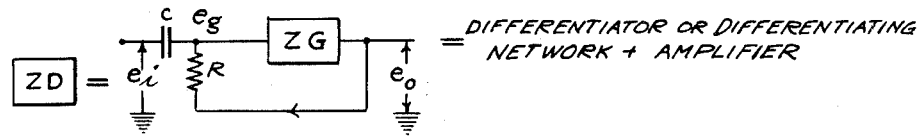 = DIFFERENTIATOR OR DIFFERENTIATING NETWORK + AMPLIFIER
[ZG] = AMPLIFIER
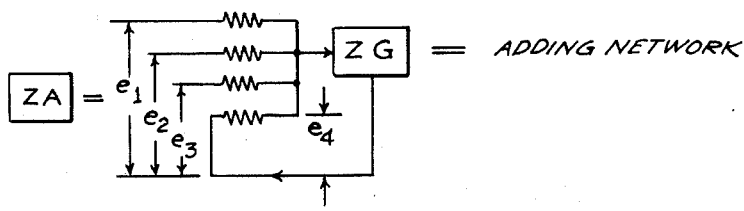 = ADDING NETWORK
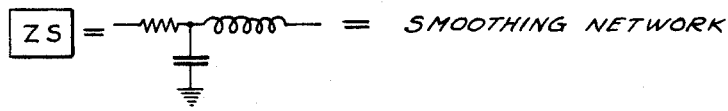 = SMOOTHING NETWORK
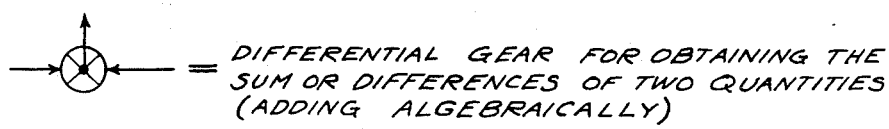 = DIFFERENTIAL GEAR FOR OBTAINING THE SUM OR DIFFERENCES OF TWO QUANTITIES (ADDING ALGEBRAICALLY)
 = MECHANICAL INTEGRATOR
SYMBOLS
Fig. 4.

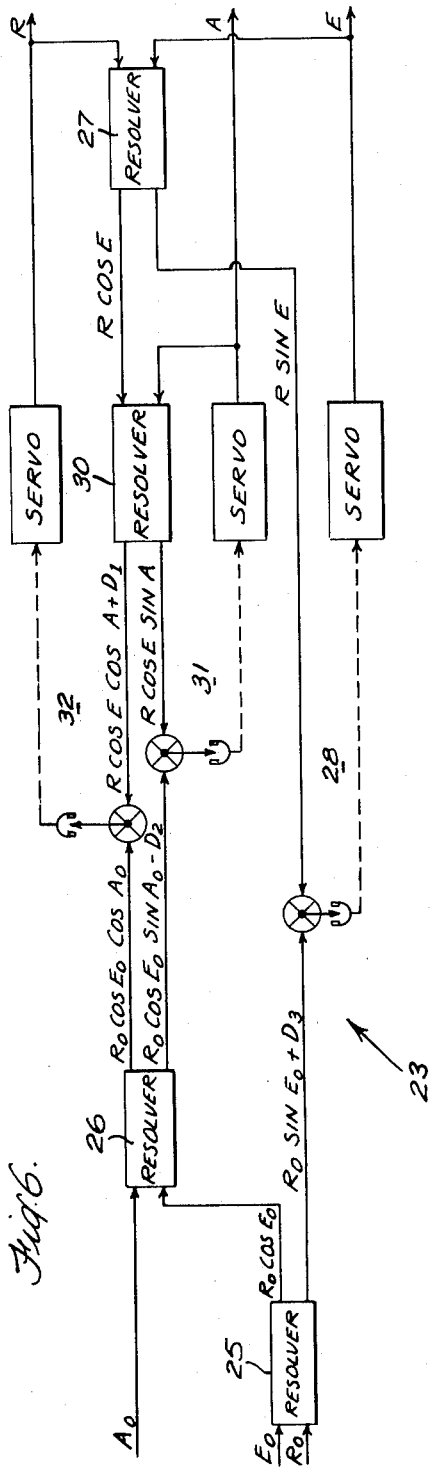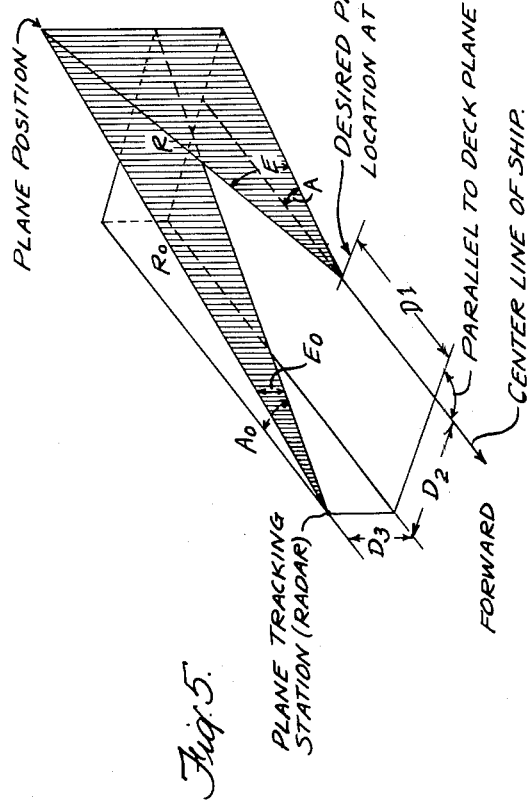

Inventors
WILLIAM H. NEWELL
EDWARD G. BURGESS
NORMAN J. ZABB
STAMATES I. FRANGOULIS
By
Attorney Inventors
WILLIAM H. NEWELL
EDWARD G. BURGESS
NORMAN J. ZABB
STAMATES I. FRANGOULIS Attorney

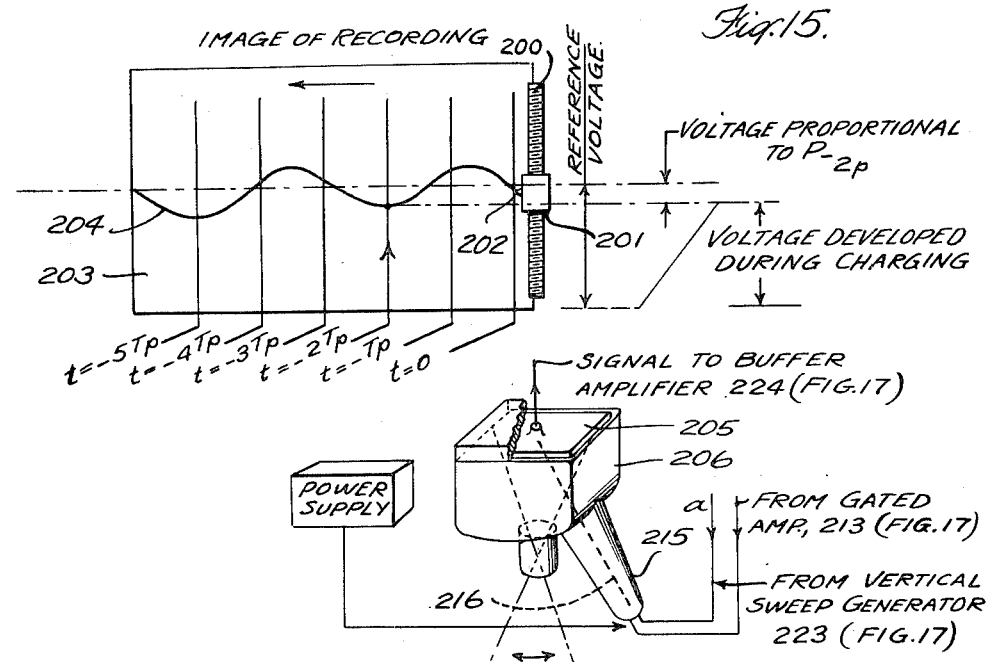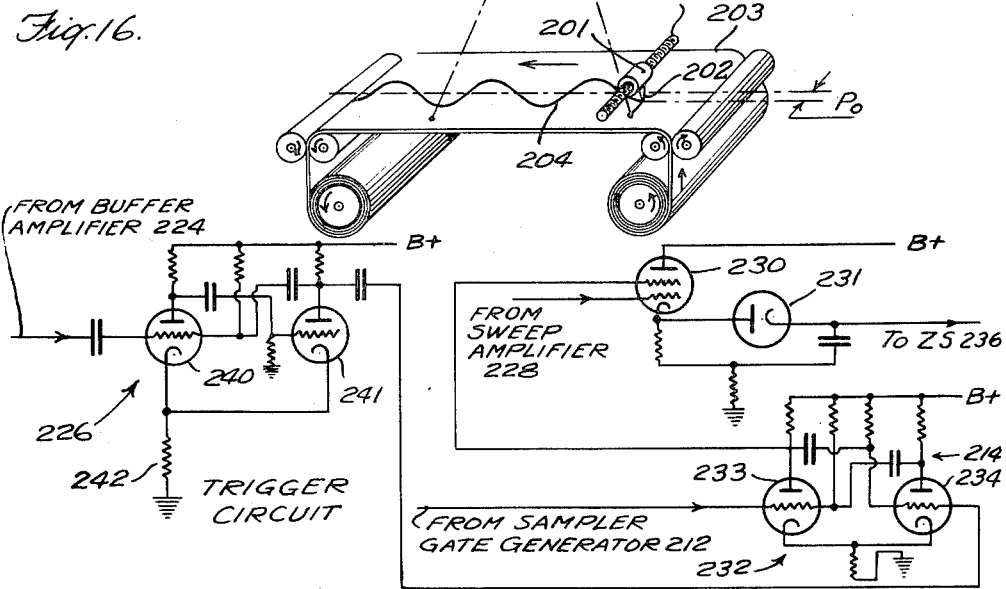

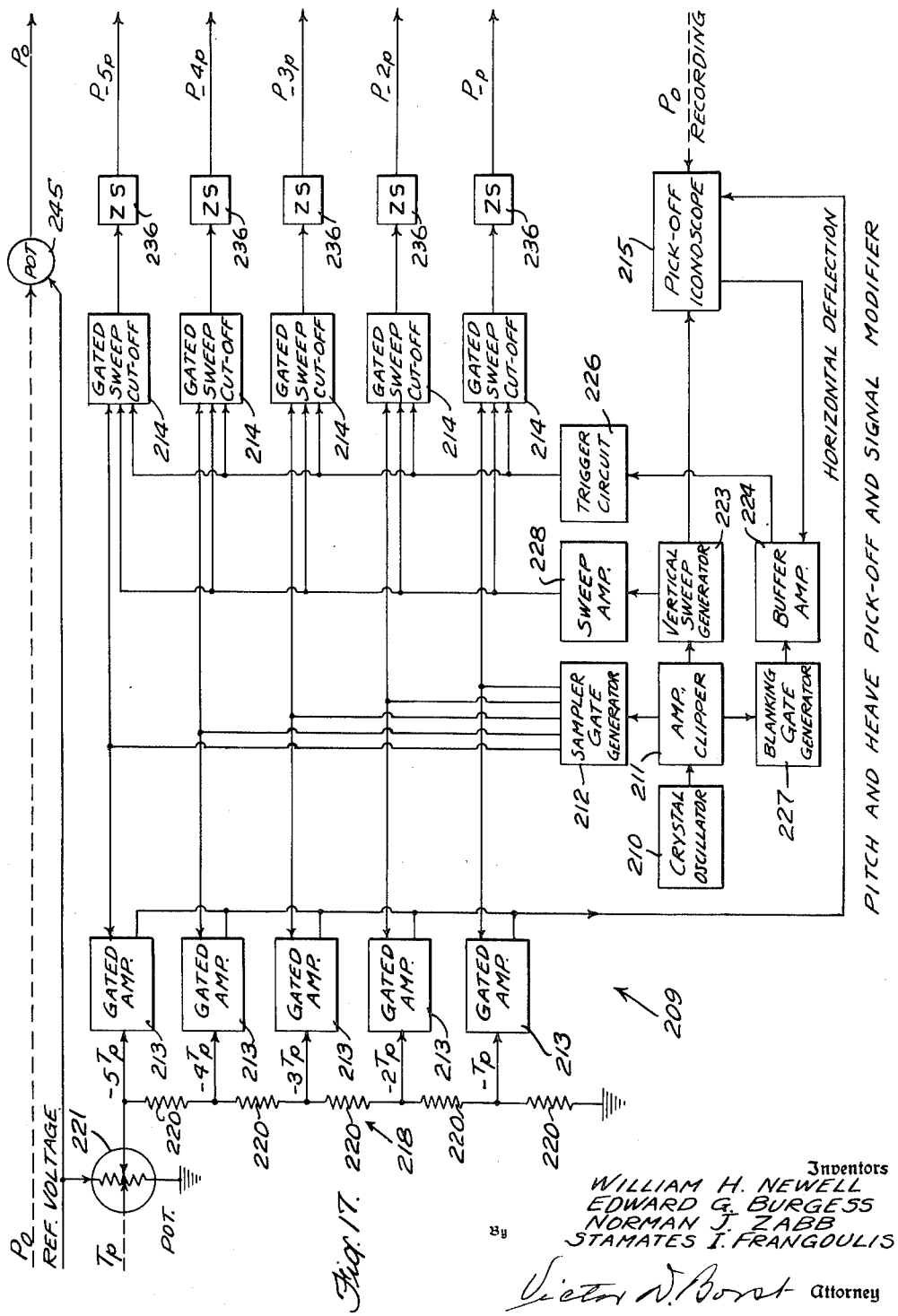

Aug. 15, 1961
W. H. NEWELL ET AL  2,996,706
APPARATUS FOR COMPUTING AND PREDICTING VARYING CONDITIONS FOR AIRCRAFT GUIDANCE IN LANDING ON FLOATING DECKS
Filed May 29, 1953  33 Sheets-Sheet 18

INVENTORS
WILLIAM H. NEWELL
EDWARD G. BURGESS
NORMAN J. ZABB
STAMATES I. FRANGOULIS

BY
ATTORNEY

OSCILLATING PREDICTION MECHANISM (MECHANICAL)

Fig. 29.

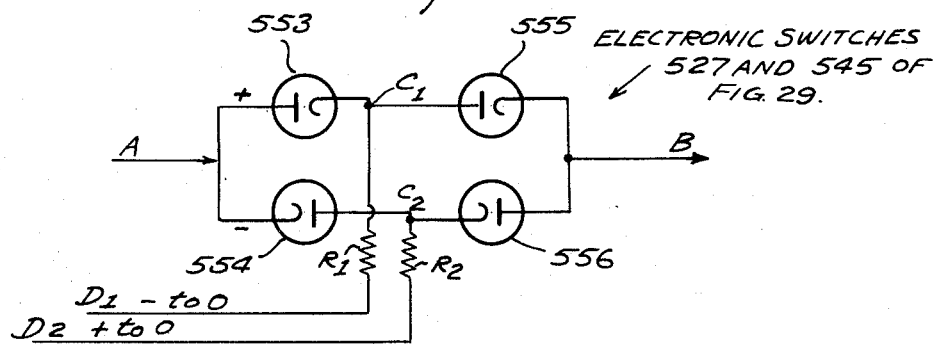
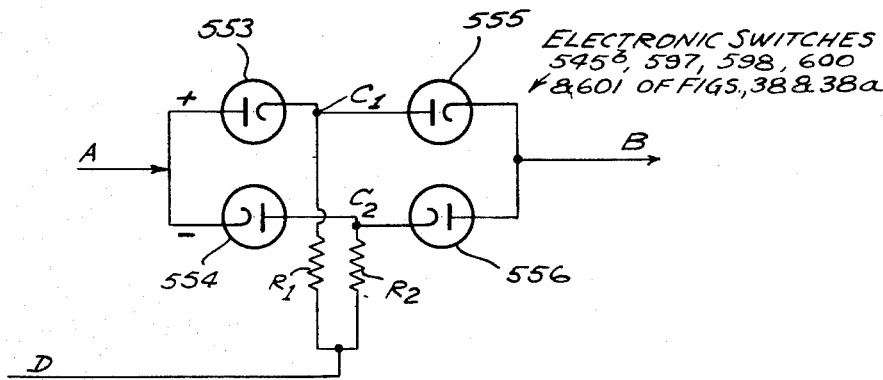

TRIGGER CIRCUIT.

Aug. 15, 1961 W. H. NEWELL ET AL 2,996,706
APPARATUS FOR COMPUTING AND PREDICTING VARYING CONDITIONS
FOR AIRCRAFT GUIDANCE IN LANDING ON FLOATING DECKS
Filed May 29, 1953 33 Sheets-Sheet 25

INVENTORS
WILLIAM H. NEWELL
EDWARD G. BURGESS
NORMAN J. ZABB
STAMATES T. FRANGOULIS
BY
ATTORNEY

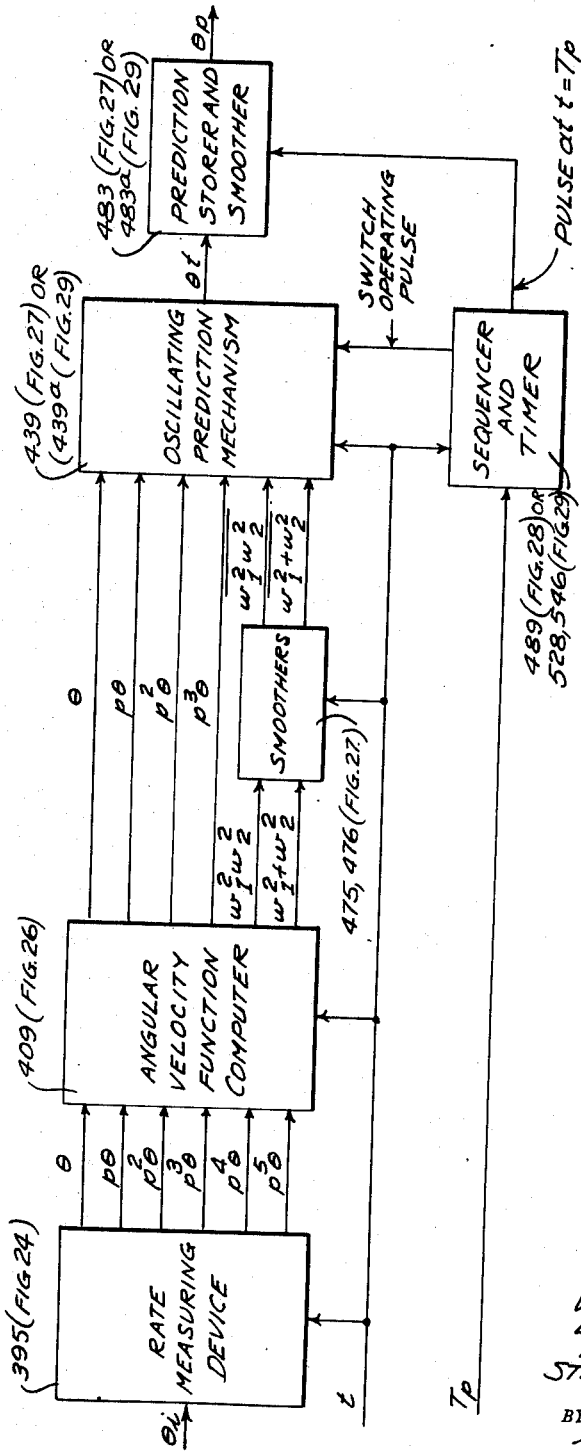

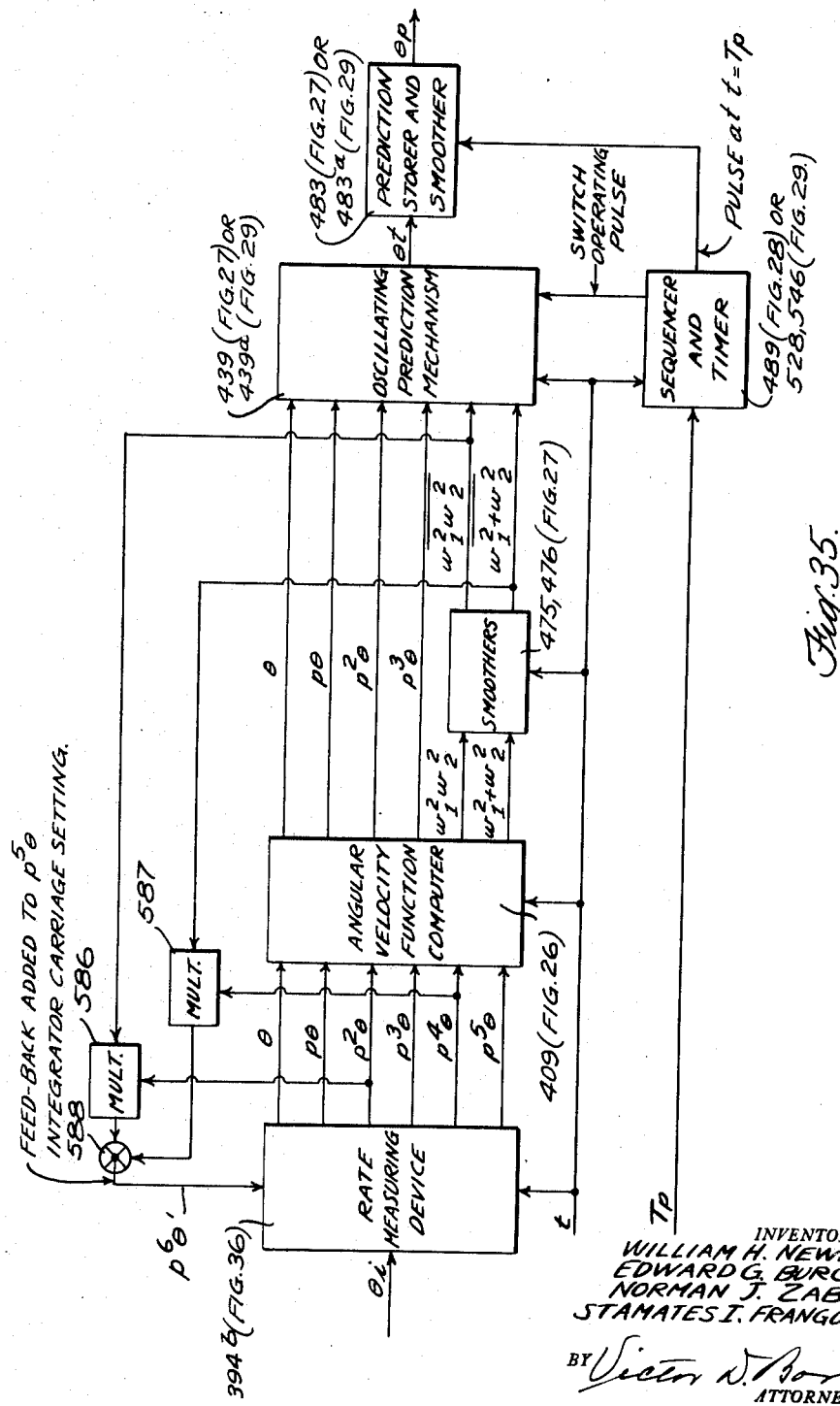

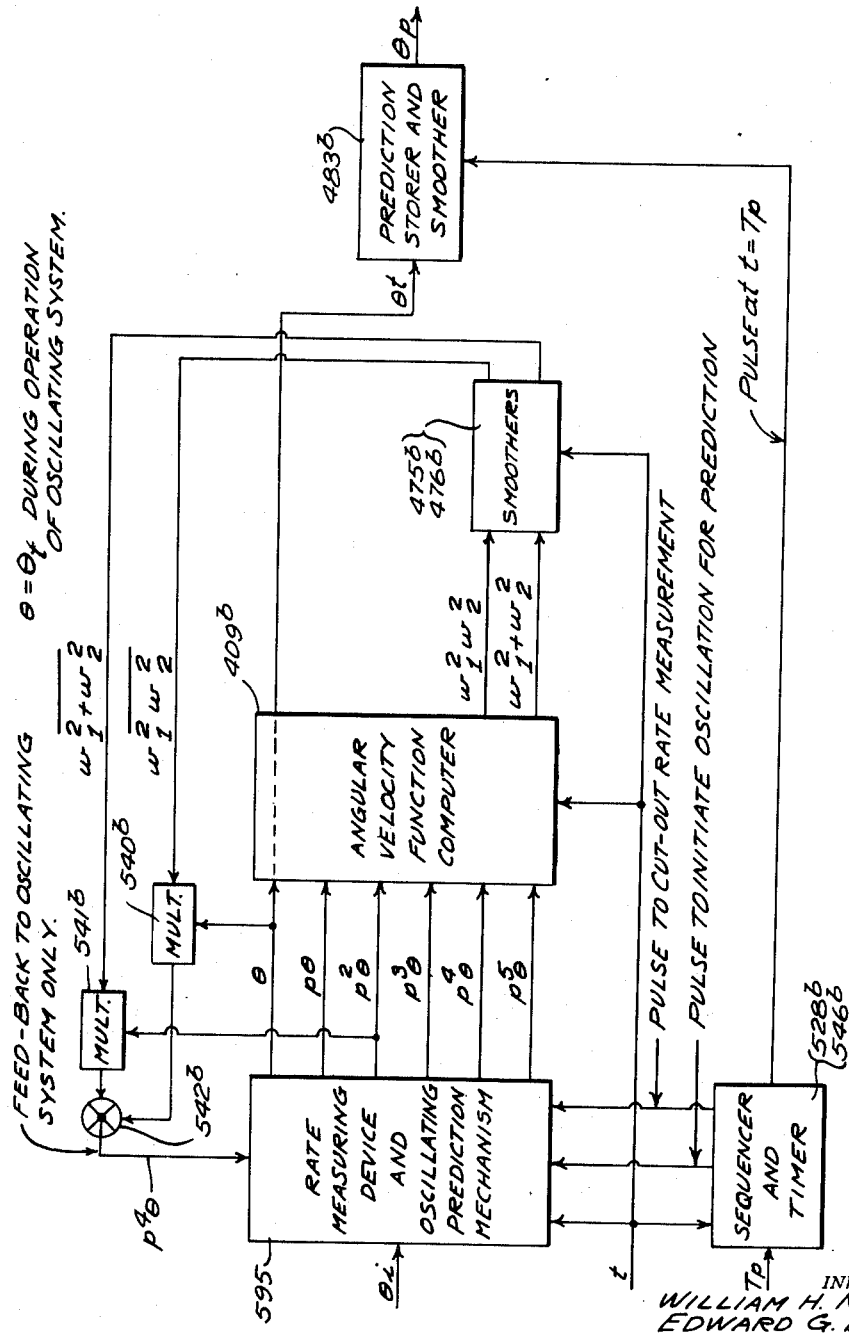

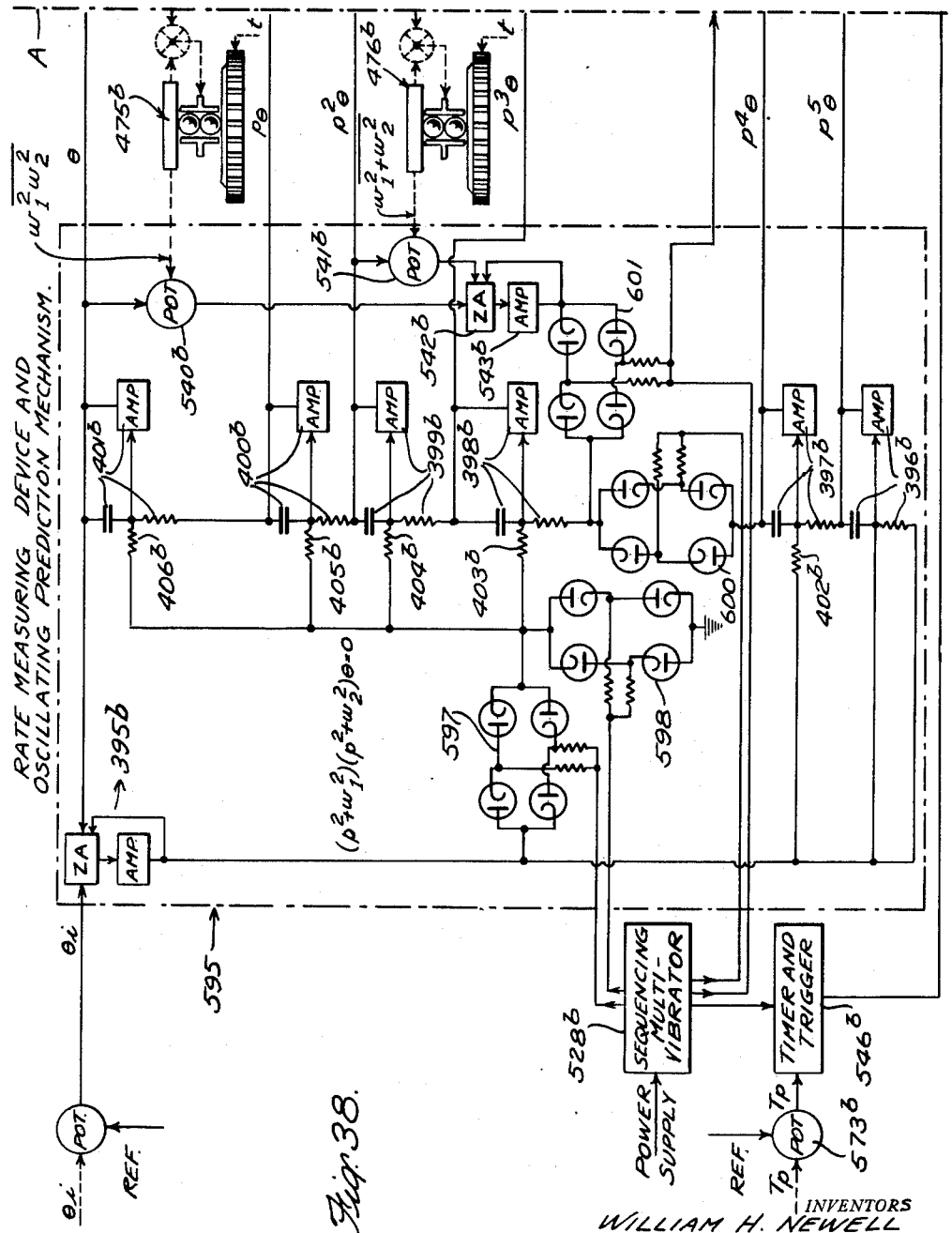

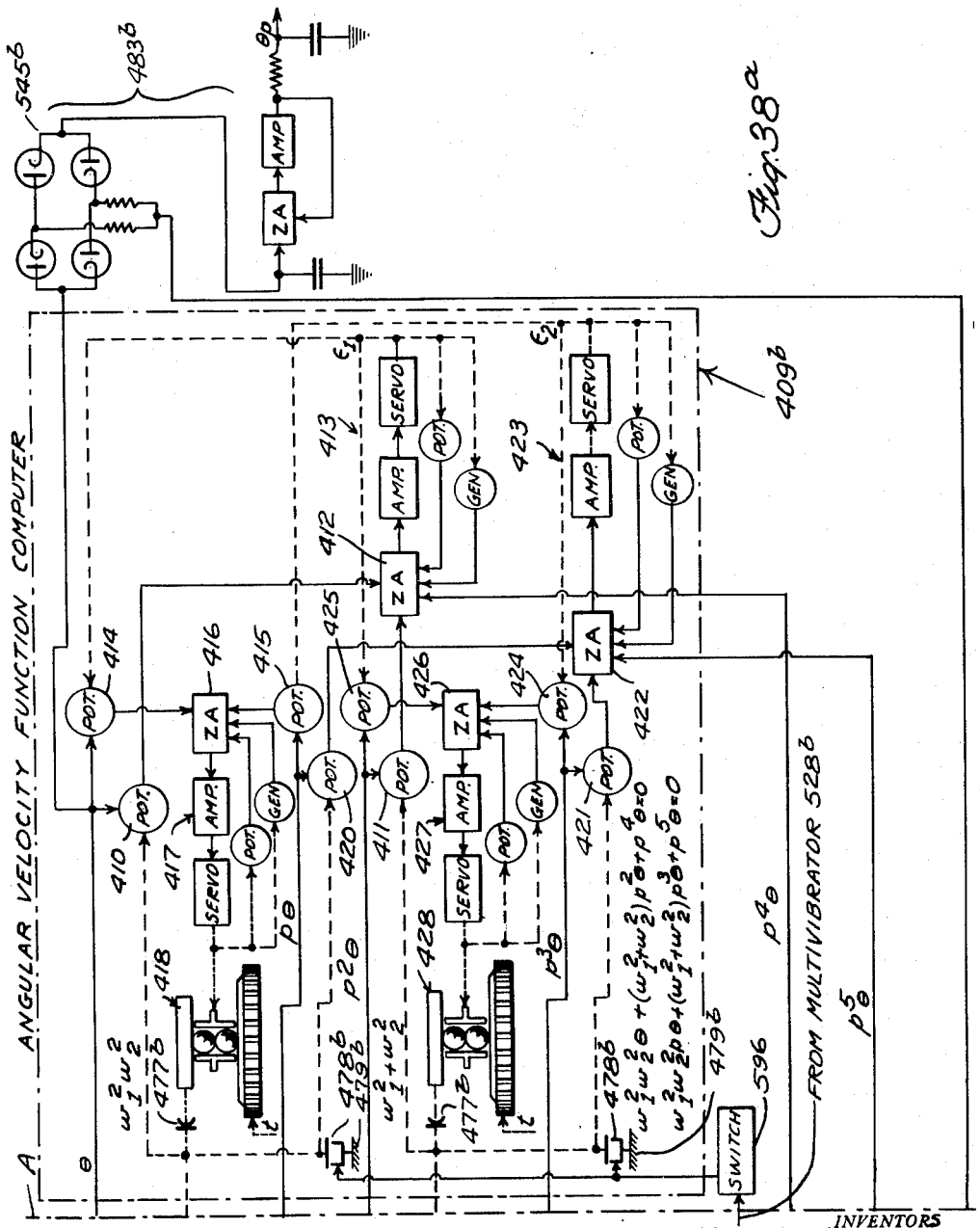

OSCILLATING PREDICTION CIRCUIT
IN SYSTEM OF FIGURES 38 AND 38ª

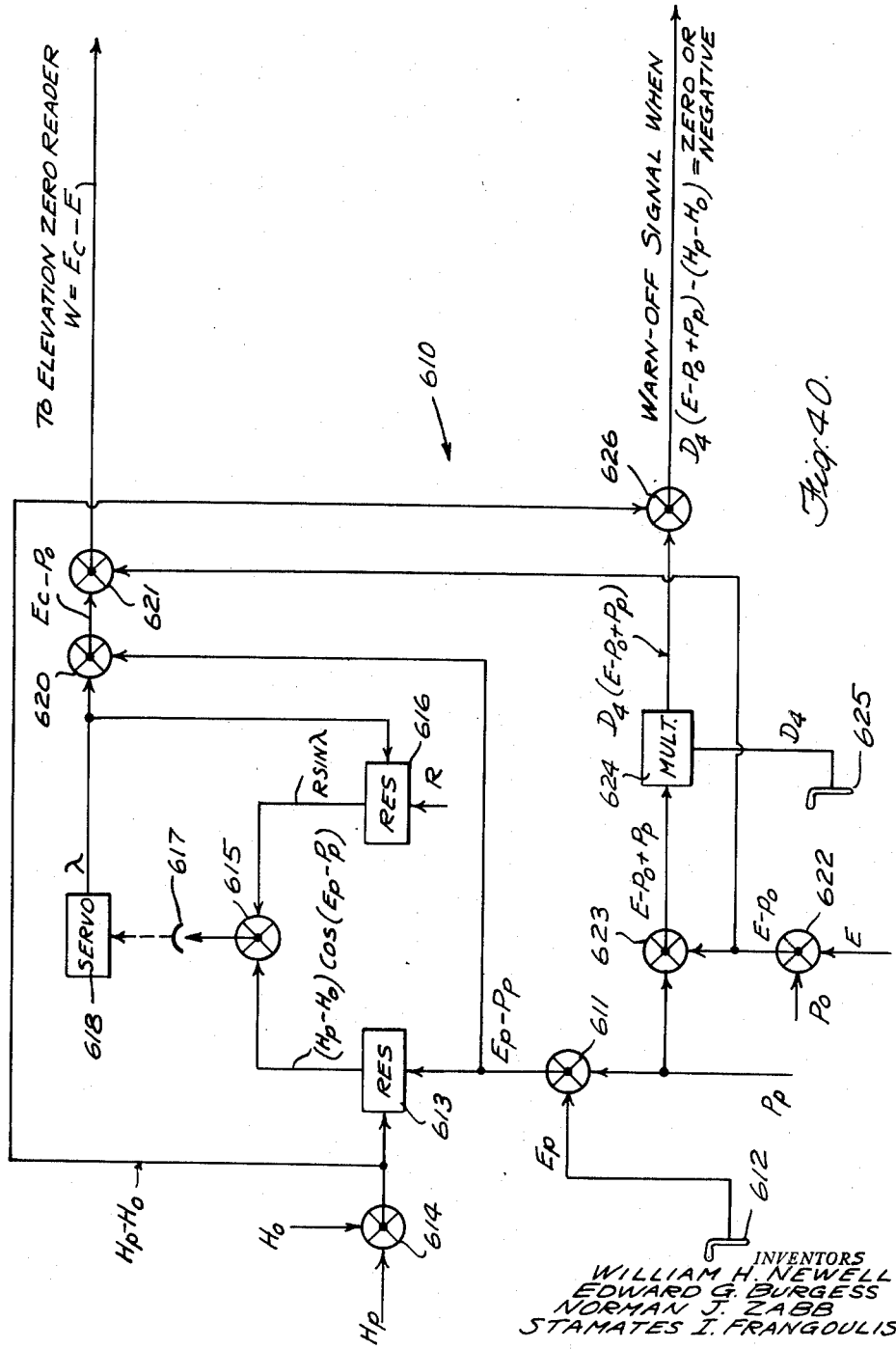

United States Patent Office 2,996,706
Patented Aug. 15, 1961

1

2,996,706
APPARATUS FOR COMPUTING AND PREDICTING VARYING CONDITIONS FOR AIRCRAFT GUIDANCE IN LANDING ON FLOATING DECKS
William H. Newell, Mount Vernon, Edward G. Burgess, Jr., Kew Gardens, Norman J. Zabb, Brooklyn, and Stamates I. Frangoulis, Flushing, N.Y., assignors to Sperry Rand Corporation, a corporation of Delaware
Filed May 29, 1953, Ser. No. 358,324
22 Claims. (Cl. 343—7)

The present invention relates generally to the art of computing and predicting varying conditions and of guiding movable objects in accordance with predictions computed and although it has a wide range of utility, the invention is particularly useful in connection with the control of aircraft and specifically airplanes, as they approach a floating deck or carrier for landing.

In some of its more specific aspects, the invention relates to a carrier controlled approach system dealing with the control and guidance of airplanes successively as they approach the carrier for the landing and recovery thereof. At the present time, the carrier controlled approach system is executed in four separate stages, namely Stage I, Pick-up Control; and Stage II, Marshall Control; Stage III, Traffic Control; and Stage IV, Final Control. The present invention deals with the last stage, Final Control just before landing.

It is assumed in accordance with the present invention that all operations and maneuvering in Stages I, II and III have been satisfactorily carried out and that the airplane is ready to land. Final Approach Control begins to operate when the approaching airplane enters a predetermined control zone with respect to the ship and has been signalled to make its final approach for landing.

One object of the present invention is to provide novel systems for determining and transmitting to an airplane, proper flight instructions by which it is accurately guided in its final approach to the deck of the carrier in a manner to effect safe landing under the worst possible weather and sea conditions.

Another object of the present invention is to provide novel systems for detecting adverse flight conditions which would prevent such a landing and for transmitting warn-off signals to the airplane indicating these conditions, so that it could correct them.

A further object is to provide a novel method and device by which the time of landing of a plane on a floating deck can be predicted, assuming that the plane follows a predetermined space curve.

Another object is to provide a novel method and device by which the limits of the rate of turn of a plane to set it on its proper course for safe landing on a floating deck at a predicted time of landing may be predetermined.

Still another object is to provide a novel method and device by which the heave of a floating deck may be measured.

A further object is to provide novel methods and devices by which the characteristics of a fluctuating system may be computed and predicted continuously for successive future periods, even though the form of the system may be continuously varying and the variations in the system may not be following continuously any predetermined mathematical pattern or equation.

Still another object is to provide novel methods and devices by which the future pitch angle of a floating platform such as the flight deck of a carrier at the expected instant of landing can be computed and predicted.

A still further object is to provide novel methods and devices by which the future heave or flight deck level of a floating platform such as the flight deck of a carrier at the expected instant of landing can be computed and predicted.

Another object is to provide a new and improved electronic switch operable in connection with some of the devices and systems constituting the subject-matter of the present invention.

In carrying out certain features of the present invention, as soon as the plane reaches the zone of Stage IV, the final approach control system becomes operative. At about that time, the approaching plane is located and tracked by radar from the carrier. The tracking radar supplies continuous information of airplane location with respect to the carrier and particularly the range of plane from the observation origin of the radar antenna, the bearing angle of the plane with respect to the aft-centerline of the carrier as observed from the radar antenna and the elevational angle of the plane from the observation origin of the radar antenna. From this radar information and from other data obtainable from other sources, such as the plane's true air speed, wind speed relative to the carrier, wind direction relative to the carrier, the glide approach elevational angle of the plane with respect to predicted deck position at the expected instant of landing, the present pitch angle of the carrier deck and the present deck height, the system of the present invention computes the period required by the plane to fly from its present position to its position at touchdown on the deck (the position where the plane can begin to land on the deck), the predicted deck tilt at the end of this period and the predicted deck height at the end of this period. From the computed information, the necessary signals are sent to the plane to assure his safe landing on the deck in the touchdown area. The system is intended to be operable under the worst possible conditions of weather and sea. This imples near zero visibility in conjunction with very rough and confused sea conditions. The condition of zero visibility dictates the principal requirements of the system.

Various other objects, features and advantages of the present invention are apparent from the following particular description and from an inspection of the accompanying drawings, in which—

FIGURE 2 is a geometric elevation diagram showing the plane in conjunction with the present position and the correct position it should have with respect to the predicted position of the deck;

FIGURE 3 is a diagram of the complete Final Approach Control System embodying the present invention;

FIGURE 4 is a diagram of standard operational units employed in the different parts of the Final Approach Control System with the designating symbols therefor;

FIGURE 5 illustrates the problem posed by the offsetting of the touchdown or reference point on the carrier with respect to the tracking radar antenna and the geometrical relationship by which the equations of parallax corrections for the spherical positional coordinates of the plane from the observation origin of the radar antenna to the observation origin of the touchdown point may be derived;

FIGURE 6 shows diagrammatically the parallax corrector by which the equations derived from the geometrical diagram of FIGURE 5 may be mechanized and solved, the solid lines indicating mechanical movement, such as shaft rotations and the dotted lines indicating electrical impulses or signals;

Figure 13:
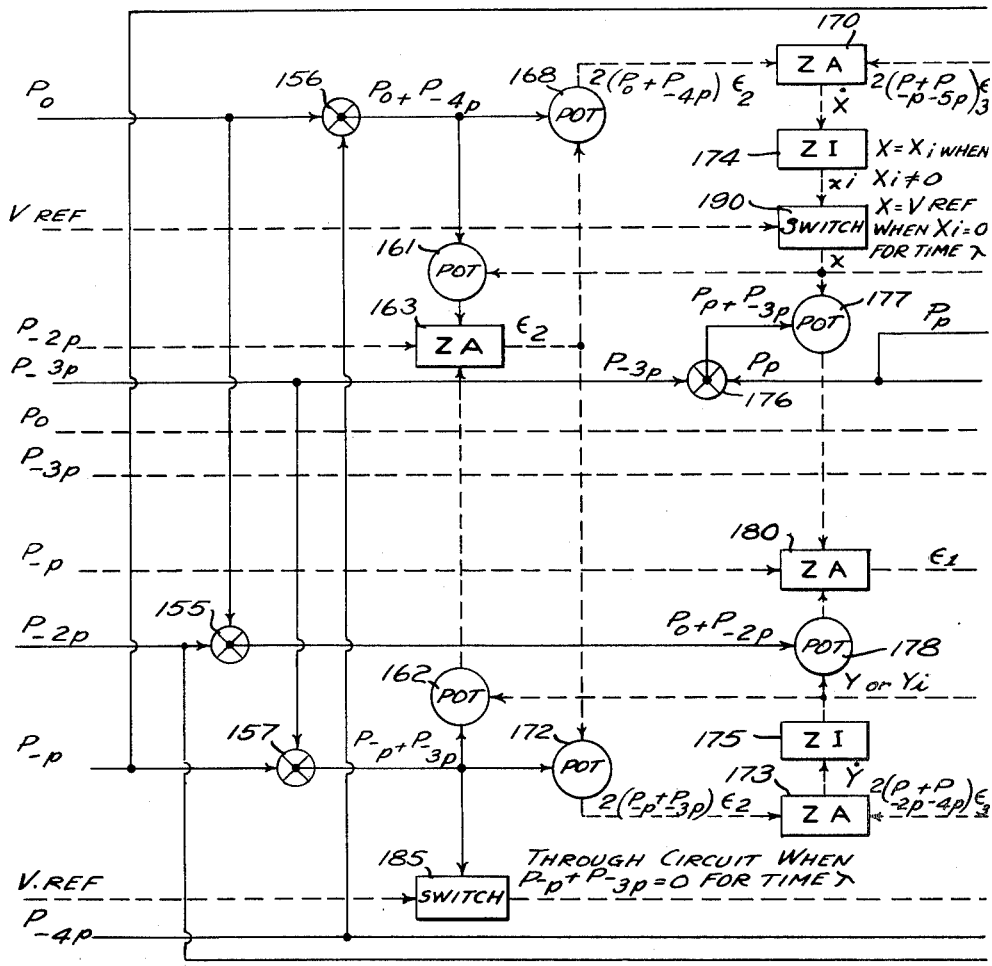
Figure 13A:
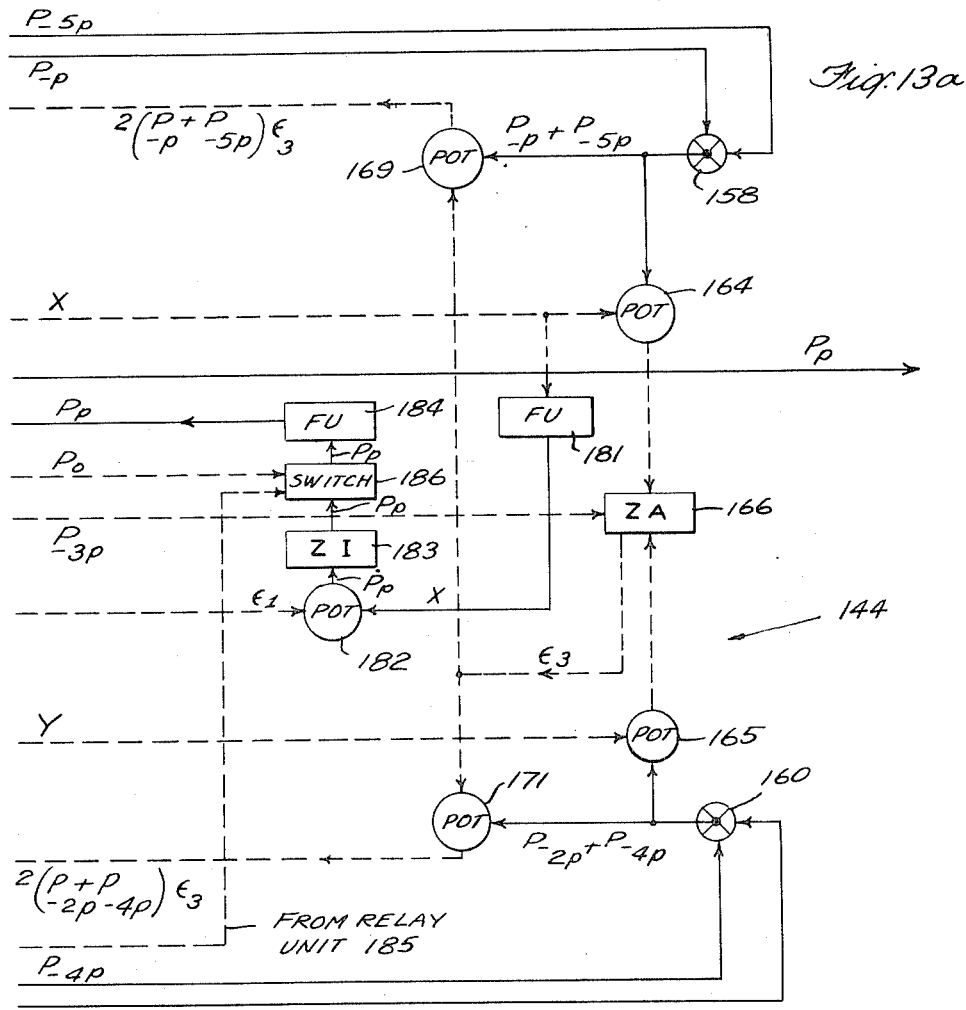
Figure 14:
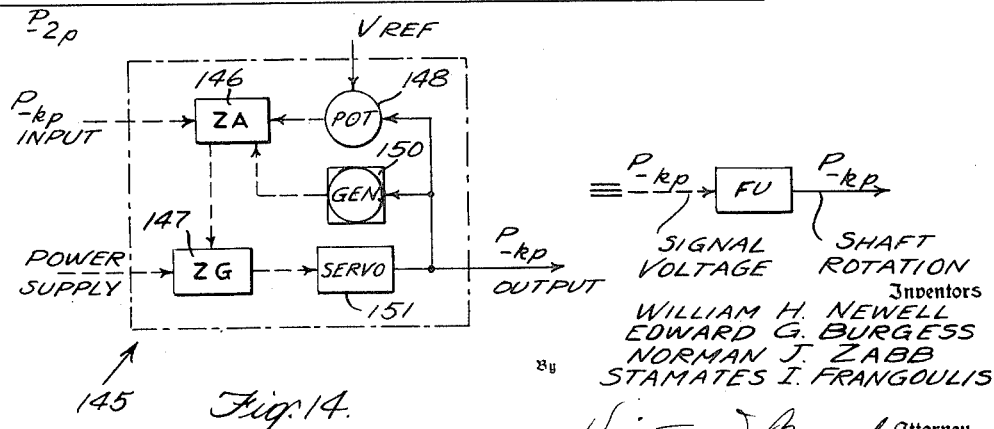
Figure 19:
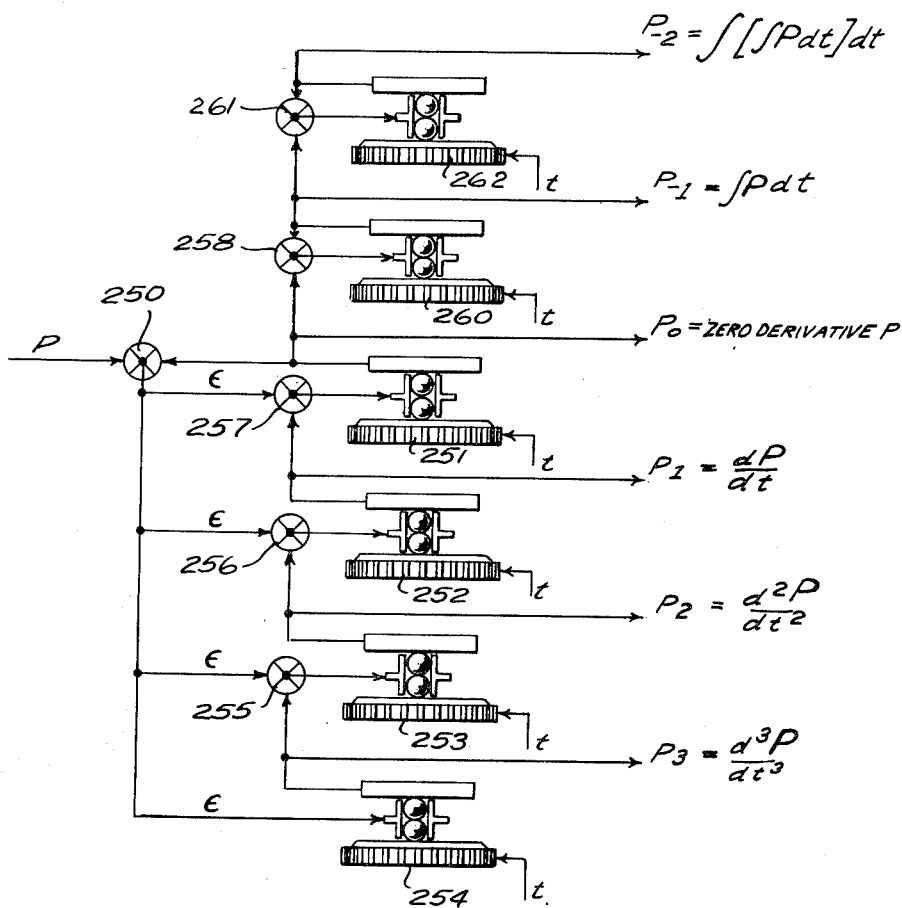
Figure 20:
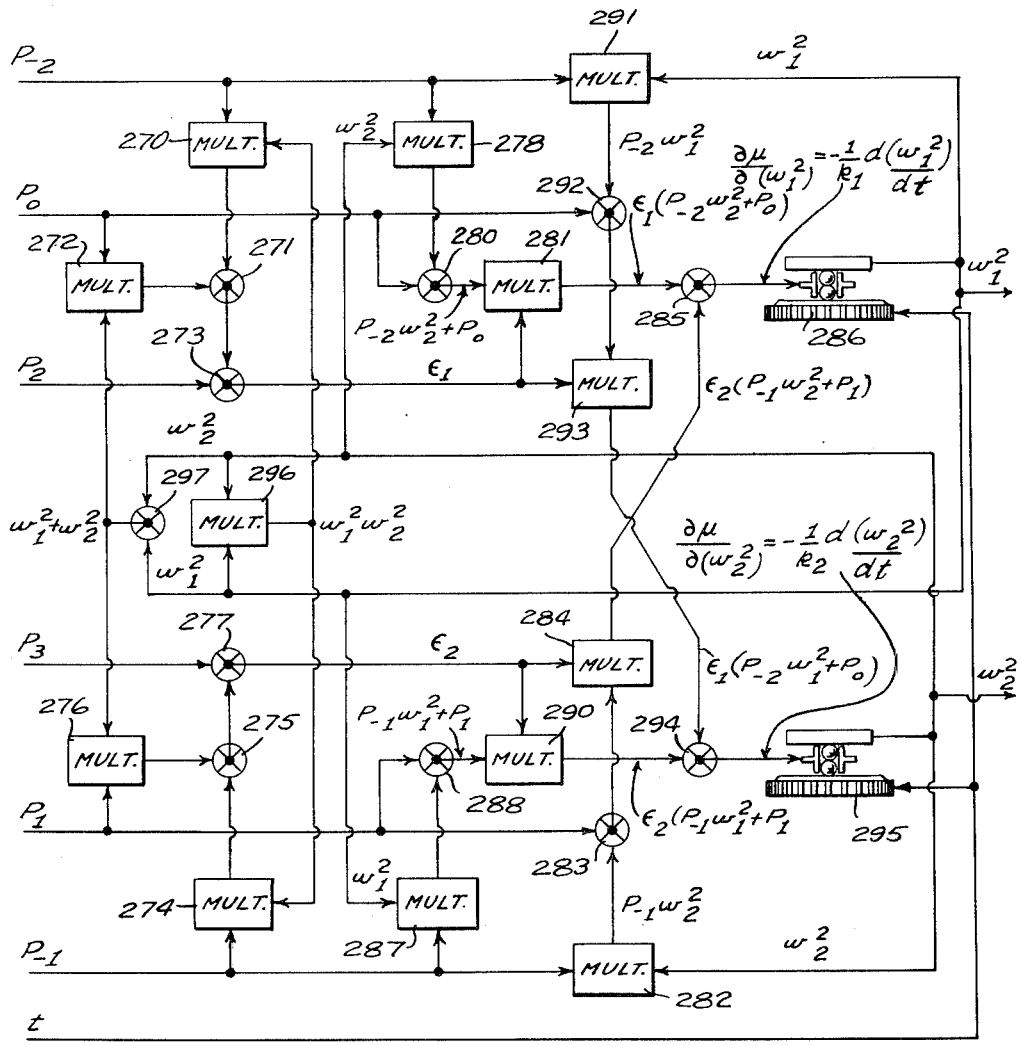
Figure 21:
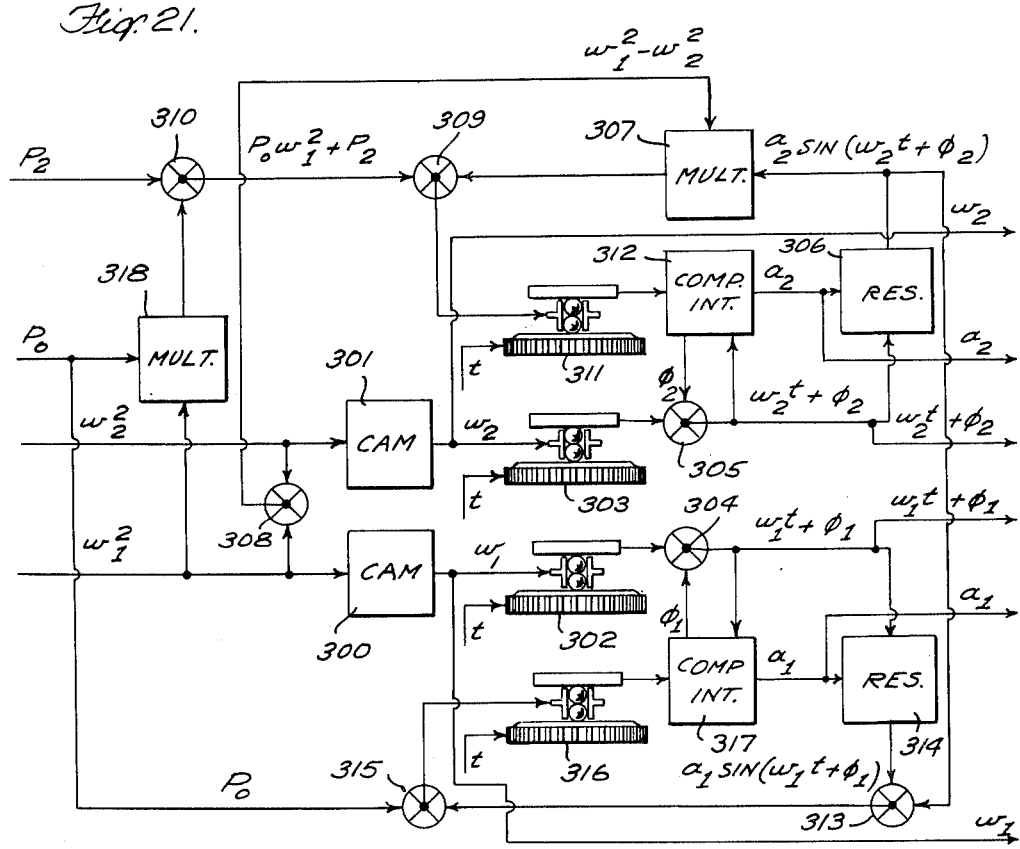
Figure 22:
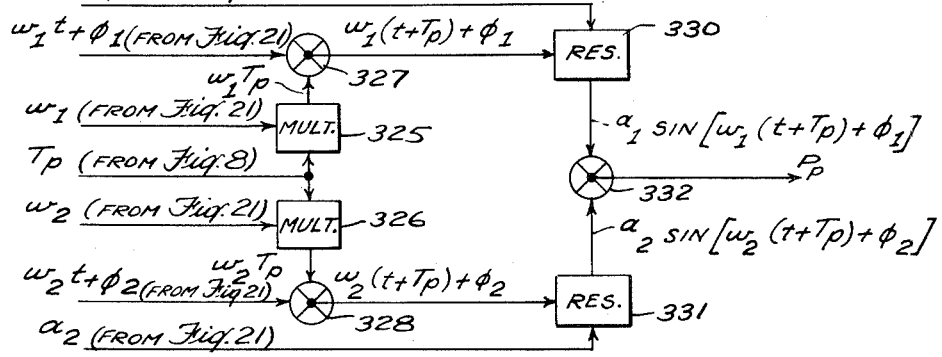
Figure 23:
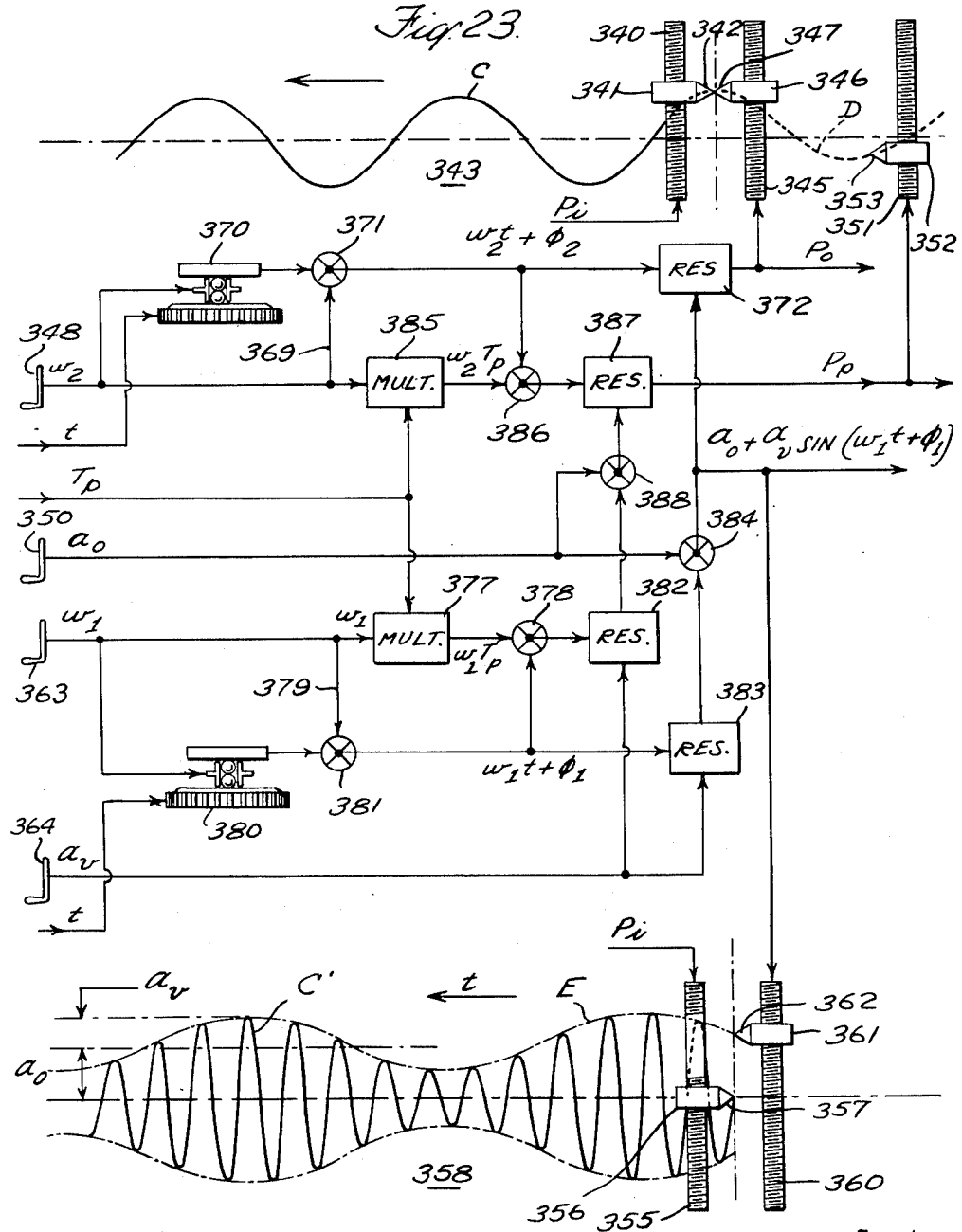
Figure 24:
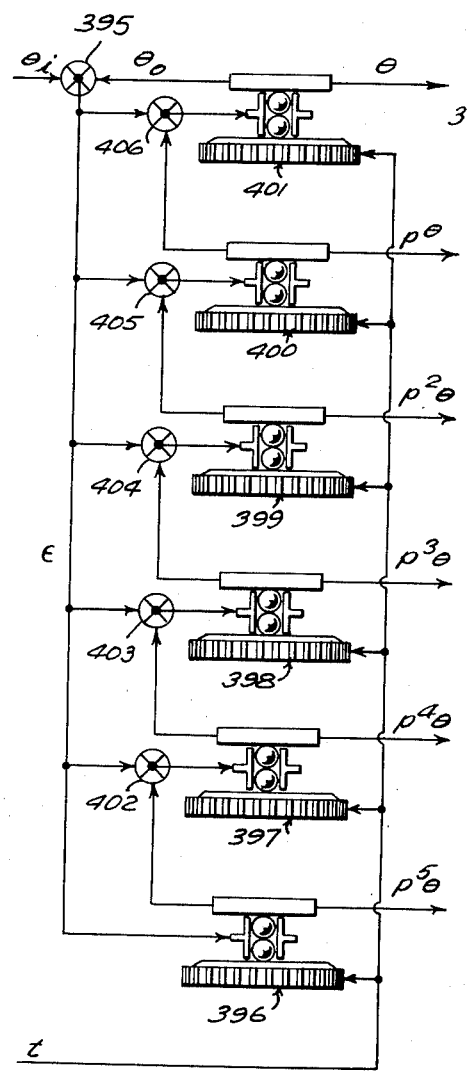
Figure 25:
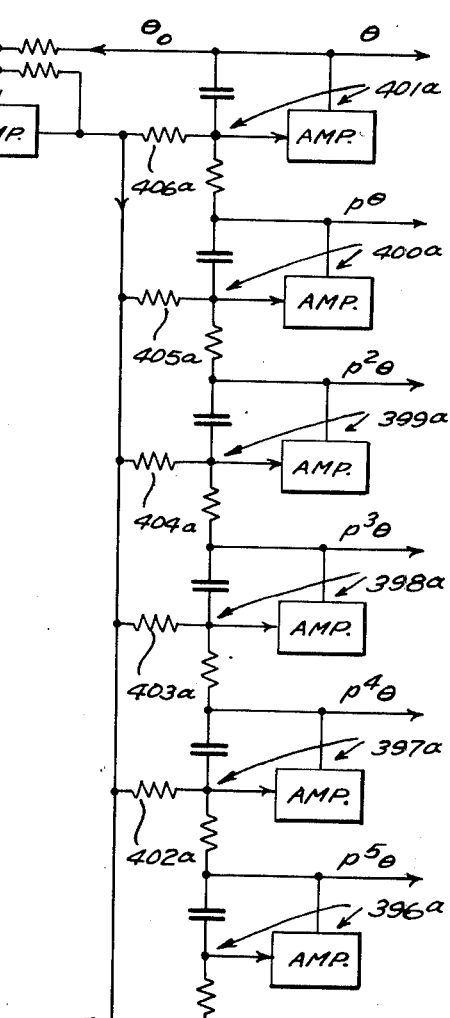
Figure 26:
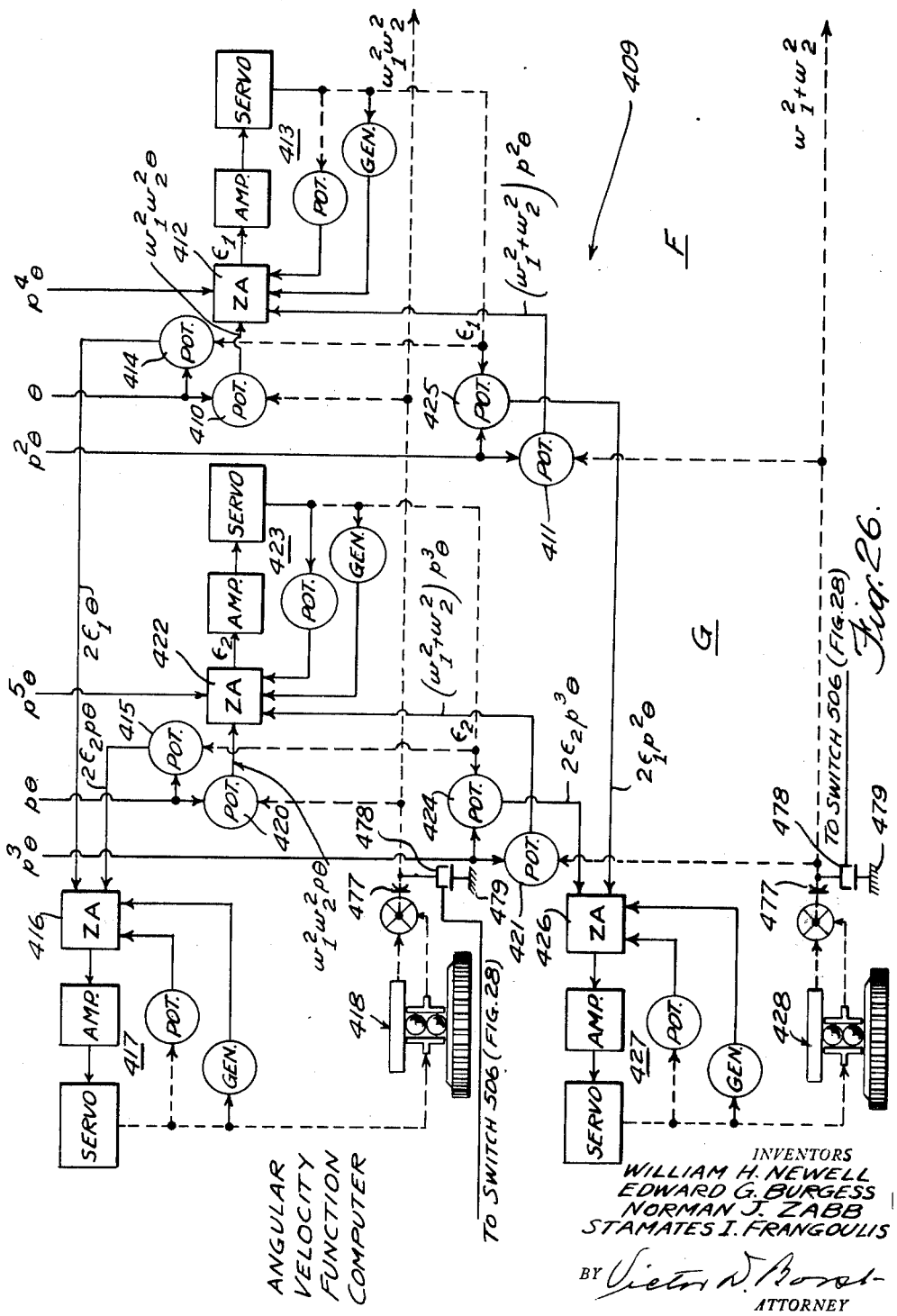
Figure 27:
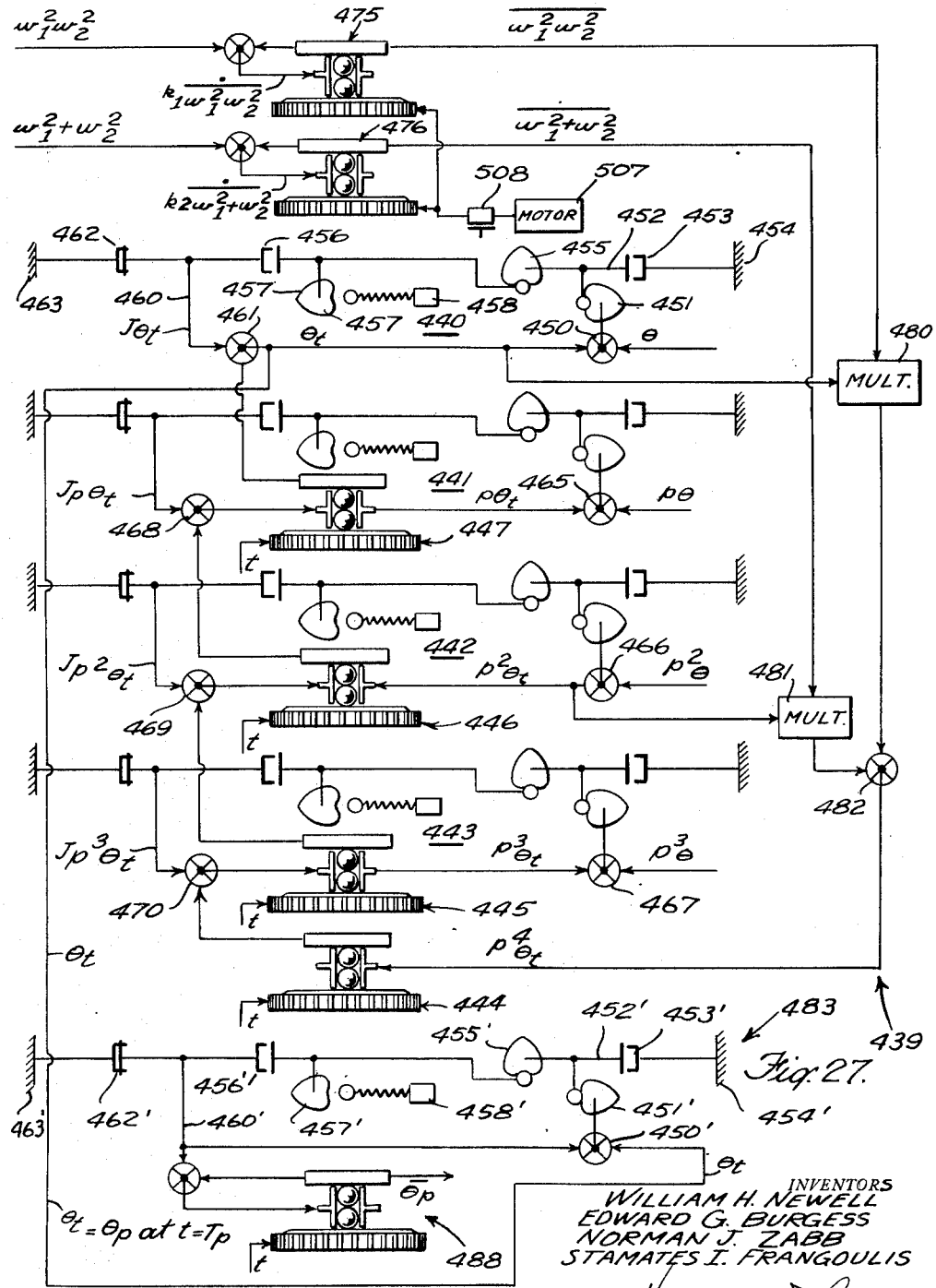
Figure 28:
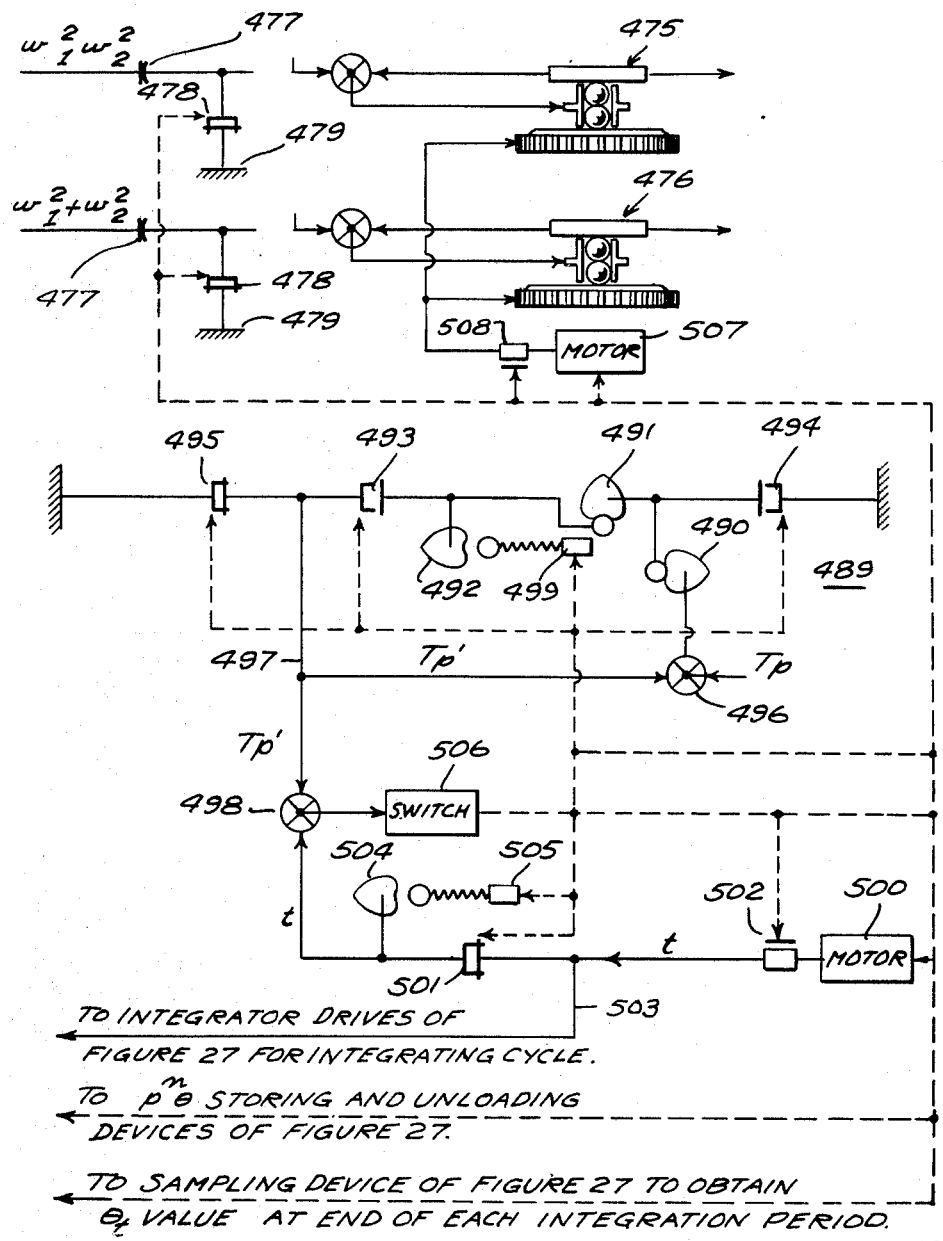

FIGURES 13 and 13a conjointly show diagrammatically another form of pitch prediction computer but employing past values of pitch angle as inputs, the solid lines indicating mechanical movements and the dotted lines indicating electrical signals;

FIGURE 14 is a diagrammatic view of a follow-up unit employed to convert the signal voltages representing past values of pitch angle into shaft rotations proportional to these voltages, for use as inputs into the mechanism of FIGURES 13 and 13a, the electrical signals being indicated in dotted lines and the mechanical movements in full lines;

FIGURE 15 is a diagram of the pitch angle curve recorded in accordance with the operation of a stable element and employed for obtaining past values of pitch angles and shows in conjunction therewith the output voltage for one pitch angle value obtained by a pitch pick-off and signal modifier shown in FIGURES 16 and 17;

FIGURE 16 shows diagrammatically the television pick-off device employed in conjunction with the pitch pick-off and signal modifier of FIGURE 17;

FIGURE 17 is diagrammatically the pitch pick-off and signal modifier for obtaining past values of pitch angles in the form of electric signals, the full lines representing electric signals, the dotted lines mechanical movement such as shaft rotations;

FIGURE 18 is a diagram of the trigger circuit and the gated sweep cut-off employed as part of the system of FIGURE 17;

FIGURE 19 is a diagram of a mechanism for obtaining the pitch angle integrals and derivatives for use in connection with another form of pitch prediction system embodying the present invention, the full lines in said diagram indicating mechanical movements such as shaft rotations;

FIGURE 20 is a diagram of an angular velocity solver for obtaining the values of angular velocities of the sine waves constituting components of the assumed motion of pitch for use in connection with a pitch prediction system employing integrals and derivatives of the pitch angle, the full lines in said diagram representing mechanical movements such as shaft rotations;

FIGURE 21 is a diagram of a sine wave component synthesizer for obtaining the values of amplitudes and phase angles of the sine waves constituting components of the assumed motion of pitch for use in connection with a pitch prediction computer employing integrals and derivatives of the pitch angle, the full lines in said diagram representing mechanical movements such as shaft rotation;

FIGURE 22 is a diagram of a pitch prediction computer for obtaining the predicted pitch angle from the values derived from the mechanisms of FIGURES 19–21, the full lines in said diagram representing mechanical movements such as shaft rotations;

FIGURE 23 is a diagram of another form of pitch prediction computer employing manual tracking means, the full lines in the diagram indicating mechanical movements such as shaft rotations;

FIGURE 24 is a diagram of a rate measuring device of the mechanical type to be used as part of an oscillating system for determining in accordance with the more specific aspects of the invention, the predicted pitch angle and predicted deck level (heave) of a floating deck at a predicted future instant, the solid lines in said diagram indicating mechanical movements such as shaft rotations;

FIGURE 25 is a diagram of a rate measuring device of the electrical type to be used as part of the oscillating system, the solid lines in said diagram representing electric signals and specifically voltages proportional to the values of the quantities indicated on said diagram;

FIGURE 26 is a diagram of an angular velocity function computer to be used as part of the oscillating system, the solid lines in said diagram indicating electric signals and specifically voltages and the dotted lines indicating shaft displacements;

FIGURE 27 is a diagram of a mechanical oscillating prediction mechanism adapted to employ the values obtained from the rate measuring device of FIGURE 24 and the angular velocity function computer of FIGURE 26, to determine in accordance with the more specific aspects of the invention, the predicted pitch angle and predicted deck level (heave) of a floating deck at a predicted future instant, the solid lines in said diagram indicating mechanical displacements and more specifically shaft rotations;

FIGURE 28 is a diagram of a timing and control device for the oscillating prediction mechanism of FIGURE 27, by which the different cycles and phases of operation are initiated and terminated at the proper time, the solid lines in said diagram indicating mechanical movements and the dotted lines electric impulses.

Figure 29:
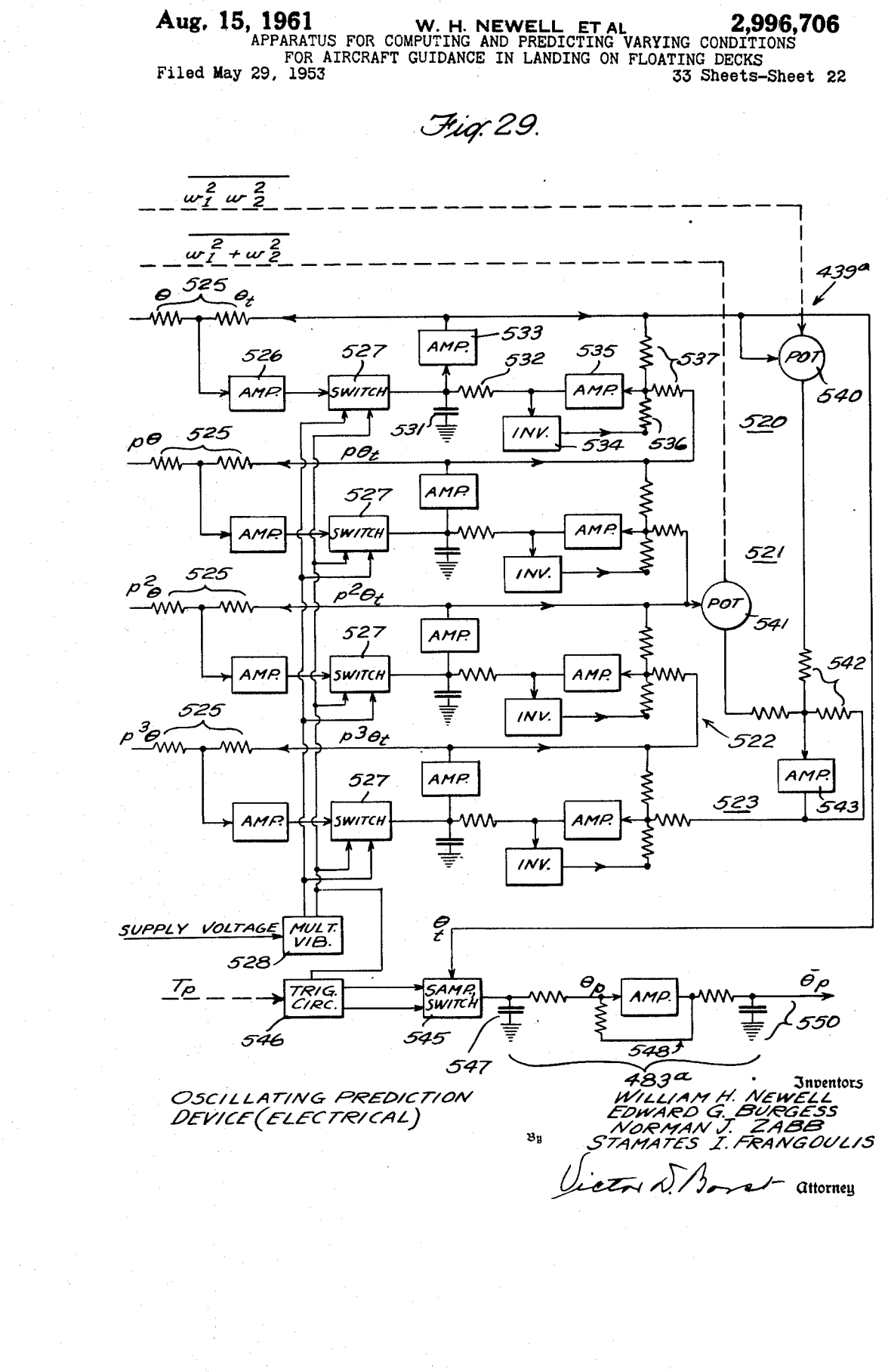
Figure 32:
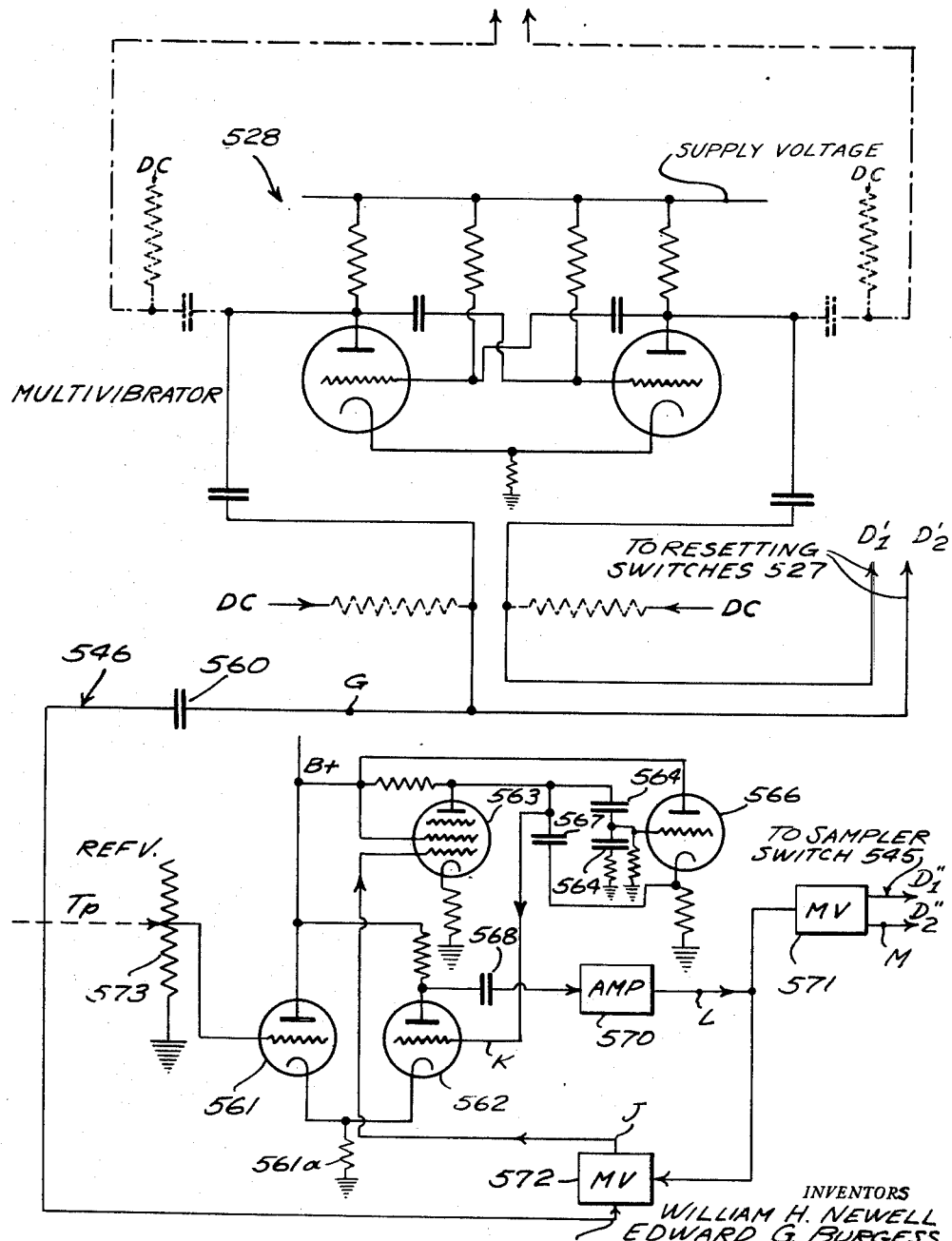
Figure 36:
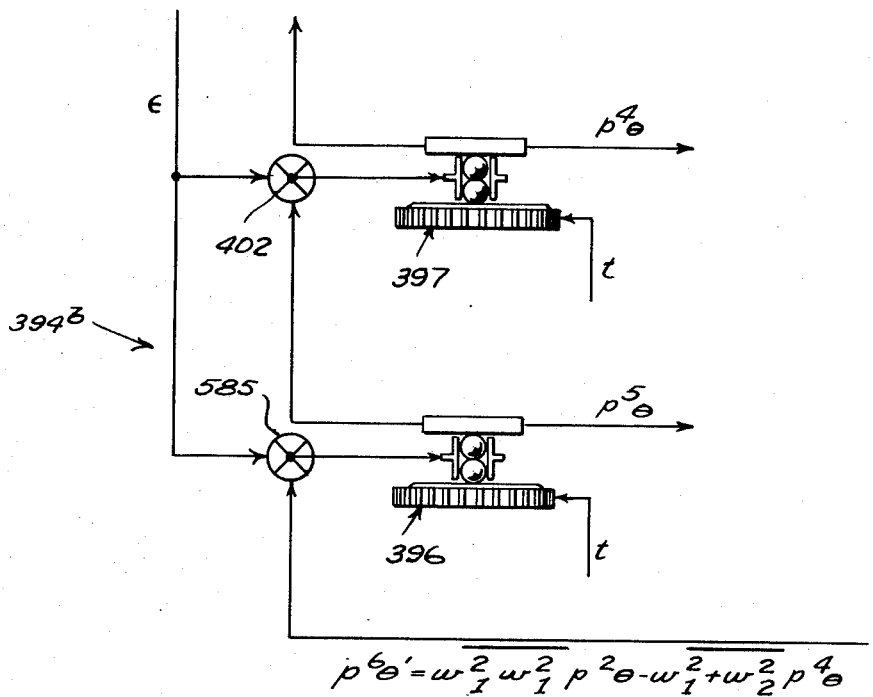
Figure 39:
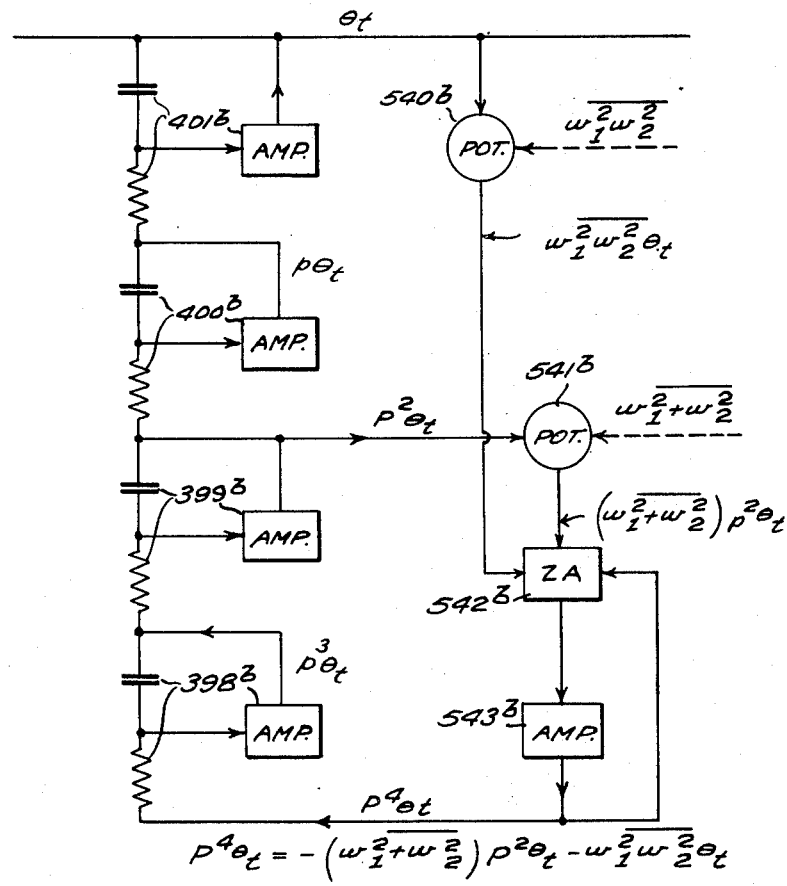

FIGURE 29 is a diagram of an electrical oscillating prediction mechanism adapted to employ the values obtained from the rate measuring device of FIGURE 25 and the angular velocity function computer of FIGURE 26, to determine in accordance with the more specific aspects of the invention, the predicted pitch angle and predicted deck level (heave) of a floating deck at a predicted future instant, the solid lines in said diagram indicating electric impulses and the dotted lines indicating mechanical displacements and more specifically shaft rotations;

FIGURE 30 shows a form of electronic switch adapted to be employed as part of the oscillating prediction mechanism of FIGURE 29;

FIGURE 31 shows another form of electronic switch adapted to be employed as part of the oscillating prediction mechanism of FIGURE 29;

FIGURE 32 is a circuit diagram of a multivibrator and trigger device adapted to be employed as part of the oscillating prediction mechanism of FIGURE 29 to control the timing and sequencing of the different phases of the cycle of operation of said mechanism;

FIGURE 33 is a chart indicating the different cycles of operation of the oscillating prediction mechanism of FIGURE 29 and the corresponding voltage wave and pulse characteristics emanating from different parts of the multivibrator and of the trigger circuit shown in FIGURE 32;

FIGURE 34 shows diagrammatically one manner in which the principal devices of the oscillating system shown in FIGURES 24, 26, 27, 28 and 29 may be assembled to predict the value of a varying quantity at a predicted time instant;

FIGURE 35 shows diagrammatically the manner in which the principal devices of the oscillating system shown in FIGURES 26, 27, 28 and 29 may be assembled in conjunction with the modified form of rate measuring device shown in FIGURE 36 to predict the value of a varying quantity at a predicted time instant;

FIGURE 36 is a diagram of a modified form of rate measuring device adapted to be employed as part of the oscillating system of FIGURE 35;

FIGURE 37 shows diagrammatically the general assembly of a modified form of oscillating prediction system in which the rate measuring device and the oscillating prediction mechanism are combined to permit part of the rate measuring circuit to be employed as part of the oscillating prediction circuit;

FIGURES 38 and 38a when combined along the dot and dash break lines A show the oscillating prediction system of FIGURE 37 in greater detail, the solid lines indicating electric impulses or signals, the dotted lines indicating mechanical displacements such as shaft rotations;

FIGURE 39 is a diagram of the oscillating prediction circuit of the oscillating prediction system of FIGURES 38 and 38a isolated from certain parts of the rate measuring device of said oscillating system, the solid lines indicating electric impulses or signals, the dotted lines indicating mechanical displacements, such as shaft rotations; and FIGURE 40 is a diagram of a combined elevation guidance and warn-off device for a plane approaching a floating deck for landing, the full lines indicating mechanical displacements, as for example shaft rotations, the dotted lines indicating electric signals or impulses.

Different stages of control

Figure 1:
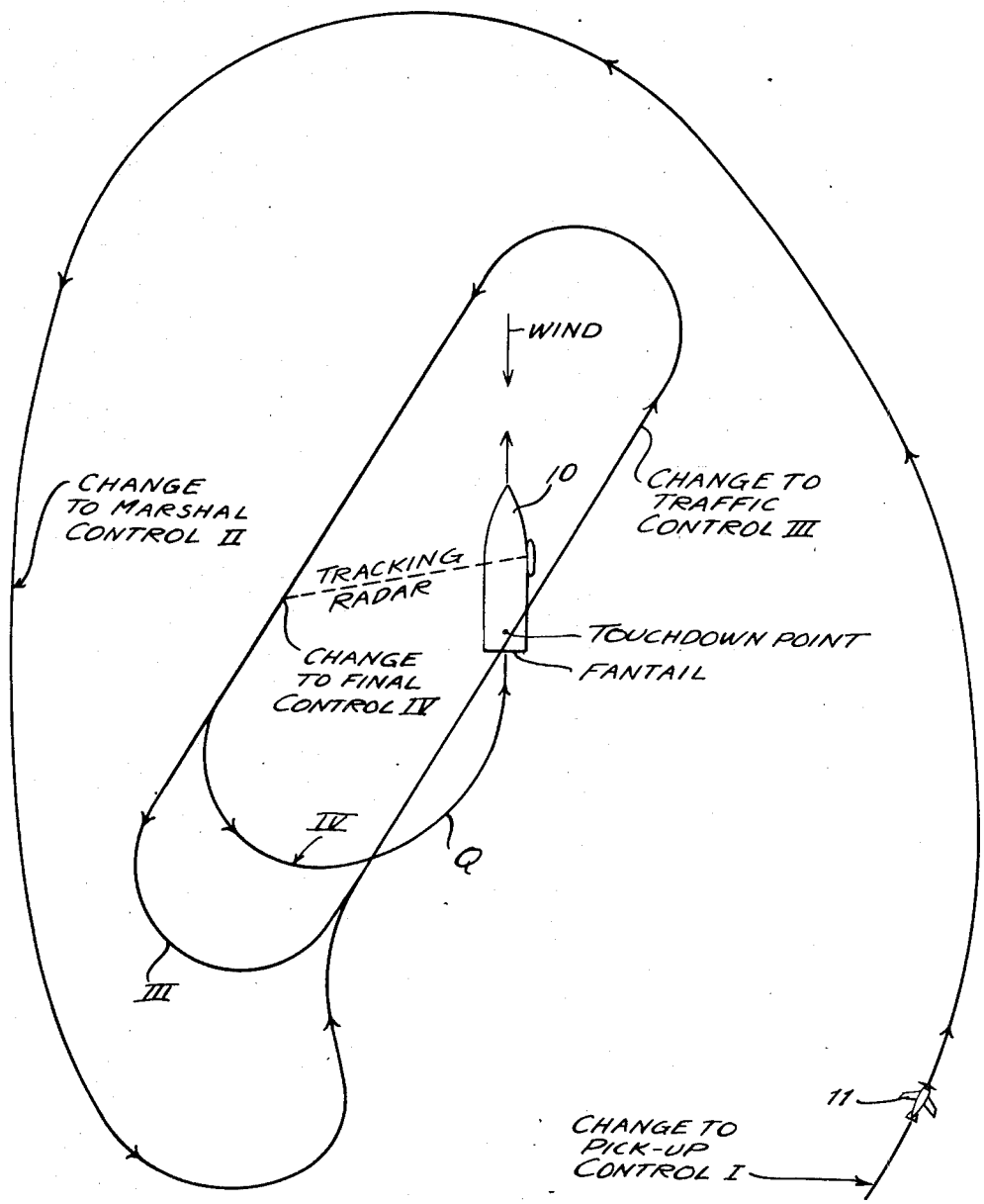
FIGURE 1 is a diagram showing a path through the different stages of a carrier controlled system followed by an airplane in landing on a carrier.

Referring to FIGURE 1, there is shown the course of a plane through the different stages of a carrier controlled approach system. The first three preliminary stages form no part of the present invention and are described herein briefly to indicate how the plane can approach the Final Control Stage IV of the present invention. These three preliminary control stages may be considered as successive feeding devices of increasing refinement, Stage III acting as the device for properly feeding aircraft to the operational system of Stage IV.

Pick-up Control, Stage I on the carrier 10, accepts control of the planes 11 when the planes to be landed come into a predetermined zone in the control range of said carrier. This Pick-up Control assigns the planes to different elevations, the first plane accepted being assigned to the lowest available altitude. As the planes at the lowest levels are transferred to Marshall Control in Stage II, the other planes in the other levels of Stage I are assigned to their next lower levels.

When a plane reaches the lowest level of Stage I, it is directed to switch to Marshall Control frequency in Stage II. From this latter stage, the airplane enters the traffic pattern of Stage III, Traffic Control which has been predetermined as best suited to position the aircraft for a landing. While in the traffic control lane of Stage III, the plane is placed under Final Control in Stage IV, and is given final instructions to land.

The present invention is concerned only with Stage IV, the Final Approach Control. It has been assumed in connection with this control stage that all the operations and maneuverings required in Stages I, II and III have been satisfactorily carried out. Final Approach Control begins to operate when the approaching aircraft enters a certain zone with respect to the ship. This zone has been taken for purposes of illustration to include a region bounded by the aft extension of the ship centerline, by a bearing line 65° to port from the aft-centerline extension and by a circular arc of six mile radius with the center of the ship. The vertical height of this region is limited by the operational requirements of Traffic Control in Stage III.

The approaching plane would be located and tracked by the Final Approach Control radar, as soon as, or shortly after the plane enters the zone of stage IV, as shown in FIGURE 1. The tracking radar then supplies continuous information of airplane location with respect to the carrier. From this radar information and also data obtainable from other sources, as will be described the airplane is furnished guidance information sufficient to realize a satisfactory landing. The plane after being tracked by radar for final approach control is guided by said control as will be described along a course Q (FIGURE 1) terminating in a line tangent to the aft-centerline of the carrier, until landing is effected.

At the present time, it is desired to land aircraft at successive intervals of one minute, so that the Final Approach Control System must be set in conjunction with the other preliminary control stages to effect landing within this period. If it is desired to halve the landing interval, the maximum time available for guiding the airplane might prove insufficient to secure proper orientation and positioning of the airplane by means of the guidance process built into the system. Under such circumstances, two complete Final Approach Control systems may be used.

Figure 2:
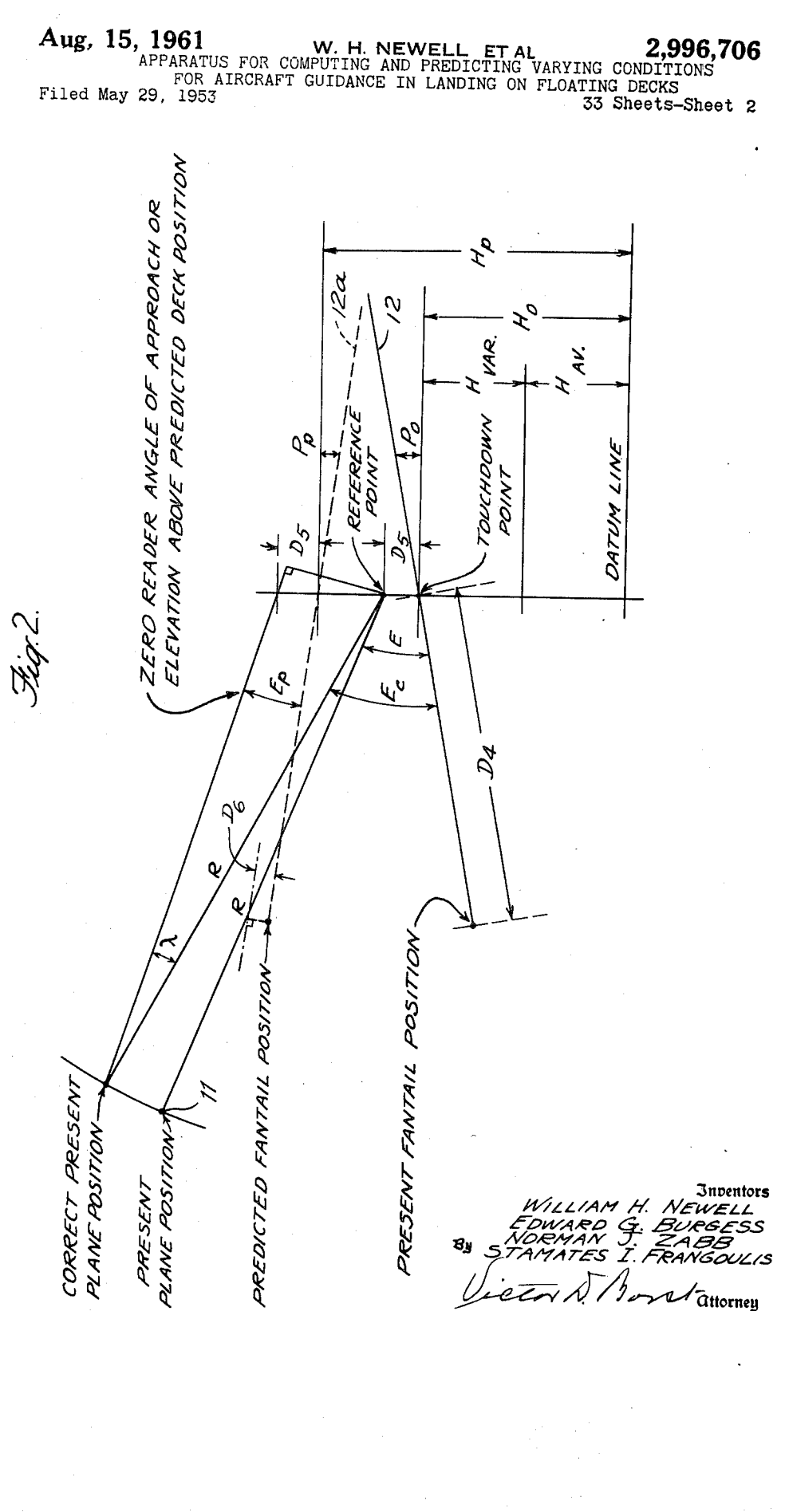

FIGURE 2 is a geometric elevation diagram showing the plane 11 in conjunction with the present position 12 of the flight deck of the carrier, and the correct position it should have to land safely on the deck in predicted position 12a at the predicted time of landing. It is assumed that the carrier is moving in the direction opposite to the direction of the wind as shown in FIGURE 1 during the operation of the Final Approach Control system, and that it is pitching and heaving, so that its pitch angle is changing and the level of the flight deck is also changing. The touchdown point indicated in FIGURE 2 is the point where the plane can begin to land on the flight deck, and the fantail is the stern end of the flight deck. A plane coming in for a landing must clear the fantail by a safe predetermined margin and must arrive over the touchdown point with sufficient clearance for its undercarriage and wheels.

General description of final approach control system

Figure 3:
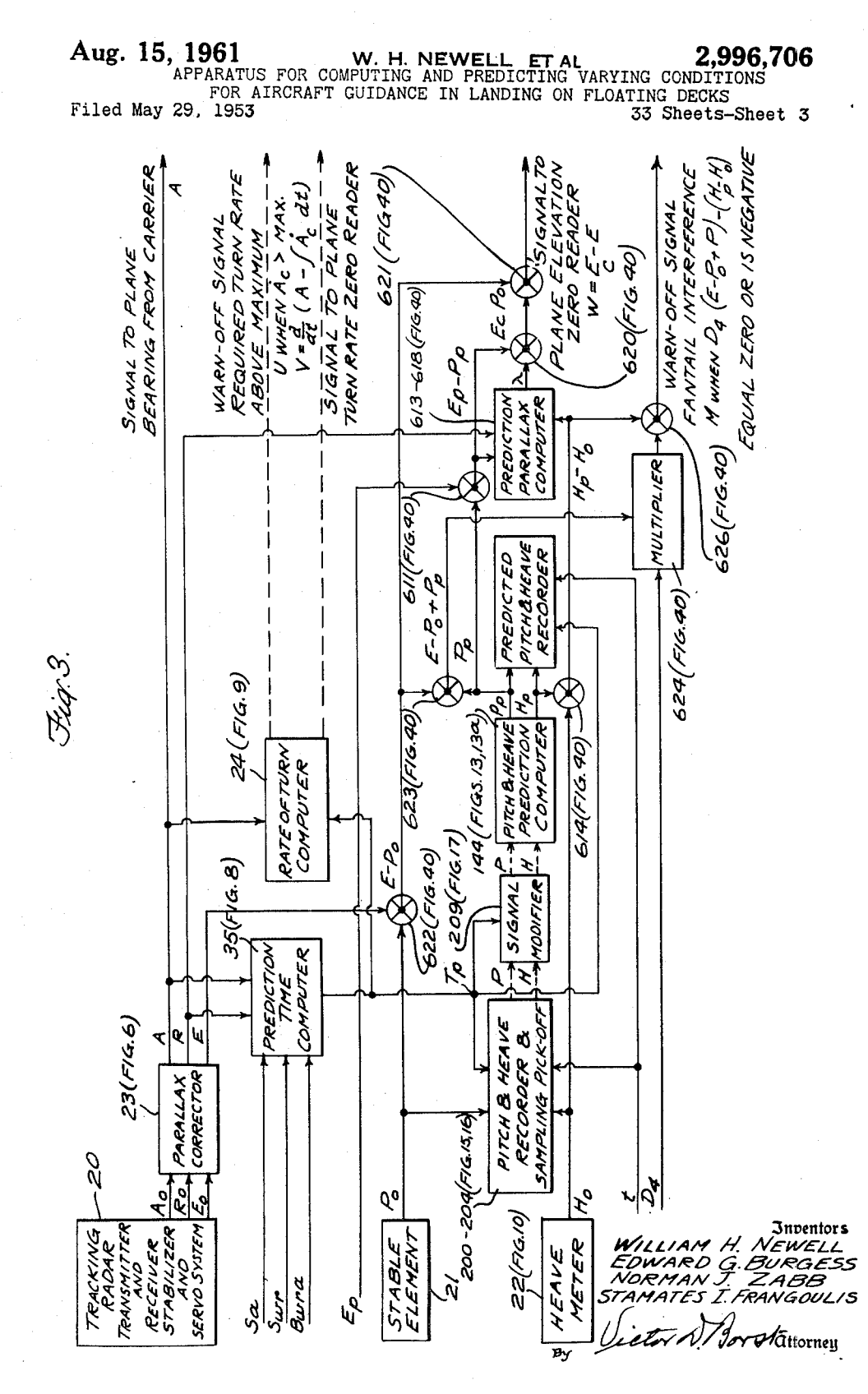

FIGURE 3 shows a diagram of the complete Final Approach Control system of the present invention. The inputs to this system obtained from the tracking radar device 20 on the carrier comprise the plane's present position relative to the carrier in spherical position coordinates $A_0$, $R_0$ and $E_0$ as determined from the observation origin of the radar antenna on said carrier. $A_0$ is the bearing angle of the plane with respect to the aft-centerline of the carrier, $R_0$ the range of the plane and $E_0$ the elevation angle of the plane.

In addition to the input quantities described, another input to the system comprises the plane's true air speed $S_a$. This value of $S_a$ could be obtained (1) directly from the plane by radio (2) by assuming an airspeed appropriate to the particular type of plane in a landing approach in its late stage with landing gear, flaps and hook down or (3) by methods used in anti-aircraft fire control.

Other inputs to the system are the wind speed relative to the carrier, $S_{wr}$, obtained from the carrier, and the wind direction relative to the carrier, $B_{wra}$, also obtained from the carrier, and $E_p$ (FIGURES 2 and 3) which is the glide approach angle of the plane with respect to the predicted deck position. The angle $E_p$ is a predetermined quantity set into the mechanism and may be preset at approximately six degrees for normal conditions or at a larger value if the wind velocity over the deck is unusually high. This glide approach angle $E_p$ is shown exaggerated in FIGURE 2.

Other input values into the system are $P_0$, the present pitch angle of the deck obtained from a stable element 21 on the carrier and $H_0$ the present deck height obtained from a heave meter 22 on the carrier.

Additional input values into the system are $t$, the current or running time, and $D_4$ the preset distance between the fantail and the touchdown point of the carrier (FIGURE 2).

One output of the system sent to the plane is a signal A from the output of a parallax corrector 23. Since the observed spherical position coordinates $A_0$, $R_0$ and $E_0$ have as observation origin the tracking radar antenna, these must be converted into corresponding coordinates having the touchdown point as the observation origin. The signal A gives the plane and/or pilot its true bearing angle with respect to the aft-centerline of the carrier having the touchdown point as observation origin.

Another output from the system is a warn-off signal U and a signal V to the plane emanating from a rate of turn computer 24. This computer 24 compares A with $\int \dot{A}_c dt$ in which $$\dot{A}_c \text{ is } \frac{d}{dt} A_c$$

the correct turning rate for the plane, when the plane is approaching the carrier along the correct path Q (FIGURE 1) and transmits to the plane the rate of change of the difference as a rate of turn signal $$\frac{d}{dt}(A - \int \dot{A}_c dt) \text{ or } \dot{A} - \dot{A}_c$$

indicated as the value V in FIGURE 3. If the quantity $\dot{A}_c$ as computed is greater than the maximum turning rate of which the plane is capable, then this fact indicates that the approaching plane is too close to the carrier and too far off the carrier center line to make a proper landing. Hence a warn-off signal U is sent to the plane, when $\dot{A}_c$ exceeds a certain maximum depending on the type of plane.

Another output of the system shown in FIGURE 3 and sent to the plane is the value $W = E_c - E$ (FIGURES 2 and 3) which is the error in plane's present elevation. From this quantity, the plane and/or pilot can determine the correct elevational position it should have to make the proper approach at the required glide angle, $E_p$, with respect to the predicted position of the deck (FIGURE 2).

A further output of the system, sent to the plane, is a warn-off signal M of fantail interference set off to assure a correct predetermined clearance $D_6$ between the incoming plane and the carrier fantail and consequently a proper clearance $D_5$ (FIGURE 2) between the plane and the touchdown point. The value of this signal M is $D_4(E - P_0 + P_p) - (H_p - H_0)$ as will be shown, where $P_p$ is the predicted pitch angle of the carrier at the predicted time $T_p$ of landing, and $H_p$ is the predicted deck height at the predicted time $T_p$. $T_p$ is the time required by the plane to fly from its present position to its position at touchdown on the deck.

For some of the computations involved, it is necessary to find the values $T_p$, $P_p$ and $H_p$. The method and means for arriving at these values will be described hereinafter.

Glossary of terms

Herein is the glossary of the terms and values hereinbefore described and hereinafter referred to, unless otherwise indicated:

$A_0$—Bearing angle of the plane with respect to the aft-centerline of the carrier from the observation origin of the radar antenna.

$R_0$—Range of the plane from the observation origin of the radar antenna.

$E_0$—Elevation angle of the plane from the observation origin of the radar antenna.

A—Bearing angle of the plane with respect to the aft-centerline of the carrier corrected for parallax by reference to the touchdown point as the observation origin.

R—Range of the plane corrected for parallax by reference to the touchdown point as the observation origin.

E—Elevation angle of the plane corrected for parallax by reference to the touchdown point as the observation origin.

$S_a$—Plane's true air speed (speed with respect to air).

$S_{wr}$—Wind speed relative to the carrier.

$B_{wra}$—Wind direction relative to carrier.

$E_p$—Glide approach angle of the plane with respect to the predicted deck position.

$P_0$—Present pitch angle of the deck.

$H_0$—Present deck height.

$t$—Running time.

$D_4$—Distance between the fantail and touchdown point of carrier.

$D_5$—Clearance between the plane and touchdown point at instant of landing.

$D_6$—Clearance between the plane and fantail at the instant plane is over fantail.

$T_p$—Predicted interval to time of landing.

$P_p$—Predicted pitch angle of the carrier at the predicted time $T_p$ of landing.

$H_p$—Predicted deck height at the predicted time $T_p$.

Parallax corrector

The approach guidance of a plane must be based on spherical position coordinates having the touchdown point as origin. However the observed spherical position coordinates $R_0$, $A_0$ and $E_0$ have as origin the tracking radar antenna. These two origins are offset from one another a distance $D_1$ along the ship centerline as indicated in FIGURE 5, $D_2$ athwartship and $D_3$ vertically. From the geometric diagram of FIGURE 5, it is determined that the two sets of spherical coordinates are connected by the exact relations $$R \cos E \cos A + D_1 = R_0 \cos E_0 \cos A_0 \quad (1)$$

$$R \cos E \sin A + D_2 = R_0 \cos E_0 \sin A_0 \quad (2)$$

$$R \sin E - D_3 = R_0 \sin E_0 \quad (3)$$

FIGURE 6 is a diagram of the parallax corrector 23 (FIGURE 3) by which the Equations 1, 2, and 3 are mechanized and solved for the values R, A and E, the solid lines indicating mechanical displacements, as for example, shaft rotations, and the dotted lines electric signals. The construction and operation of this parallax corrector 23 are apparent from FIGURE 6 but are described briefly. In this corrector, the coordinate quantities $E_0$ and $R_0$ obtained as mechanical displacements and specifically as shaft rotations from the tracking radar antenna are introduced into a resolver 25 of a well-known type to obtain outputs $R_0 \sin E_0 + D_3$ and $R_0 \cos E_0$ where $D_3$ is a constant shaft displacement setting. The latter output in conjunction with the coordinate value $A_0$ as a mechanical displacement and specifically as a shaft rotation obtained from the tracking radar antenna is introduced into a second resolver 26 to obtain outputs $R_0 \cos E_0 \cos A_0$ and $R_0 \cos E_0 \sin A_0 - D_2$ where $D_2$ is also a constant shaft displacement setting. The quantity $R_0 \sin E_0 + D_3$ from the resolver 25 and the quantity $R \sin E$ from resolver 27 are introduced into the differential gear of a follow-up control and servo motor unit 28 of a well known type to obtain the parallax corrected output value E as a shaft rotation.

The quantity $R_0 \cos E_0 \sin A_0 - D_2$ from the resolver 26 and the quantity $R \cos E \sin A$ from a resolver 30 are introduced into the differential gear of a follow-up control and servo motor unit 31 to obtain the parallax corrected output value A as a shaft rotation.

The quantity $R_0 \cos E_0 \cos A_0$ from the resolver 26 and the quantity $R \cos E \cos A + D_1$, where $D_1$ is likewise a constant shaft displacement setting, from the resolver 30 are introduced into the differential gear of a follow-up control and servo motor unit 32 to obtain the parallax corrected output value R as a shaft rotation.

The corrected values R and E are introduced into the resolver 27 to obtain the output quantities $R \cos E$ and $R \sin E$. The latter value is returned to the differential gear of the follow-up unit 28 as described, while the other value $R \cos E$ is introduced into the resolver 30 in conjunction with the corrected value A, to obtain at the outlet of said resolver 30 the quantities $R \cos E \cos A + D_1$ and $R \cos E \sin A$.

*Prediction time computer for value $T_p$*

The prediction of the position of a ship's deck at the future instant of time when an approaching airplane must land is actually a double prediction time. That is the time ahead must be predicted and then the position of the deck at this time must be predicted. This sequence of predictions is based on the assumption that the pilot has sole control of the plane speed and that the position of the deck at touchdown is not preselected.

The prediction time $T_p$ is not only employed in determining the position of the deck at that time but is also necessary to determine the rate of turn of the plane by means of the computer 24 (FIGURE 3). This value $T_p$ is the time required by the plane to fly from its present position to its position at touchdown on the deck. The precise determination of this prediction time interval requires a complete knowledge of the plane's speed and course relative to the ship during the unknown future time interval. Lacking this information, other sources for data sufficient to predict the time interval must be resorted to. From the tracking radar, there is obtained the plane's present space position relative to the ship in spherical coordinates $A_0$, $R_0$ and $E_0$. In addition, the plane's true air speed $S_a$, the wind speed relative to the carrier $S_{wr}$ and the wind direction relative to the carrier $B_{wra}$ is required. It then becomes necessary to select a space curve Q (FIGURE 1) for the desired airplane approach, this curve being fixed to a horizontal plane moving with the ship. This curve Q is one along which the plane might well travel to the ship if it were headed in the correct direction. This curve Q will be tangent to the centerline of the ship at the touchdown point and will of course pass through the present position of the airplane. There is a unique circle satisfying the above three conditions. Accordingly, for reason of simplicity in concept, general suitability and ease of mechanization, such a circular arc of approach to the ship from the present position is used in computing the predicted time $T_p$.

Figure 7:
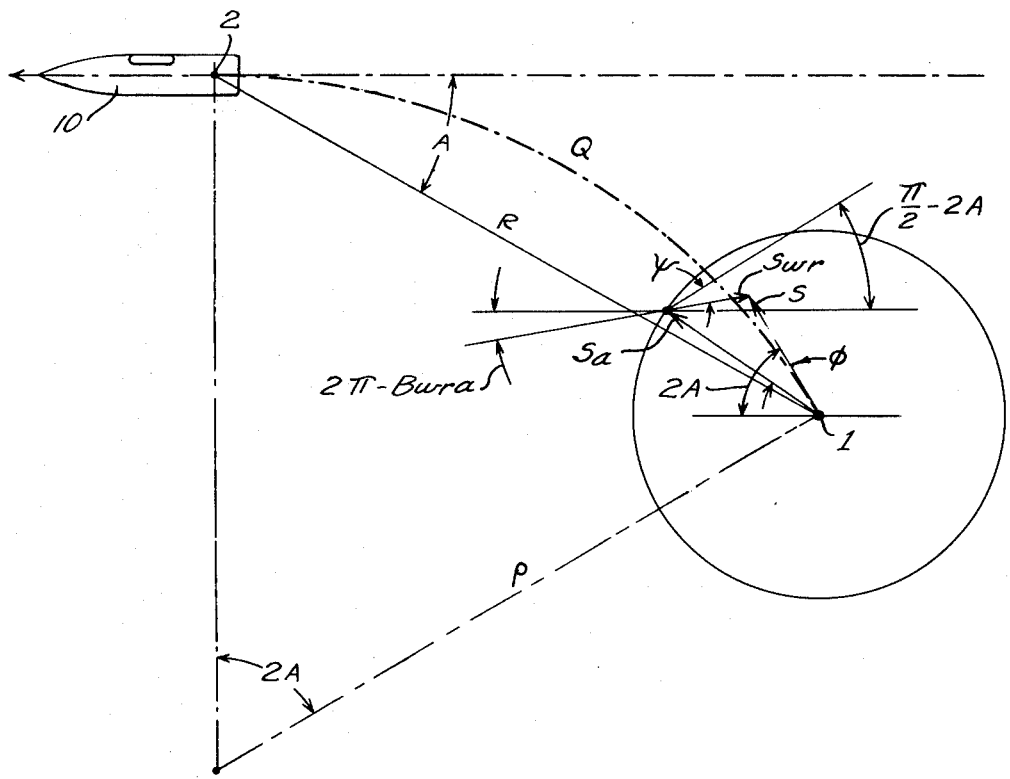
FIGURE 7 is a geometric diagram showing the horizontal projection of the approach path of the plane and illustrating the problem to be solved in determining the prediction time.
Figure 8:
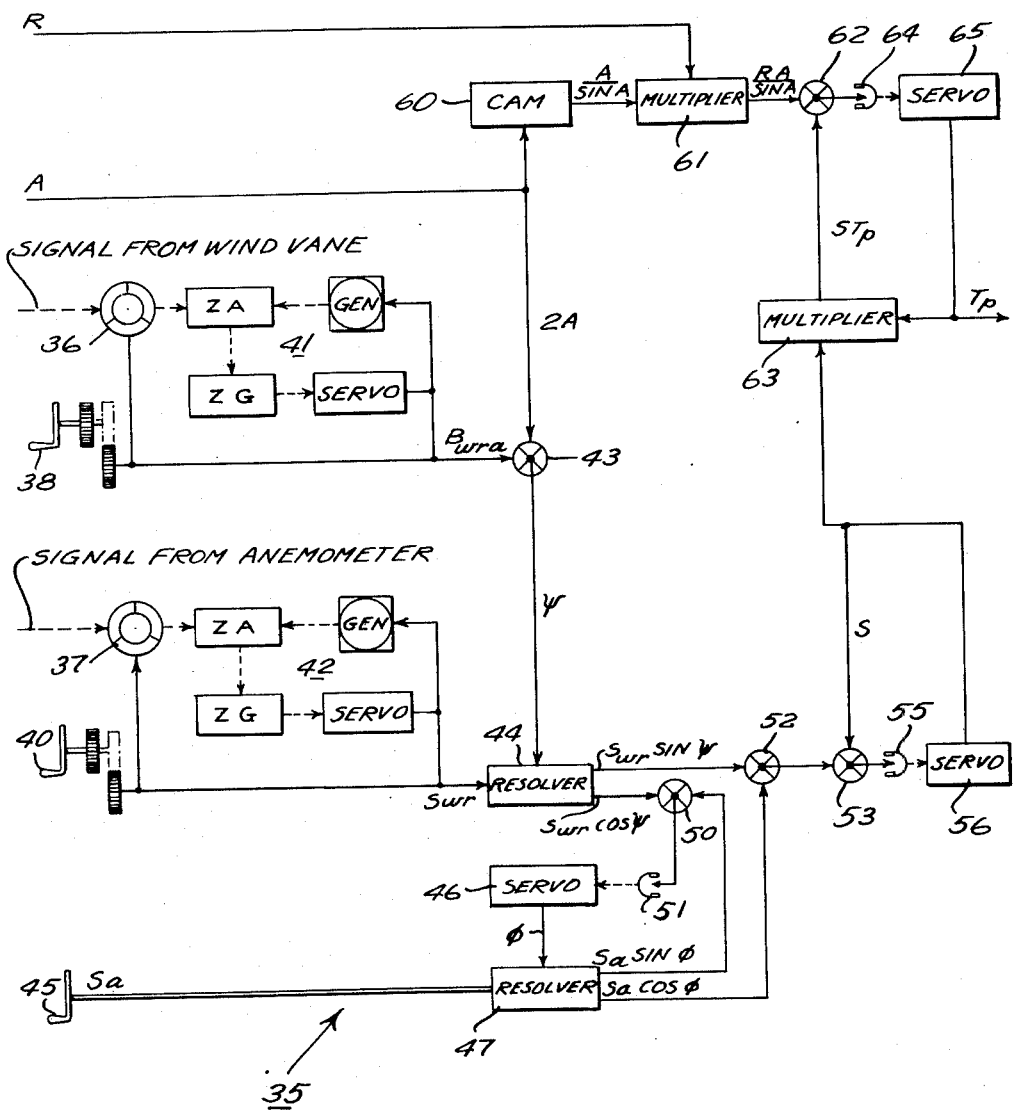
FIGURE 8 shows diagrammatically the prediction time computer for solving the equations derived from the geometric diagram of FIGURE 7, the solid lines indicating mechanical movements, such as shaft rotations and the dottted lines indicating electrical impulses or signals.

The geometric diagram of the problem to be solved is shown in FIGURE 7 and the computer 35 for determining the prediction time is shown in FIGURES 3 and 8. Referring to FIGURE 7, it is considered that the geometric diagram is drawn in the horizontal plane through the touchdown point 2, so that the point 1 is the projection in this plane of the airplane's present position. This involves the assumption that E (FIGURES 2 and 5), the elevation angle of the plane corrected for parallax is a small angle, so that $\cos E = 1$ very nearly, that the projection of A the bearing angle of the plane with respect to the aft-centerline of the carrier corrected for parallax is equal to A as measured in the horizontal projection plane and that $S_a$, plane's true air speed, is a horizontal vector. The points 1 and 2 (FIGURE 7), are connected by a straight chordal line, whose length will be the horizontal range which is equal to R, the parallax corrected range of the plane, according to the first of the assumptions made above. Then the arc of a circle is constructed passing through the points 1 and 2 and tangent to the horizontal projection of the ship's centerline through the point 2. This arc, representing the desired relative track Q of the airplane as it approaches the carrier is used in determining the predicted time. Now, if the airplane were headed along this predetermined track, its speed vector $\bar{S}$, relative to the carrier, would be tangent to the arc 1—2 at the point 1. Accordingly, we know then that $$\bar{S} = \bar{S}_a + \bar{S}_{wr} \qquad (4)$$

where $\bar{S}_{wr}$ is the vector representing the wind velocity over the deck and $\bar{S}_a$ is a vector representing the speed and correct heading of the airplane with respect to the air. It should be noted that the magnitude of $\bar{S}_a$ is equal to the present actual air speed of the airplane but that the direction of $\bar{S}_a$ is not necessarily equal to the present actual heading of the airplane with respect to the air. The manner in which these two different headings are used in connection with the rate of turn computer 24 shown in FIGURE 3 will be described hereinafter.

From the Relationship 4 above, we know the magnitude only of $\bar{S}_a$, the direction only of $\bar{S}$ and both magnitude and direction of $\bar{S}_{wr}$. Referring to the geometric diagram of FIGURE 7, it can be seen by geometry that the angle $$\psi = \left(\frac{\pi}{2} - 2A\right) - (2\pi - B_{wra}) \qquad (5)$$

where $B_{wra}$ is the relative bearing of the apparent direction from which the relative wind is blowing. Hence $$\begin{aligned}\sin \psi &= \cos(B_{wra} - 2A) \\ -\cos \psi &= \sin(B_{wra} - 2A)\end{aligned} \qquad (6)$$

The three vectors $\bar{S}_a$, $\bar{S}_{wr}$ and $\bar{S}$ may now be resolved into components along and perpendicular to the vector $\bar{S}$. When this is done, there is obtained the two equations $$\begin{aligned}S_a \sin \phi - S_{wr} \cos \psi &= 0 \\ S_a \cos \phi - S_{wr} \sin \psi &= S\end{aligned} \qquad (7)$$

which are equivalent to the Relation 4 and which are sufficient to obtain the unknown direction $\phi$ of $S_a$ and the unknown magnitude S of $\bar{S}$. Having determined S from Equations 7, it is known that if S remains constant during the plane's approach, then $$ST_p = 2A\rho \qquad (8)$$

where $\rho$ shown in the diagram of FIGURE 7 as the radius of the arc 1—2, is given by $$R = 2\rho \sin A \qquad (9)$$

Therefore, after eliminating $\rho$ from Equations 8 and 9, the relation $$\frac{ST_p}{R} = \frac{A}{\sin A} \qquad (10)$$

is obtained or $$T_p = \frac{RA}{S \sin A} \qquad (11)$$

FIGURE 8 shows the mechanization of these mathematical relations in the prediction time computer 35 (FIGURE 3), the solid lines indicating mechanical motion, as for example shaft rotations, the dotted lines representing electrical signals or impulses. The inputs to this computer 35 are the quantities R, A, $B_{wra}$, $S_{wr}$ and $S_a$. The quantities R and A are obtained directly as outputs of the parallax corrector 23 (FIGURES 3 and 6), as already described. The quantities $B_{wra}$ and $S_{wr}$ may be received as electrical signals from the carrier's wind vane 36 and carrier's anemometer 37 respectively, either automatically, or if this fails through manual devices 38 and 40 respectively indicated for purposes of illustrations as handcranks.

The electrical quantities $B_{wra}$ and $S_{wr}$ obtained as described are converted by means of automatic follow-up mechanisms 41 and 42 respectively of well-known construction into shaft rotations. The shaft rotation $B_{wra}$ is then combined in a differential 43 with the shaft rotation 2A obtained by increase in the speed ratio of the original shaft rotation A, to give the quantity $$\psi = \frac{\pi}{2} + B_{wra} - 2A$$

$\frac{\pi}{2}$ being a constant shaft offset. This quantity in turn is introduced as an input into a mechanical resolver 44. The other input into this resolver 44 is the quantity $S_{wr}$ obtained as a shaft rotation from the output of the followup mechanism 42. The two component outputs of this resolver 44 are $S_{wr} \sin \psi$ and $S_{wr} \cos \psi$.

Similarly $S_a$, the true air speed of the approaching airplane, obtained by radio from the plane and translated on the carrier into shaft rotation by a manual device 45, as for example a handcrank, and the angle $\phi$, a feedback input from a servomotor 46, are the inputs of a second resolver 47, having outputs $S_a \sin \phi$ and $S_a \cos \phi$. From the first of Equations 7, we have $S_a \sin \phi = S_{wr} \cos \psi$. Hence, $S_a \sin \phi$ is subtracted from $S_{wr} \cos \psi$ in a differential 50 and the difference between these two quantities when non-zero is used to adjust the value of $\phi$ in a direction to decrease the error or difference. This adjustment is carried out by follow-up contacts 51 controlling the servomotor 46 driving the angular quantity $\phi$ as a feedback. At the same time, $S_{wr} \sin \psi$ is subtracted from $S_a \cos \phi$ in a differential 52 in accordance with the second of Equations 7, and the difference is introduced to one end-gear of another differential 53 having as another input the quantity S. The output of this differential 53 represents the differences $(S_a \cos \phi - S_{wr} \sin \psi) - S$. This difference operates electrical contacts 55 controlling a servo motor 56. Hence when this difference is zero, the contacts are both open and the servo motor 56 will have driven the S shaft to the correct value as given by the second of the Equations 7.

In the second subdivision of the computer 35, the angle quantity A drives a cam 60 whose output is $$\frac{A}{\sin A}$$

This cam output is then multiplied in the unit 61 by the range R to give $$\frac{RA}{\sin A}$$

which is one input of a follow-up differential 62. The other input of this follow-up differential 62 is $ST_p$ which is the output of the unit 63 multiplying S by $T_p$. The output of this differential 62 driving the center contact arm of a double contact 64 represents then the difference $$\frac{RA}{\sin A} - ST_p$$

When this difference exists, the $T_p$ servo motor 65 is energized and drives the $T_p$ output shaft in a direction to reduce the difference to zero. The result is that Relation 11 is satisfied and $T_p$ is determined.

It should be understood that although the mechanism described above is largely mechanical in structure, it may also be built mainly of electrical computing units. The correspondence of the units would be about as shown in the table below:

| Mechanical: | Electrical |
|---|---|
| Component solver or resolver | Resolver |
| Differential | Adding network |
| Follow-up contact | Servo amplifier |
| Servo motor | Servo motor |
| Multiplier | Potentiometer |
| Cam | Non-linear potentiometer |

Although the path Q of approach of the plane is assumed to be an arc of a circle, as far as certain aspects of the invention are concerned, it may be assumed to be a straight line, a parabola, an exponential curve or possibly a circular arc in combination with a straight course. Such an assumption would change the formulas used but not the general nature of the prediction time computer. In this connection, it should be noted that a straight line approach along the aft centerline is a special case of the tangent circular arc approach and accordingly this path is handled by the particular computer 35 described above.

*Rate of turn computer*

Having determined the corrected bearing angle A of the plane and the predicted time $T_p$, the rate of turn computer 24 (FIGURES 3 and 9) may be operated to obtain the signal for the plane, indicating its rate of turn error $$\frac{d}{dt}(A - \int \dot{A}_c dt)$$

and to obtain the warn-off signal when the turn rate of the plane $\dot{A}_c$ is above a permissible maximum.

For an airplane with the correct heading and travelling along the preselected circular arc Q (FIGURES 1 and 7) of approach, the computed rate of change of the bearing angle A of the plane with respect to the aft-centerline of the carrier is from the diagram of FIGURE 7 given by $$R\dot{A}_c = S \sin A \qquad (12)$$

where $\dot{A}_c$ is the correct computed turning rate for the plane when it is approaching the carrier along the correct path and is equal to $$\frac{d}{dt} A_c$$

$A_c$ being the correct computed bearing position of the plane with respect to the aft-centerline of the carrier, if it were approaching the carrier along the correct predetermined path. But $$\frac{S \sin A}{R} = \frac{A}{T_p}$$

from Equation 11. Hence $$\dot{A}_c T_p = A \qquad (13)$$

Equation 13 gives the rate of change of bearing angle which an approaching plane with the correct heading would have. The actual rate of change of bearing will be $$\frac{d}{dt} A \text{ or } \dot{A}$$

and when this differs from $\dot{A}_c$, the indication is that the plane heading is incorrect. The signal transmitted to the plane will be $$k \frac{d}{dt}[A - \int \dot{A}_c dt] \qquad (14)$$

When the heading and turning rate of the plane is correct, this signal is zero.

Figure 9:
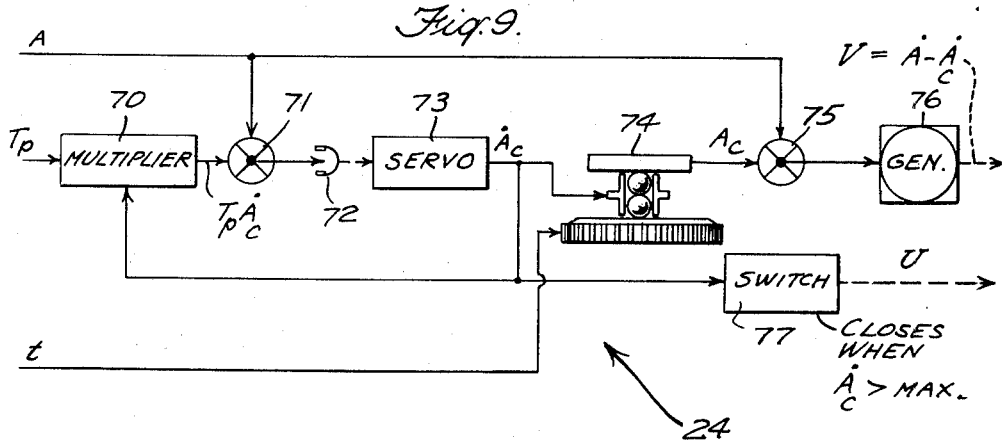
FIGURE 9 shows diagrammatically the rate of turn computer.

FIG. 9 shows the rate of turn computer 24 (FIG. 3) for generating the turn rate error signal $\dot{A} - \dot{A}_c$ and the warn-off signal U when $\dot{A}_c$ is greater than the maximum permitted, the mechanical movements, as for example the shaft rotations, being indicated in full lines and the electrical impulses as dotted lines. In this computer 24, the predicted time $T_p$ derived from the prediction timer computer 35 (FIGS. 3 and 8) is multiplied by the quantity $\dot{A}_c$ in the unit 70 to give an output $T_p \dot{A}_c$ admitted into a differential 71 in conjunction with another input A, constituting the bearing angle A derived from the parallax corrector 23 (FIGS. 3 and 7), to give a difference $$A - T_p \dot{A}_c$$

corresponding to Equation 13. This difference operates electrical contacts 72 controlling a servo motor 73. Hence when the difference is zero, the contacts 72 are both open and the servo motor 73 will have driven its output shaft an amount corresponding to the value $\dot{A}_c$. This quantity $\dot{A}_c$ is returned to the multiplier 70 as described, and is also introduced into a mechanical integrator 74 to integate said value and obtain the output $A_c$. This integrator 74 is of the well-known type having a friction disc driven continuously at constant speed corresponding to the running time $t$.

The output $A_c$ of the integrator 74 and the value A are introduced into a differential 75 to obtain an output equal to the difference $A-A_c$. This output $A-A_c$ is introduced as a shaft rotation into a generator 76 acting as a differentiator to obtain an electric signal V, equivalent to the value $\dot{A}-\dot{A}_c$, which is sent to the plane to indicate to it its actual rate of turn error compared to the correct rate of turn it should have, if it were following the right course.

This signal is received in one embodiment of the guidance system by a cross-pointer indicating instrument well known in blind flying navigation. The signal appears as a displacement of the vertical pointer. The absence of this displacement and/or signal indicates that $\dot{A}=\dot{A}_c$ and that the plane is therefore turning at the correct rate. The horizontal pointer of the crossed-pointer indicating instrument is used for receiving the elevation guidance signal W hereinafter described.

At the same time the signal $A-A_c$ is sent out, the shaft rotation $A_c$ from the outlet of the servo-motor 73 is introduced into a switch device 77 which is automatically operable to send out an electrical and/or audible signal U when this shaft rotation is greater than a predetermined maximum value permitted and is therefore sufficient to close the contacts of a warn-off signal circuit.

*Stable element for determining the present pitch angle $P_0$ of the carrier*

In order to determine the value $E_c-E$ (FIGS. 2 and 3) as a signal to the plane to advise it of the difference between its present elevational angle of approach with respect to the carrier and the elevational angle it should have for proper safe approach and to determine the value of $D_4(E-P_0+P_p)-(H_p-H_0)$ as a warn-off signal when below a predetermined amount for proper clearance, indicating possible fantail interference, the present pitch angle $P_0$ of the carrier flight deck, the present deck height $H_0$ of the deck, the predicted pitch angle $P_p$ of the deck at the predicted time $T_p$ and the predicted deck height $H_p$ at the predicted time $T_p$ should be determined.

In order that the Final Approach Control System of the present invention be supplied with continuous information on the magnitude of the ship pitch angle, the service of the stable element 21 (FIG. 3) of some kind is required. This unit 21 could be made as an integral part of the system, and could be of any well known construction. For example, it could be one of the stable elements commonly employed in connection with firing control systems on warships, except that it would be provided with means for transmitting the pitch $P_0$ to the System, for example as a shaft rotation. There is also the possibility that the stabilizer unit required in connection with the radar antenna drive could also be used to supply the information $P_0$. There is also in existence a pitch and roll recorder. This unit might also be used, if the accuracy and smoothness of operation were satisfactory for the purpose in mind.

*Heave meter for determining the present deck height $H_0$*

Under certain conditions, the measurement of heave $H_0$, that is the vertical motion of the center of gravity of the ship may be neglected. However, under special sea conditions, the amount of heave may be considerable. This would be particularly true of a small carrier in a large swell of long wave length. It is therefore assumed for the purpose of the present invention that the measurement of heave is necessary.

Figure 10:
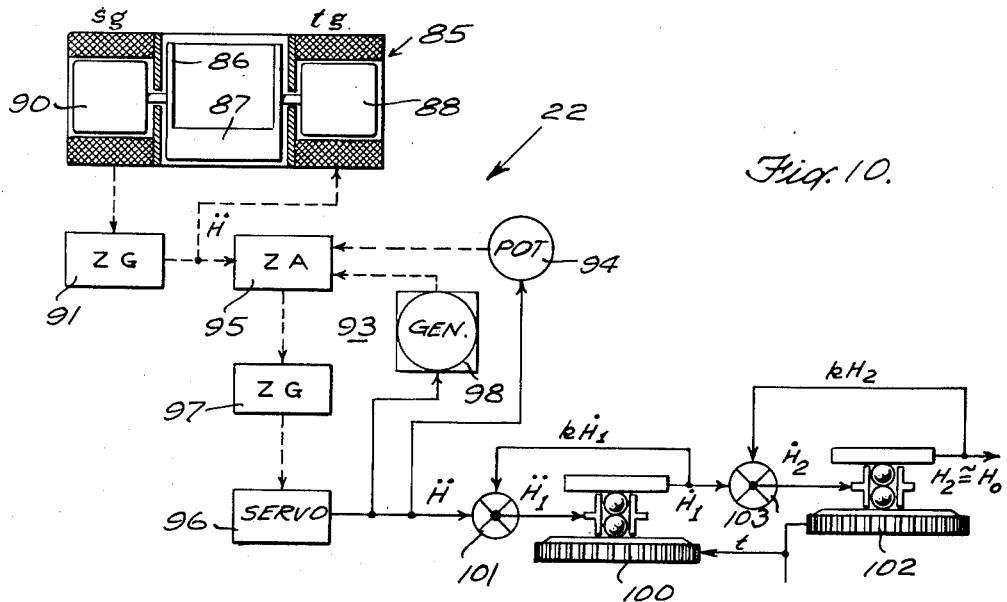
FIGURE 10 shows diagrammatically a heave meter for determining the vertical motion of the carrier, the solid lines indicating mechanical movements, such as shaft rotations and the dotted lines indicating electrical impulses or signals.

It is proposed to provide a heave meter 22 shown in FIG. 3 as part of the entire system and shown diagrammatically but in greater detail in FIG. 10, the dotted lines in the latter figure indicating electric signals and the solid lines mechanical displacements, as for example shaft rotations. This heave meter 22 has a torque zeroed pendulum accelerometer 85 located at the center of gravity of the ship or if desired at or near the normal plane touchdown point of the deck. If this accelerometer 85 is located at any point other than the center of gravity of the ship, the effects of other accelerations besides that of the center of gravity, as for example that due to the roll of the ship must be taken into account.

The accelerometer 85 may be mounted in damped gimbals to reduce the cross coupling effect of accelerations due to roll, pitch and yaw and may even be stabilized. This accelerometer is shown comprising a floating pendulum 86 in the form of an offset weight 87, mounted on end shafts, one of which is connected to the rotor of a torque generator 88, the other being connected to the rotor of a signal generator 90. In the equilibrium position, the pendulum center of gravity and axis are in a horizontal plane. This condition is maintained by means of a biasing voltage on the torque generator 88. If now the accelerometer 85 is subjected to a vertical acceleration, the inertia reaction of the pendulum mass will introduce a moment about the pendulum axis proportional to the instantaneous acceleration. This moment will initiate a rotation of the pendulum 86 about its axis resulting in a voltage output from the signal generator 90 (microsyn pick-off). This voltage is then amplified by an amplifier unit 91 and applied in its amplified form to the stator windings of the torque generator 88 which then applies a moment about the pendulum axis opposing the moment resulting from the acceleration. When these two opposing moments are equal, the pendulum 86 will come to rest. Assuming now that the system is linear, the voltage output of the high gain amplifier 91 will be proportional to the vertical linear acceleration of the ship at the accelerometer location. Since acceleration is the second derivative of space with respect to time, the output of the high gain amplifier 91 may be designated as $$\ddot{H}=\frac{d^2H}{dt^2}.$$

The equation of motion of the pendulum accelerometer system will be of the form $$\ddot{\theta}+\frac{\mu\dot{\theta}}{I}+\frac{k\theta}{I}=\frac{\ddot{H}}{l}$$

where I is the effective moment of inertia of the rotating pendulum, $\mu$ is the damping constant, $k$ is the "spring" constant of the torque motor, $l$ is the distance of the pendulum center of gravity from the axis and H is the vertical linear acceleration of the center of gravity of the pendulum. Now if the two time constants of the accelerometer system are made very small in comparison with the periods associated with $\ddot{H}$, we may deal only with the steady state relation $$\frac{k\theta}{I}=\frac{\ddot{H}}{I}$$

In addition, we have the following relations which hold when the system is taken to be linear, namely Voltage of signal generator $=V_{sg}=k_1\theta$
Voltage of torque generator $=V_{tg}=GV_{sg}$ where
G is the voltage gain of the amplifier
Hence $V_{tg}=k_2\ddot{H}$ That is, the voltage output of the amplifier 91 is proportional to the vertical linear acceleration of the ship at the accelerometer location.

The next step is to convert the amplifier output voltage $\ddot{H}$ into a shaft rotation proportional to this voltage. For this purpose, there is provided a servo follow-up control unit 93 having a potentiometer 94. If the slider in this potentiometer 94 is driven by the rotation of the shaft to an amount equivalent to the value $\ddot{H}$, the output voltage of this potentiometer is then proportional to $\ddot{H}$. The voltage of the output of the amplifier 91 is then compared with the output voltage of the potentiometer 94 in an adding network 95 forming part of the servo follow-up control unit 93. The output of the adding network 95 will be the difference in voltage or error signal used in controlling a servo motor 96 after amplification by an amplifier 97. The servo motor 96 drives the mechanical output $\ddot{H}$ and also a generator 98 forming part of the follow-up unit 93. The output voltage of this generator 98, which is proportional to $\ddot{H}$ is introduced into the adding network 95 for the purpose of improving the accuracy, smoothness and stability of the servo motor action in following the variations of the voltage from the amplifier 91.

Finally, the value $\ddot{H}$ as a shaft rotation must be integrated twice in order to obtain H, the height of the accelerometer 85, or reference point of the ship above its equilibrium or rest position. Therefore, the carriage of a first mechanical integrator 100 is positioned by the value $\ddot{H}$, and there is obtained therefrom an output $\dot{H} = \int \ddot{H} dt$.

It is evident that over a long period of time, the actual quantity $\dot{H}$ should have an average value equal to zero. But it is also evident that the quantity $\dot{H}$ resulting from mechanical integration may have an average value which will slowly drift away from zero due to varying slip in the integrator or due to a microscopic error in the zero setting. At any rate, such errors are unpredictable and cumulative. The amount that the average value of $\dot{H}$ as integrated departs from zero may be limited by means of a small amount of negative or centering feed-back $k\dot{H}_1$ to the integrator carriage setting introduced through a differential 101 on the input side of the first integrator 100, so that the value $\ddot{H}$ is modified by said differential to a value $\ddot{H} - k\dot{H}_1$ before being applied to the integrator. As a result of this feed-back connection, the performance equation of the first integrator 100 becomes, if we denote the output of this integrator by $\dot{H}_1$ in place of $\dot{H}$, $$\ddot{H} - k\dot{H}_1 = \ddot{H}_1$$

or $$\ddot{H} = (p+k)\dot{H}_1 \qquad (15)$$

where $k$=feed-back constant or ratio resulting from imperfection of the integrator, due for example to slip or resulting from failure to set said integrator initially exactly at zero, and $p$ is the operator $$\frac{d}{dt}$$

Dividing Equation 15 by $p$, there is obtained $$\dot{H} = \dot{H}_1 + k\int \dot{H}_1 dt$$

Therefore, the error involved in the integration is $$\dot{H}_1 - \dot{H} = -k\int \dot{H}_1 dt$$

where the quantity $\int \dot{H}_1 dt$ is bounded. The maximum value is proportional roughly to the area under the curve of $\dot{H}_1$ during a half-cycle, that is, while $\dot{H}_1$ varies from zero to a maximum positive value and back again to zero. Thus the error may be made less than a very small quantity by choosing a small value for $k$. In general, the value of $k$ selected will be the minimum such that $$\lim_{T \to \infty} \frac{1}{T} \int_0^t \dot{H}_1 dt = 0$$

and this would be determined experimentally.

Having obtained the value $\dot{H}_1$ from the output of the first integrator 100, this value is integrated again to obtain $H_1$. But since the average value of $H_1$ is again equal to zero over a long period of time, there is employed a small amount of negative or centering feed-back in this second integration to prevent drift in the average value of $H_1$. Writing now $H_2$, the output of a second integrator 102 in place of $H_1$, there is obtained the performance equation of this second integrator as follows:

$$\dot{H}_1 - kH_2 = \dot{H}_2$$

or $$\dot{H}_1 = (p+k)H_2 \qquad (16)$$

Substituting this Expression 16 for $\dot{H}_1$ in Equation 15, there is obtained $$\ddot{H} = (p+k)^2 H_2$$

or $$H = H_2 + 2k\int H_2 dt + k^2 \int [\int H_2 dt] dt$$

Hence, the overall error in the double integration is $$H_2 - H = -2k\int H_2 dt - k^2 \int [H_2 dt] dt \qquad (17)$$

and $|H_2 - H| < M$ where M is a small determinate positive constant.

The second integration modified by the negative feed-back is accomplished by introducing the feed-back value $kH_2$ into a differential 103 in conjunction with the output $\dot{H}_1$ from the first integrator 100 to obtain the value $\dot{H}_2 = \dot{H}_1 - kH_2$ for the carriage input of the second integrator 102.

The output of the heave meter 22 of FIG. 10 equal to $H_2$ is equivalent to $H_0$ the present deck height, except for the very small error indicated by the Equation 17. By the method described, a continuous value for H or $H_0 \cong H_2$ is obtained.

As far as certain aspects of the invention are concerned, the quantity $\ddot{H}$ may be integrated electrically while it is still in the form of a voltage as it comes out of the amplifier 91, and then the final voltage representing H may be converted to a shaft rotation. This would eliminate any small error which might originally be introduced into the value of $\ddot{H}$ shaft rotation by the servo loop components.

*Differential equation for determining predicted pitch angle $P_p$*

Having determined a value for the prediction time $T_p$, the second phase of the prediction problem is entered into, namely the deck tilt $P_p$ at the future time $T_p$. Consider first a ship at rest in still water. If now a moment should be applied about an athwartship axis through the center of gravity, some pitch angle, say P would result. Upon removal of this applied moment, the ship would oscillate in pitch about the athwartship axis with decreasing amplitude, the equation of motion being approximately $$I\ddot{P} + C\dot{P} + KP = 0 \qquad (18)$$

where I is the effective longitudinal moment of inertia of the ship about the athwartship pitch axis, C is the damping moment coefficient due to skin friction and the like, K is the hydraulic restoring moment coefficient, $\ddot{P}$ is the second derivative of the pitch angle, with respect to time and $\dot{P}$ is the first derivative of the pitch angle with respect to time. Now the period of this oscillation is the pitching period of the ship and is equal to $$T = \frac{2\pi}{w_{np}} = \frac{2\pi}{\sqrt{\frac{K}{I} - \frac{C^2}{4I^2}}}$$

where $w_{np}$=natural angular frequency of pitch. However, when the ship is in a seaway, the equation of motion 18 becomes $$I\ddot{P} + C\dot{P} + KP = F(t)$$

where $F(t)$ represents the pitch component of the moment applied to the ship by wave action. Now from general observation, it can be said that $F(t)$, although highly variable, will nevertheless at a given hour exhibit a frequency spectrum in which certain narrow bands of frequencies are predominant. From an analyzed recording of pitch angle of various type ships headed into the wind under different sea conditions over extended periods of time, it would be possible to obtain the frequency spectrum of the ship's pitching motion under the conditions existing at the time of the run. From this data, it would be noted that the frequencies of greatest amplitude would correspond to the natural pitch period of the ship, the periods at which the ship is encountering the particular wave system running at the time, the period of ship roll and the period of heave. The last two periods mentioned would probably be of small import and are included only because of the fact that both rolling and heaving cause an induced pitch. Usually, but not always, there will be a single system of waves running. Furthermore, this system of waves will more often than not be running in nearly the same direction as the wind. Hence, the normal expectation during carrier landing operations is that the ship would be headed in a direction about opposite to that in which the waves are traveling. Considering that the usual period of ocean waves is in the range of 5 to 10 seconds, a ship speed of 25 knots would reduce these periods to the range of 1.8 to 5.5 seconds. It almost seems from these considerations that under such conditions, the only period to be seriously considered in pitch motion would be the natural pitch period. That is, a forcing moment function of 2 second period would have to be of tremendous magnitude to appreciably affect the ship motion in pitch. However, a forcing function of 5 second period might well have an appreciable effect, and of course a longer period forcing function would have still greater influence. Functions having such longer periods would arise if the normal conditions outlined above did not hold—as for example, when the wind is opposite in direction to the sea and the ship is traveling with a following sea.

From the above discussion, it is evident that an exact solution for the equation of motion of the ship is not possible. However, the equation of motion may be represented with sufficient accuracy by the approximation $$I\ddot{P}+KP=F(t)=a\sin(wt+\phi)$$

where $F(t)$ is a sine function of unknown amplitude $a$, angular frequency $w$ and phase angle $\phi$. The solution of this differential equation is then of the form $$P=a_1\sin(w_1t+\phi_1)+a_2\sin(w_2t+\phi_2) \quad (20)$$

$w_1$ and $w_2$ being the unknown angular velocities and $\phi_1$ and $\phi_2$ the phase angles of the simple harmonic motions of which the pitch angle is assumed to be composed. This form, involving the six unknown parameters $a_1$, $a_2$, $w_1$, $w_2$, $\phi_1$ and $\phi_2$ therefore represents the time variations of pitch angle. Hence, if these six unknowns and variable parameters can be continuously determined and furthermore if a continuous value of prediction time $T_p$ is available, then the predicted pitch angle is $$P_p=a_1\sin[w_1(t+T_p)+\phi_1]+a_2\sin[w_2(t+T_p)+\phi_2] \quad (21)$$

The problem is now therefore reduced to the continuous determination of the six unknown and variable parameters noted above.

*Mechanism for determining the predicted pitch angle $P_p$ employing simplified equation*

In one form of mechanism which can be employed to determine the predicted pitch angle $P_p$, it is assumed in Equation 20 that $a_1=a$ and $a_2=0$, so that $$P=a\sin(wt+\phi) \quad (22)$$

Considered here as known quantities are the present value of pitch angle $P$ as well as the rates of change $\dot{P}$, $\ddot{P}$, etc. Furthermore, if means are provided for recording $P$, the values of $P$ and its rates at any past instant of time will be known. From this known data, the quantities $a$, $w$ and $\phi$ which are for the present considered to be constants, must be determined. Now this evaluation may be carried out in a variety of ways, some of which are indicated herein.

Figure 11:
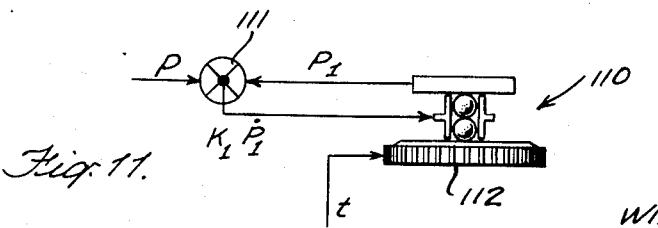
FIGURE 11 is a diagrammatic view of an integrator type follow-up employed in connection with a form of mechanism for determining the predicted pitch angle of the deck at any future time in accordance with a simplified equation.

Suppose for instance that Equation 22 is rewritten in the form $$P=-\frac{ia}{2}e^{i(wt+\phi)}+\frac{ia}{2}e^{-i(wt+\phi)} \quad (23)$$

where $a$, $w$ and $\phi$ are unknown constants, and let P be connected to an integrator type follow-up 110 as shown in FIGURE 11. This follow-up comprises a subtracting differential 111 and an integrator 112 with a time constant $K_1$ and an output $P_1$ constituting one of the inputs of the differential, the other input being the quantity P. Then in operational notation, $$P-P_1=K\dot{P} \quad \text{or}$$

$$P_1=\frac{P}{K_1p+1} \text{ where } p=\frac{d}{dt}$$

$$P_1=\frac{1}{K_1}\left[C_1e^{\frac{-t}{K_1}}+e^{\frac{-t}{K_1}}\int e^{\frac{t}{K_1}}\cdot a\sin(wt+\phi)dt\right]$$

$$=\frac{C_1}{K_1}e^{\frac{-t}{K_1}}-\frac{ia(1-iK_1w)e^{i(wt+\phi)}}{2(1+K_1^2w^2)}+\frac{ia(1+iK_1w)e^{-i(wt+\phi)}}{2(1+K_1^2w^2)}$$

Here, since the sine wave is assumed to have $a$, $w$ and $\phi$ constant, the transient term $$\frac{C_1e^{\frac{-t}{K_1}}}{K_1}$$

may be dropped for steady state conditions with the result that $$P_1=\frac{-ia(1-iK_1w)}{2(1+K_1^2w^2)}e^{i(wt+\phi)}+\frac{ia(1+iK_1w)}{2(1+K_1^2w^2)}e^{-i(wt+\phi)} \quad (24)$$

Similarly, if P is connected to a second integration type follow-up similar to that shown in FIGURE 11, there is obtained the quantity $$P_2=\frac{ia(1-iK_2w)}{2(1+K_2^2w^2)}e^{i(wt+\phi)}+\frac{ia(1+iK_2w)}{2(1+K_2^2w^2)}e^{-i(wt+\phi)} \quad (25)$$

It is now possible to eliminate the two quantities $$+\frac{ia}{2}e^{i(wt+\phi)}$$

and $$-\frac{ia}{2}e^{-i(wt+\phi)}$$

from the three Equations 23, 24 and 25. The result of this elimination written in determinant form is $$\begin{vmatrix} P & 1 & 1 \\ P_1 & \frac{1-iK_1w}{1+K_1^2w^2} & \frac{1+iK_1w}{1+K_1^2w^2} \\ P_2 & \frac{1-iK_2w}{1+K_2^2w^2} & \frac{1+iK_2w}{1+K_2^2w^2} \end{vmatrix}=0$$

The expansion of this determinant gives the value of $w^2$ $$w^2=\frac{K_2(P-P_1)-K_1(P-P_2)}{K_1K_2(K_1P_1-K_2P_2)} \quad (26)$$

Having determined $w$ from Equation 26 as the positive square root of the expression on the right hand side and knowing the prediction time $T_p$, the predicted pitch angle $P_p$ can be determined $$P_p=-\frac{ia}{2}e^{iwT_p}\cdot e^{i(wt+\phi)}+\frac{ia}{2}e^{-iwT_p}\cdot e^{-i(wt+\phi)} \quad (27)$$

As before, the quantities $$+\frac{ia}{2}e^{i(wt+\phi)} \quad \text{and} \quad -\frac{ia}{2}e^{-i(wt+\phi)}$$

may be eliminated from the three Equations 23, 24 and

27. The result of this operation gives the determinant relation $$\begin{vmatrix} P_p & e^{iwT_p} & e^{-iwT_p} \\ P & 1 & 1 \\ P_1 & \dfrac{1-iK_1w}{1+K_1^2w^2} & \dfrac{1+iK_1w}{1+K_1^2w^2} \end{vmatrix} = 0$$

which when expanded may be written in the form $$K_1wP_p - (K_1w \cos wT_p + \sin wT_p)P \qquad (28)$$
$$+ (1+K_1^2w^2)P_1 \sin wT_p = 0$$

Figure 12:
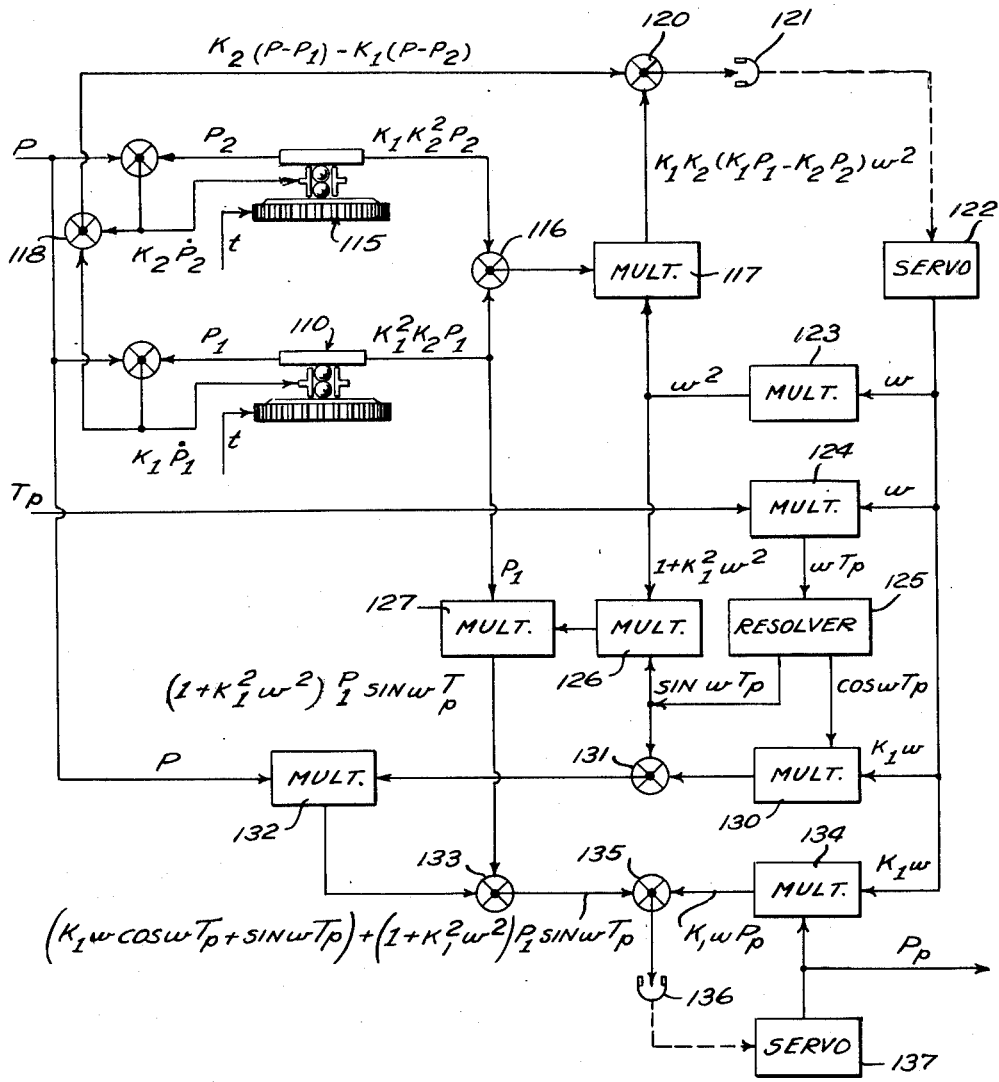
FIGURE 12 is a diagrammatic view of a form of mechanism employing integrator type follow-ups of FIGURE 11 for determining the predicted pitch angle of the deck at any future time in accordance with a simplified equation, the solid lines indicating mechanical motion and the dotted lines electrical signals.

The mechanization for solving Equations 26 and 28 for the value $P_p$ is shown diagrammatically in FIGURE 12, the solid lines indicating mechanical movement, the dotted lines indicating electrical signals. In this mechanism, the quantity P which is equivalent to $P_0$ previously discussed, i.e. the present pitch angle, derived from the stable element 21 (FIGURE 3) is introduced into the integrator type follow-up unit 110 as previously described and shown in FIGURE 11, to obtain the output $P_1$ which by proper gear ratio becomes $K_1^2K_2P_1$ and the same quantity P is introduced into a second integrator type follow-up unit 115 with proper gear ratio to obtain an output quantity $K_1K_2^2P_2$. The two output quantities $K_1^2K_2P_1$ and $K_1K_2^2P_2$ are subtracted in a differential gear 116 to give an output quantity $K_1K_2(K_1P_1-K_2P_2)$ which is multiplied in a unit 117 by $w^2$ to give the quantity $K_1K_2(K_1P_1-K_2P_2)w^2$. This latter quantity and the quantity $$K_2(P-P_1) - K_1(P-P_2)$$

derived as the output of a differential 118 having input $K_1P_1$ equal to $P-P_1$ and input $K_2P_2$ equal to $P-P_2$, multiplied by proper gear ratios $K_2$ and $K_1$ respectively, are fed into a differential 120 to obtain the difference between $K_1K_2(K_1P_1-K_2P_2)w^2$ and $$K_2(P-P_1) - K_1(P-P_2)$$

This difference operates follow-up contacts 121 controlling a servo motor 122, and when this difference is zero, the contacts are opened and the servo motor shaft will have rotated an amount corresponding to the value of $w$ in accordance with Equation 26. This quantity $w$ is squared to the value $w^2$ by the unit 123 for introduction to the multiplier 117.

For solving Equation 28, the quantity $w$ and the quantity $T_p$ derived from the prediction time computer 35 (FIGURES 3 and 8) are multiplied together in a unit 124 and the resulting product $wT_p$ is introduced into a resolver 125 to obtain component quantities $\sin wT_p$ and $\cos wT_p$. The quantity $\sin wT_p$ is fed into a multiplier 126 in conjunction with the quantity $1+K_1^2w^2$, obtained by proper gear ratio and offset of the output $w^2$ obtained from the multiplier 123, to obtain the product $$(1+K_1^2w^2) \sin wT_p$$

which is multiplied in the unit 127 by the quantity $P_1$ obtained by proper gear ratio from the output of the integrator type follow-up unit 110 to obtain the quantity $(1+K_1^2w^2)P_1 \sin wT_p$. The other component quantity $\cos wT_p$ from the resolver 125 is fed into a multiplier 130 and multiplied therein by the quantity $K_1w$ obtained by proper gear ratio from the output $w$ of the servo motor 122 to obtain a product which is fed into a differential 131 in conjunction with the component quantity $\sin wT_p$ to obtain the sum $K_1w \cos wT_p + \sin wT_p$. This latter quantity is multiplied by the quantity P in a unit 132 and the resulting product in conjunction with the product from the unit 127 is fed into a differential 133 to obtain the quantity $$(K_1w \cos wT_p + \sin wT_p) + (1+K_1^2w^2)P_1 \sin wT_p$$

This latter quantity and the quantity $K_1wP_p$ obtained from the output of a multiplier 134 into which the magnitudes $P_p$ and $K_1w$ are fed are introduced into a differential 135 to obtain the difference between $K_1wP_p$ and $(K_1w \cos wT_p + \sin wT_p) + (1+K_1^2w^2)P_1 \sin wT_p$. This difference operates follow-up contacts 136 controlling servo motor 137, and when this difference is zero, the contacts are opened and the servo motor shaft will have rotated through an angle corresponding to the value of $P_p$ in accordance with Equation 28.

*Mathematical solution for the value of predicted pitch angle $P_p$, employing spaced past values of pitch*

Let us again consider the simple expression of Equation 22 for pitch angle $$P = a \sin(wt+\phi) \qquad (22)$$

For a series of equally spaced time intervals $\tau$ in the past, namely, at $t-\tau$, $t-2\tau$, ... $t-n\tau$, this Equation 22 may be written as follows:

$$P_{-\tau} = a \sin[w(t-\tau)+\phi]$$
$$P_{-2\tau} = a \sin[w(t-2\tau)+\phi] \ldots \text{etc.}$$

Rewriting these in exponential form, we have the series of equations $$\begin{cases} P = -\dfrac{ia}{2}e^{i(wt+\phi)} \cdot 1 + \dfrac{ia}{2}e^{-i(wt+\phi)} \cdot 1 \\[4pt] P_{-\tau} = -\dfrac{ia}{2}e^{i(wt+\phi)} \cdot e^{-iw\tau} + \dfrac{ia}{2}e^{-i(wt+\phi)} \cdot e^{iw\tau} \qquad (29) \\[4pt] P_{-2\tau} = -\dfrac{ia}{2}e^{i(wt+\phi)} \cdot e^{-2iw\tau} + \dfrac{ia}{2}e^{-i(wt+\phi)} \cdot e^{2iw\tau} \ldots \\ \qquad\qquad\qquad\qquad\qquad\qquad\qquad\qquad \text{etc.} \end{cases}$$

From any three of these equations, we may eliminate the quantities $$+\dfrac{ia}{2}e^{i(wt+\phi)} \quad \text{and} \quad -\dfrac{ia}{2}e^{i(wt+\phi)}$$

thereby obtaining a series of third order determinants equated to zero. For example, the first of these is $$\begin{vmatrix} P & 1 & 1 \\ P_{-\tau} & e^{-iw\tau} & e^{iw\tau} \\ P_{-2\tau} & e^{-2iw\tau} & e^{2iw\tau} \end{vmatrix} = 0$$

Now let $x = e^{iw}$, so that the above determinant becomes $$\begin{vmatrix} P & 1 & 1 \\ P_{-\tau} & x^{-1} & x \\ P_{-2\tau} & x^{-2} & x^2 \end{vmatrix} = 0$$

or $$\begin{vmatrix} P & x^2 & 1 \\ P_{-\tau} & x & x \\ P_{-2\tau} & 1 & x^2 \end{vmatrix} = 0$$

Operating on this form, we obtain after successive reductions $$\begin{vmatrix} P+P_{-2\tau} & x^2+1 \\ P_{-\tau}, & x \end{vmatrix} = 0$$

That is $$\left.\begin{array}{l} (P+P_{-2\tau})x - P_{-\tau}(x^2+1) = 0 \\ \text{Similarly} \\ (P_{-\tau}+P_{-3\tau})x - P_{-2\tau}(x^2+1) = 0 \end{array}\right\} \qquad (30)$$

will be the relation derived from the set composed of the second, third and fourth equations in the Set 29. The fact that the pair of Equations 30 must be consistent, requires that for a pure sine wave variation, the measured values of pitch angles at the equal spaced time intervals $t-3\tau$, $t-2\tau$, $t-\tau$ and $t$ satisfy the relation $$\begin{vmatrix} P+P_{-2\tau} & P_{-\tau} \\ P_{-\tau}+P_{-3\tau} & P_{-2\tau} \end{vmatrix} = 0 \qquad (31)$$

Suppose now that we make the time interval $\tau$ equal to the prediction time $T_p$ and write $P_{-n\tau}=P_{-nT_p}=P_{-np}$. Then we may obtain the following relation similar to Equation 31

$$\begin{vmatrix} P_p+P_{-p} & P \\ P+P_{-2p} & P_{-p} \end{vmatrix}=0 \quad (32)$$

Thus, if we know from a recording of pitch angle, the magnitude of this angle at the present time and at the past time intervals $-T_p$, $-2T_p$, then we can determine the magnitude of the pitch angle at the future time $T_p$ from the Relation 32, which is a linear equation in $P_p$ of the form $$bP_p+c=0$$

where $b$ and $c$ are in general the variable coefficients, $$b=P_{-p}$$
$$c=P_{-p}^2-P^2-PP_{-2p}$$

It should be noted that this solution for the predicted pitch angle in terms of past values of the pitch angle at prescribed times does not involve the direct determination of $a$ or $w$ or $\phi$, so that these quantities remain as unknown parameters.

The above analysis may be extended to handle a pitch angle variation of the form of Equation 20, which is $$P=a_1 \sin(w_1 t+\phi_1)+a_2 \sin(w_2 t+\phi_2)$$

To carry this out, the first series of equations is written $$P=-\frac{ia_1}{2}e^{i(w_1 t+\phi_1)} \cdot e^{iw_1 T_p}+\frac{ia_1}{2}e^{-i(w_1 t+\phi_1)} \cdot e^{-iw_1 T_p}$$

$$-\frac{ia_2}{2}e^{i(w_2 t+\phi_2)} \cdot e^{-iw_2 T_p}+\frac{ia_2}{2}e^{i(w_2 t+\phi_2)} \cdot e^{-iw_2 T_p}$$

$$P=-\frac{ia_1}{2}e^{i(w_1 t+\phi_1)}$$

$$+\frac{ia_1}{2}e^{-i(w_1 t+\phi_1)}-\frac{ia_2}{2}e^{i(w_2 t+\phi_2)}+\frac{ia_2}{2}e^{-i(w_2 t+\phi_2)}$$

$$P_{-p}=-\frac{ia_1}{2}e^{i(w_1 t+\phi_1)} \cdot e^{-iw_1 T_p}+\frac{ia_1}{2}e^{-i(w_1 t+\phi_1)} \cdot e^{iw_1 T_p}$$

$$-\frac{ia_2}{2}e^{i(w_2 t+\phi_2)} \cdot e^{-iw_2 T_p}+\frac{ia_2}{2}e^{-i(w_2 t+\phi_2)} \cdot e^{iw_2 T_p}$$

$$P_{-2p}=-\frac{ia_1}{2}e^{i(w_1 t+\phi_1)} \cdot e^{-2iw_1 T_p}+\frac{ia_1}{2}e^{-i(w_1 t+\phi_1)} \cdot e^{2iw_1 T_p}$$

$$\frac{ia_2}{2}e^{i(w_2 t+\phi_2)} \cdot e^{-2iw_2 T_p}+\frac{ia_2}{2}e^{-i(w_2 t+\phi_2)} \cdot e^{2iw_2 T_p} \quad (33)$$

From the first five of the equations in the Set 33, we can eliminate the four quantities $$+\frac{ia_1}{2}e^{i(w_1 t+\phi_1)}, \quad -\frac{ia_1}{2}e^{-i(w_1 t+\phi_1)}$$

$$+\frac{ia_2}{2}e^{i(w_2 t+\phi_2)}, \quad -\frac{ia_2}{2}e^{-i(w_2 t+\phi_2)}$$

The result of this elimination written in determinant form is $$\begin{vmatrix} P_p & e^{iw_1 T_p} & e^{-iw_1 T_p} & e^{iw_2 T_p} & e^{-iw_2 T_p} \\ P & 1 & 1 & 1 & 1 \\ P_{-p} & e^{-iw_1 T_p} & e^{iw_1 T_p} & e^{-iw_2 T_p} & e^{iw_2 T_p} \\ P_{-2p} & e^{-2iw_1 T_p} & e^{2iw_1 T_p} & e^{-2iw_2 T_p} & e^{2iw_2 T_p} \\ P_{-3p} & e^{-3iw_1 T_p} & e^{3iw_1 T_p} & e^{-3iw_2 T_p} & e^{3iw_2 T_p} \end{vmatrix}=0 \quad (34)$$

Now let $e^{iw_1 T_p}=x$ and $e^{iw_2 T_p}=y$, then the Determinant 34 may be written $$\begin{vmatrix} P_p & x & x^{-1} & y & y^{-1} \\ P & 1 & 1 & 1 & 1 \\ P_{-p} & x^{-1} & x & y^{-1} & y \\ P_{-2p} & x^{-2} & x^2 & y^{-2} & y^2 \\ P_{-3p} & x^{-3} & x^3 & y^{-3} & y^3 \end{vmatrix}=0$$

and this is equivalent to $$\begin{vmatrix} P_p & x^4 & 1 & y^4 & 1 \\ P & x^3 & x & y^3 & y \\ P_{-p} & x^2 & x^2 & y^2 & y^2 \\ P_{-2p} & x & x^3 & y & y^3 \\ P_{-3p} & 1 & x^4 & 1 & y^4 \end{vmatrix}=0 \quad (35)$$

We may in like maner obtain four other determinants similar in form to (35) of which the first one is $$\begin{vmatrix} P & x^4 & 1 & y^4 & 1 \\ P_{-p} & x^3 & x & y^3 & y \\ P_{-2p} & x^2 & x^2 & y^2 & y^2 \\ P_{-3p} & x & x^3 & y & y^3 \\ P_{-4p} & 1 & x^4 & 1 & y^4 \end{vmatrix}$$

Now these five determinants are such that the minors of corresponding elements in the first column of each are equal, so that we have in effect five linear equations in five unknowns, namely, the first minors of the elements in the first column. The condition that these five equations be consistent, gives then the relation $$\begin{vmatrix} P_p & P & P_{-p} & P_{-2p} & P_{-3p} \\ P & P_{-p} & P_{-2p} & P_{-3p} & P_{-4p} \\ P_{-p} & P_{-2p} & P_{-3p} & P_{-4p} & P_{-5p} \\ P_{-2p} & P_{-3p} & P_{-4p} & P_{-5p} & P_{-6p} \\ P_{-3p} & P_{-4p} & P_{-5p} & P_{-6p} & P_{-7p} \end{vmatrix}=0 \quad (36)$$

This relation is actually a linear equation of the form $bP_p+c=0$, in which the variable coefficients $b$ and $c$ are known in terms of past values of the pitch angle. It should be noted that the number of such pitch angle measurements required to determine $P_p$ is here equal to eight which is two more than the number of parameters involved in the expression for $P$. It is therefore expected that the Relation 36 can in some manner be reduced. That this is actually the case may be shown in the following manner. Returning to the relation of Equation 35, this is equivalent to $$\begin{vmatrix} P_p & x^4-1 & 0 & y^4-1 & 1 \\ P & x^3-x & x-y & y^3-y & y \\ P_{-p} & 0 & x^2-y^2 & 0 & y^2 \\ P_{-2p} & x-x^3 & x^3-y^3 & y-y^3 & y^3 \\ P_{-3p} & 1-x^4 & x^4-y^4 & 1-y^4 & y^4 \end{vmatrix}=0$$

By a sequence of reductions, this becomes $$\begin{vmatrix} P_{-p} & x+y & y^2 \\ P+P_{-2p} & 1+x^2+xy+y^2 & y(y^2+1) \\ P_p+P_{-3p} & (x+y)(x^2+y^2) & y^4+1 \end{vmatrix} \begin{matrix} (x^2-1)(y^2-1) \\ (x-y)^2(1-xy) \\ =0 \end{matrix}$$

This relation in turn is equivalent to the linear equation $$(P_p+P_{-3p})xy-(P+P_{-2p})(x+y)(xy+1)$$
$$+P_{-p}[(xy+1)^2+x^2+y^2]=0$$

Similarly $$(P+P_{-4y})xy-(P_{-p}+P_{-3p})(x+y)(xy+1)$$
$$+P_{-2p}[(xy+1)^2+x^2+y^2]=0$$

and $$(P_{-p}+P_{-5y})xy-(P_{-2p}+P_{-4p})(x+y)(xy+1)$$
$$+P_{-3p}[(xy+1)^2+x^2+y^2]=0 \quad (37)$$

Since the set of Equations 37 must be consistent, it follows that $$\begin{vmatrix} P_p+P_{-3p}, & P+P_{-2p}, & P_{-p} \\ P+P_{-4p} & P_{-p}+P_{-3p}, & P_{-2p} \\ P_{-p}+P_{-5p} & P_{-2p}+P_{-4p} & P_{-3p} \end{vmatrix}=0 \quad (38)$$

This relation can be mechanized for the determination of the pitch prediction $P_p$, in the manner to be described.

The quantity P in the Relation 38 is the quantity $P_0$, the present pitch angle, which is available as a shaft rotation from the stable element 21 (FIGURE 3), as already described. The quantities $P_{-p}, P_{-2p} \ldots P_{-5p}$ giving past values of pitch angle at the respective times $-T_p$, $-2T_p \ldots -5T_p$, or represented as $-p, -2p \ldots$ etc., are available as voltages proportional to them by a mechanism to be described and shown in FIGURES 15, 16 and 17. The Relation 38 with the substituted notations indicated is equivalent to the set of three simultaneous linear equations $$(P_p+P_{-3p})X+(P_0+P_{-2p})Y+P_{-p}=0 \quad (39)$$
$$(P_0+P_{-4p})X+(P_{-p}+P_{-3p})Y+P_{-2p}=0 \quad (40)$$
$$(P_{-p}+P_{-5p})X+(P_{-2p}+P_{-4p})Y+P_{-3p}=0 \quad (41)$$

Where X and Y are functions of the unknown angular velocities $w_1$ and $w_2$ of the harmonic motions of which the pitch angle is assumed to be composed. The general method of solution adopted is first to determine X and Y from the second and third Equations 40 and 41. These values may next be substituted in the first Equation 39 which can then be solved for the desired quantity $P_p$. Since it is desired to solve Equations 40 and 41 by means of feed-back, as will be described, we must determine the necessary conditions for this process to be stable. This is equivalent arithmetically speaking, to determining an iteration process for approximating X and Y which is convergent to their true values. Suppose initially that Equations 40 and 41 are not satisfied, so that we may write them $$(P_0+P_{-4p})X+(P_{-p}+P_{-3p})Y+P_{-2p}=\epsilon_2 \text{ (error signal)} \quad (42)$$
$$(P_{-p}+P_{-5p})X+(P_{-2p}+P_{-4p})Y+P_{-3p}=\epsilon_3 \text{ (error signal)} \quad (43)$$

We then form the expression $$\mu=\epsilon_2^2+\epsilon_3^2 \quad (44)$$

If now we can arrange the mechanism so that the rate of change of $\mu$ is never positive and not equal to zero unless $\epsilon_2$ and $\epsilon_3$ are zero, then since $\mu$ is always positive from (44), the limit of $\mu$ as time increases must be zero and hence the limits of $\epsilon_2$ and $\epsilon_3$ must also be zero. We have for the time rate of change of $\mu$ the expression $$\frac{d\mu}{dt}=\frac{\partial\mu}{\partial X}\cdot\frac{dX}{dt}+\frac{\partial\mu}{\partial Y}\cdot\frac{dY}{dt} \quad (45)$$

Suppose in Equation 45, we let $$\frac{dX}{dt}=\frac{-k_1\partial\mu}{\partial X} \quad (46)$$

and $$\frac{dY}{dt}=\frac{-k_2\partial\mu}{\partial Y} \quad (46)$$

where $k_1$ and $k_2$ are positive constants. Then $$\frac{d\mu}{dt}=-k_1\left(\frac{\partial\mu}{\partial X}\right)^2-k_2\left(\frac{\partial\mu}{\partial Y}\right)^2 \quad (47)$$

a quantity which is always negative or zero. The partial derivative $$\frac{\partial\mu}{\partial X}$$

is obtained after substituting into Equation 44 the values of $\epsilon_2$ and $\epsilon_3$ given by Equations 42 and 43, so that $$\mu=[(P_0+P_{-4p})X+(P_{-p}+P_{-3p})Y+P_{-2p}]^2$$
$$+[(P_{-p}+P_{-5p})X+(P_{-2p}+P_{-4p})Y+P_{-3p}]^2$$

and $$\frac{\partial\mu}{\partial X}=2(P_0+P_{-4p})[(P_0+P_{-4p})X+(P_{-p}+P_{-3p})Y+P_{-2p}]$$
$$+2(P_{-p}+P_{-5p})[(P_{-p}+P_{-5p})X+(P_{-2p}+P_{-4p})Y+P_{-3p}]$$

or $$\frac{\partial\mu}{\partial X}=2(P_0+P_{-4p})\epsilon_2+2(P_{-p}+P_{-5p})\epsilon_3$$

Similarly $$\frac{\partial\mu}{\partial Y}=2(P_{-p}+P_{-3p})\epsilon_2+2(P_{-2p}+P_{-4p})\epsilon_3$$

These expressions for the partial derivatives are substituted in Equations 46, resulting in $$\frac{dX}{dt}=-2k_1[(P_0+P_{-4p})\epsilon_2+(P_{-p}+P_{-5p})\epsilon_3] \quad (48)$$

and $$\frac{dY}{dt}=-2k_2[(P_{-p}+P_{-3p})\epsilon_2+(P_{-2p}+P_{-4p})\epsilon_3] \quad (49)$$

or $$X=X_0-2k_1\int_0^t[(P_0+P_{-4p})\epsilon_2+(P_{-p}+P_{-5p})\epsilon_3]dt$$

and $$Y=Y_0-2k_2\int_0^t[(P_{-p}+P_{-3p})\epsilon_2+(P_{-2p}+P_{-4p})\epsilon_3]dt$$

It is apparent that in the mechanism, an appropriate linear combination of the error signals $\epsilon_2$ and $\epsilon_3$ must be formed before feeding these quantities back into the mechanism to adjust the magnitudes of X and Y in such a manner than they converge to the correct values, obtained when $\epsilon_2$ and $\epsilon_3$ are both zero.

In the above analysis, it was assumed that the various coefficients, such as $P_0+P_{-2p}$ were constant. Actually, these quantities will go thru a cycle of sinusoidal variation in about ten seconds. Hence, the quantity $$\frac{d\mu}{dt}$$

must be large in comparison with the rate of change of any of the coefficients. It can be shown that Equation 47 may be replaced by the inequality $$\frac{d\mu}{dt}<-C\mu$$

where C is a positive constant or $$\frac{d\mu}{dt}=-C\mu \quad (50)$$

in which $$\frac{d\mu}{dt}$$

has the least absolute value.
Integration of Equation 50 gives $$\mu=\mu_0 e^{-Ct}$$

Here, the constant C may be made as large as desired by increasing the sensitivity constants $k_1$ and $k_2$. As a result, the settling time can be made short enough so that X and Y follow their values corresponding to the changing set of coefficients.

Special conditions would arise when $w_1=w_2$. In such a case, Equations 40 and 41 are not independent and their formal solution would give indeterminate values for X and Y. However, the mechanism to be described, as constructed will still give some pair of values for X and Y which satisfy Equations 40 and 41 and there will be a singly infinite set of such solution pairs. Hence, we shall have for any value of X $$Y = -\frac{P_{-2p} + (P_0 + P_{-4p})X}{(P_{-p} + P_{-3p})}$$

If now this value of Y is substituted in Equation 39, the result is equivalent to $$[(P_p + P_{-3p})(P_{-p} + P_{-3p}) - (P_0 + P_{-2p})(P_0 + P_{-4p})]X + P_{-p}(P_{-p} + P_{-3p}) - P_{-2p}(P_0 + P_{-2p}) = 0$$

But for $w_1=w_2$, we have the relations $$\begin{vmatrix} P_p & +P_{-p}, & P_0 \\ P_0 & +P_{-2p}, & P_{-p} \\ P_{-p} & +P_{-3p}, & P_{-2p} \\ P_{-2p} & +P_{-4p}, & P_{-3p} \end{vmatrix} = 0 \quad (51)$$

Hence
$$P_{-p}(P_{-p}+P_{-3p}) - P_{-2p}(P_0+P_{-2p}) = 0$$

Accordingly,
$$[(P_p+P_{-3p})(P_{-p}+P_{-3p}) - (P_0+P_{-2p})(P_0+P_{-4p})]X = 0$$

and therefore $P_p$ is independent of X. However, no solution is given by the mechanism if $X=0$. When $X \neq 0$, we obtain $$P_p = \frac{(P_0+P_{-p})(P_0+P_{-4p})}{(P_{-p}+P_{-3p})} - P_{-3p}$$

or $$P_p = \frac{(P_0^2 + P_0 P_{-2p} - P_{-p}^2) + (P_0 P_{-2p} + P_0 P_{-4p} - P_{-p} P_{-3p})}{(P_{-p}+P_{-3p})} \quad (52)$$

in accordance with Relation 51. The solution given by Equation 52 is satisfactory if $P_{-p}+P_{-3p} \neq 0$.

Therefore, there is obtained for $w_1=w_2$, the correct value of $P_p$ independently of the particular value of X, so long as $X \neq 0$ and $P_{-p}+P_{-3p} \neq 0$. We have now two conditions to consider. In the first condition, we may have $X=0$ instantaneously due to the temporary vanishing of the determinant.

$$\begin{vmatrix} P_{-p}+P_{-3p} & P_{-2p} \\ P_{-2p}+P_{-4p} & P_{-3p} \end{vmatrix}$$

when $w_1 \neq w_2$. This event will not disturb the continuity of the solution for $P_p$. In the second condition, however, X might conceivably remain on zero for an appreciable time. This is possible only when $w_1=w_2$ and X is indeterminate. Thus we make provision here by means of a time delay relay operating when $X=0$ for time $\tau$ to ensure that X has an arbitrary non-zero value. A similar situation exists in regard to the quantity $(P_{-p}+P_{-3p})$. Thus $P_{-p}+P_{-3p}$ will remain on zero for an appreciable time only if $w_1=w_2=0$. If $P_{-p}+P_{-3p}=0$ for an appreciable time, it indicates that there is not pitch motion and hence $P_{-p}=P_0$, in which case a time delay relay is employed to take care of this situation.

*Pitch prediction computer for $P_p$ employing past values of pitch angle as inputs*

The mechanism 144 for solving equations $$(P_p+P_{-3p})X + (P_0+P_{-2p})Y + P_{-p} = \epsilon_1 \to 0 \quad (39a)$$

$$(P_0+P_{-4p})X + (P_{-p}+P_{-3p})Y + P_{-2p} = \epsilon_2 \to 0 \quad (40a)$$

$$(P_{-p}+P_{-5p})X + (P_{-2p}+P_{-4p})Y + P_{-3p} = \epsilon_3 \to 0 \quad (41a)$$

equivalent to Equations 39, 40 and 41 is illustrated in FIGURES 13, 13a and 14. In this illustration, the mechanical movements such as shaft rotations, are indicated in full lines and the electrical signals such as voltage signals are indicated in dotted lines.

The pitch prediction computer 144 illustrated in FIGURES 13 and 13a requires as inputs besides the present pitch angle $P_0$, the past pitch angles $P_{-p}$, $P_{-2p}$, $P_{-3p}$, $P_{-4p}$ and $P_{-5p}$ as shaft rotations. These past pitch values $P_{-kp}$ are obtained as voltage signals as shown in FIGURE 15, 16 and 17, in a manner to be described, and are then converted into shaft rotations proportional to these voltages by a servo follow-up control unit 145 shown in FIGURE 14, for introduction into the pitch prediction computer of FIGURES 13 and 13a. This follow-up unit 145 is similar to the follow-up unit 93 employed in the heave meter of FIGURE 10 for converting the amplified output voltage of the signal generator 90 into a shaft rotation. For that purpose, there is employed an adding network 146 constituting the servo control and an amplifier 147 for the output signal from the adding network. A potentiometer 148 supplies the matching voltage and a generator 150 supplies antcipation to prevent oscillation of a servo motor 151 while following a variable signal.

Having now obtained all the necessary quantities $P_{-kp}$, and having available $P_0$ as the shaft rotational output of the stable element 21 (FIGURE 3), we add these quantities by the mechanical differentials 155, 156, 157, 158 and 160 (FIGURE 13 and 13a) to obtain the coefficients $$P_0+P_{-2p}$$
$$P_0+P_{-4p}$$
$$P_{-p}+P_{-3p}$$
$$P_{-p}+P_{-5p}$$
$$P_{-2p}+P_{-4p}$$

respectively, in Equations 39a, 40a and 41a.

The next step is to obtain voltages proportional to the terms in the three Equations 39a, 40a and 41a. For example, the term $(P_0+P_{-4p})X$ for Equation 40a is required as a voltage. As indicated in FIGURE 13, this voltage is the output of a potentiometer 161 whose inputs are X, constituting the feedback voltage on the winding, and $P_0+P_{-4p}$, the mechanical setting of the potentiometer slider, drevied from the mechanical differential 156. Similarly, the term $(P_{-p}+P_{-3p})Y$ for Equation 40a is obtained as the output of a potentiometer 162, whose inputs are the feed-back voltage Y and the value $P_{-p}+P_{-3p}$ derived from the mechanical differential 157. The three voltages $(P_0+P_{-4p})X$, $(P_{-p}+P_{-3p})Y$ and $P_{-2p}$ (original signal without conversion into shaft rotation) are now added in a network 163 to obtain as output the error signal $\epsilon_2$ which is zero when the Equation 40a is satisfied.

In a similar manner, through the potentiometers 164 and 165, we obtain voltage signals $(P_{-p}+P_{-5p})X$ and $(P_{-2p}+P_{-4p})Y$, and these are combined in the network 166 with the original signal $P_{-3p}$ (without conversion into shaft rotation) to obtain as output the error signal $\epsilon_3$, which is zero when the Equation 41a is satisfied.

In the method of solution here adopted, the error signals $\epsilon_2$ and $\epsilon_3$ must be combined in definite linear combination for each feed-back, in order to secure stability of operation, as previously shown. These linear combinations are given in Equations 48 and 49. Thus the voltage $\epsilon_2$ is applied to the winding of a potentiometer 168, whose slider input is $P_0+P_{-4p}$, a power driven rotation, to obtain the output voltage $2(P_0+P_{-4p})\epsilon_2$. Likewise, the voltage $2(P_{-p}+P_{-5p})\epsilon_3$ is obtained as the output of a potentiometer 169. These two voltages are added in the adding network 170 to obtain the output $$\frac{dX}{dt} = \dot{X} = -2K_1[(P_0+P_{-4p})\epsilon_2 + (P_{-p}+P_{-5p})\epsilon_3]$$

in accordance with the theory of stability previously developed and indicated by Equation 48.

Similarly, through a potentiometer 171, an output is obtained therefrom having the magnitude $$2(P_{-2p}+P_{-4p})\epsilon_3$$

and through a potentiometer 172, an output is obtained therefrom having the magnitude $2(P_{-p}+P_{-3p})\epsilon_2$. These two voltages are added in the adding network 173 in accordance with Equation 49 to obtain $$\frac{dY}{dt}=\dot{Y}=-2k_2[(P_{-p}+P_{-3p})\epsilon_2+(P_{-2p}+P_{-4p})\epsilon_3]$$

The voltages $\dot{X}$ and $\dot{Y}$ are then fed to the integrating networks 174 and 175 respectively to obtain output voltage $X_1$ proportional to voltage $X$ from one network and voltage $Y_1$ proportional to voltage $Y$ from the other network. As long as $X_1 \neq 0$, $X_1 = X$.

Having the voltages $X$ and $Y$, we now deal with Equation 39a to obtain the desired pitch prediction $P_p$. For that purpose, we add the quantities $P_{-3p}$ and $P_p$ (output of computer) in a mechanical differential 176 to obtain the quantity $P_p+P_{-3p}$ which is imposed on a potentiometer 177 in conjunction with the voltage $X$ to obtain the voltage quantity $(P_p+P_{-3p})X$. Similarly, the quantity $P_0+P_{-2p}$ from the differential 155 and the voltage $Y$ are imposed on the potentiometer 178 to obtain the voltage $(P_0+P_{-2p})Y$. The voltages $(P_p+P_{-3p})X$ and $$(P_0+P_{-2p})Y$$

and the quantity $P_{-p}$ employed in its original voltage form without conversion into shaft rotation, are added in a network 180 to obtain the error signal $\epsilon_1$ in accordance with Equation 39a. To obtain stability of feed back for this single Equation 39a, we must have according to the original analysis $$P_p X + P_{-3p} X + (P_0 + P_{-2p})Y + P_{-p} = \epsilon_1$$

equivalent to Equation 39a.

$$\mu = \epsilon_1^2$$

$$\frac{d\mu}{dt}=\frac{\partial \mu}{\partial P_p}\cdot\frac{dP}{dt}p=-k\left(\frac{\partial \mu}{\partial P_p}\right)^2$$

$$\frac{\partial \mu}{\partial P_p}=2X\epsilon_1$$

$$\dot{P}_p = -2kX\epsilon_1$$

$$P_p = -2k\int_0^t X\epsilon_1 dt \quad (54)$$

Hence, by multiplying the error signal $\epsilon_1$ by the quantity $X$ and integrating the product, there is obtained the feedback $P_p$. The settling time can be made sufficiently small by increasing the sensitivity factor $k$.

To obtain the quantity $P_p$ in the final stages of the computer in accordance with the Equation 54, the voltage $X$ is converted into a corresponding shaft rotation by a follow-up unit 181, similar to that illustrated in FIGURE 14, and this shaft rotation and the error voltage signal $\epsilon_1$ are supplied to a potentiometer 182 to obtain the quantity $\dot{P}_p$ which after integration in the network 183 results in the value $P_p$ as a voltage. This voltage $P_p$ is converted into corresponding shaft rotation before being sent out of the computer, by a follow-up unit 184 similar to the follow-up unit of FIGURE 14.

As already indicated, there are two conditions that must be provided for to assure continuous operation of the computer. Those conditions are when $X=0$ for an appreciable time $\tau$ and when $P_{-p}+P_{-3p}=0$ for a time $\tau$ which may amount to about 0.1 of a second. For that purpose, there is provided a time delay relay unit 185 having one mechanical element operated by the mechanical quantity $P_{-p}+P_{-3p}$ and having a lead from a voltage reference source connecting through a switch in said unit into a line connecting into a relay unit 186 located between the integrating network 183 and the follow-up unit 184. When the quantity $P_{-p}+P_{-3p}$ equals zero, indicating there is no pitch motion and that therefore $P_p=P_0$, this condition imposed on the time delay relay unit 185, will cause a switch to close in said unit, so that the reference voltage actuates a relay in the unit 186 and closes thereby a circuit from a signal line carrying a voltage signal $P_0$ to the outlet of said unit and in turn to the output of the computer, while the connection in said unit 186 from the outlet of the integrating network 183 to the inlet of the follow-up unit 184 is opened. As soon as normal conditions are restored in which $P_{-p}+P_{-3p} \neq 0$, the switch in the unit 185 establishing a circuit between the voltage reference line and the unit 186 is opened, so that the $P_p$ signal from the output of the integrating network 183 has a through circuit through said unit 186 to the follow-up unit 184, while the circuit of the voltage signal $P_0$ is opened.

To provide for the condition when $X=0$ for the time $\tau$, there is provided a time delay relay unit 190 between the integrating network 174 and the potentiometer 177. When $X_1=0$, a relay in the unit 190 closes a switch therein to establish connection between a voltage reference signal line and the output of said unit, while the circuit between the output of the integrating network 174 and the output of said unit is opened. At that instant, $X=V$ ref. When $X_1$ is no longer equal to zero, the circuit between the voltage reference signal line and the output of the relay unit 190 is opened, while the through circuit between the output of the integrating network 174 and the output of the relay unit 190 is reestablished.

*Mechanism for determining past values of pitch angle and converting them into signals for use in pitch prediction computer*

In the pitch prediction computer of FIGURE 13, the past values of pitch angle at the respective times $-T_p$, $-2T_p \ldots -5T_p$ were employed as inputs, some in the form of voltages and others in the form of shaft rotations. Before such quantities are obtained, a recording of the pitch angle $P_0$ in the form of a black single line curve on a white background is made. This recording is made from the output of the stable element 21 (FIGURE 3) in any suitable manner, as for example in the manner shown in FIGURE 15. For example, the stable element 21 is made to rotate a screw 200 in accordance with the variation in pitch angle with time. This screw 200 has threaded thereon a sleeve 201 carrying a pen 202 registering on a roll 203 moving lengthwise at a predetermined constant rate to produce an undulating record 204 which is a measure of the pitch angle of the carrier deck. In accordance with one method of the present invention, the quantities $P_{-p}, P_{-2p} \ldots P_{-5p}$ representing the amplitudes of the record 204 are picked off at corresponding times $-T_p, -2T_p$, etc. and translated into voltages. For that purpose, the past record 204 is continuously focused as shown in FIGURE 16 on the screen 205 of a television pick-up camera 206. This past record should cover the range $t=0$ to $t=-5T_p$ where $T_p$ has some maximum value, say 30 seconds, as shown in FIGURE 15. Accordingly, the horizontal displacement of the camera scanning beam will represent time while the vertical displacement will represent amplitude or the magnitude of $P_{-t}$. Therefore, the scanning beam deflection coil circuit is arranged to obtain a single vertical sweep at horizontal deflections corresponding to the times $-T_p, -2T_p, -3T_p, -4T_p$ and $-5T_p$ in succession. If now, a charging circuit is triggered at the start of the vertical sweep and is opened by means of the pulse occurring when the vertical sweep beam crosses the curve image, there is obtained a voltage which, when diminished by a reference voltage, will be proportional to the amplitude of pitch at the time required. This arrangement is illustrated in FIGURE 15 for the vertical sweep at $t=-2T_p$.

The complete scanning cycle, consisting of the five vertical sweeps might be carried out hundreds of times per second, so that the five output voltages representing $P_{-kp}$ would after appropriate smoothing be quite continuous and suitable for transformation to mechanical rotations for use in connection with the pitch prediction computer of FIGURE 13. The devices necessary to carry out the operations indicated are shown in FIGURES 16, 17 and 18. In FIGURE 17, the solid lines represent electric signals and the dotted lines mechanical displacements, and specifically shaft rotations.

Referring specifically to FIGURE 17, the pitch pickoff and signal modifier system 209 shown comprises a crystal or oscillator 210 of well-known type, which is the primary source for the timing of all the operations and steps of the system. The oscillating rate of the crystal oscillator 210 is not important from the point of view of actual time measurements, since a submultiple of rate is employed in the system to control the sequences of operation at predetermined time intervals. The frequency of oscillation of the crystal oscillator 210 may be in the neighborhood of 100 kilocycles and this may be reduced to possible 5 kc. by frequency division, to give for example 1000 complete cycles of operation of the system per second.

The output of the crystal oscillator 210 is a sinusoidal voltage of predetermined frequency, as for example 5 kc. frequency. This voltage is applied to the control grid of a multi-grid high-gain tube in an amplifier clipper 211 of standard construction to amplify the signal from the crystal oscillator and at the same time clip off the crests of the sine wave voltages to produce a square wave voltage more suitable for the timing and synchronizing of the different operations of the system.

The output from the amplifier clipper 211 is imposed upon a sampler gate generator 212 which has connections to five circuits, each adapted to produce an electrical signal corresponding to one of the past values of pitch angle desired. This sampler gate generator 212 is essentially a combination of five multi-vibrators, one for each circuit and supplies during each complete cycle of operations, five pulses in succession, one to each of the separate circuits. Each of these impulses serves to close a connection (by rendering a tube conductive) through a gated amplifier 213 and a gated sweep cut-off 214, in one of the five circuits corresponding to the phase of the impulse. The sampler gate generator 212 and the five gated generators 213 serve thereby essentially as an electronic commutator.

Each of the gated amplifiers 213 is of standard well known construction and consists essentially of a tube with two grids, the screen grid being connected to the sampler gate generator 212, the control grid being connected to a voltage proportional to $-nT_p$. The gated amplifiers 213 are normally non-conducting. When an impulse is received by a gated amplifier 213 from the sampler gate generator 212, said gated amplifier becomes conducting and an impulse is sent thereby proportional in voltage to $-nT_p$ to a pick-off iconoscope 215 (FIGURES 16 and 17). This positions an electron beam 216 in said iconoscope in the horizontal or time direction. The beam is then in position to scan vertically across the image of the curve 204 (FIGURES 15 and 16) projected upon the iconoscope mosaic 205.

Each gated amplifier 213 has two inputs, one from the sampler gate generator 212, as described and the other from a voltage divider 218 comprising a series of resistances 220, arranged to divide an incoming voltage which is proportional to $-5T_p$ and to allocate to each of the five gated amplifiers 213 a voltage proportional to the value of $-nT_p$ selected for the circuit of that amplifier. The input voltage into the system is obtained from a shaft rotation (dotted lines) representing $T_p$ obtained from the prediction time computer 35 (FIGURES 3 and 8). This shaft rotation is made the input of a linear potentiometer 221 (FIGURE 17) having a certain constant reference voltage applied to its total resistance. The output voltage of the potentiometer is therefore proportional to $-5T_p$, and this voltage is applied to the terminal of the voltage divider 218 having the five fixed resistances 220 between taps. In this manner, voltages proportional to $-5T_p$, $-4T_p$, $-3T_p$, $-2T_p$ and $-T_p$ are obtained as inputs to the control grids of the gated amplifiers 213.

When a gated amplifier 213 becomes conducting as the result of an impulse received from the sampler gate generator 212, as already described, the voltage passing through said gated amplifier proportional to $-nT_p$ is impressed upon the pick-off iconoscope 215, and this deflects its electron beam 216 horizontally to the abscissa value corresponding to the $-nT_p$ value of the image to be scanned. The extent of horizontal deflection of the electron scanning beam 216 is dependent upon the voltages impressed and is controlled from the crystal oscillator 210 through the amplifier clipper 211, as will be described, and since these voltages are proportional to the values $-nT_p$, the location of the scanning beam in its proper horizontal position is assured.

As soon as the electron scanning beam 216 from the iconoscope 215 has been properly located horizontally, an impulse is sent from the oscillator controlled amplifier clipper 211 to a vertical sweep generator 223, and this initiates the vertical sweep of the electron beam 213 along the selected $-nT_p$ abscissa value.

The vertical sweep generator 223 is of standard well known construction and includes a charging condenser. As the electron beam 216 moves vertically the condenser is charged at a voltage which ordinarily is exponential in character but which is linearized by means of a boot-strap circuit, so that the characteristics of this voltage during the vertical sweep are as indicated in FIGURE 15. As the electron beam 216 in its vertical sweep crosses the image being scanned, an impulse or pip is sent from the iconoscope 215 to a buffer amplifier 224 of well-known construction, to amplify the impulse and also to isolate the iconoscope 215 from a trigger circuit 226.

The electron beam 216 continues its vertical sweep beyond the crossing point of the image being scanned to a predetermined point and then returns vertically but more quickly towards its original position for the next horizontal sweep sequence. During this return trace, the electron beam 216 recrosses the image being scanned, and may send another impulse from the iconoscope 215 towards the buffer-amplifier 224. To prevent this condition, a blanking gate generator 227 is provided controlled from the oscillator 210 through the amplifier clipper 211 and serving to impose a blanking voltage to the buffer amplifier 224 during vertical return trace or fly-back time.

The trigger circuit 226 serves to freeze or clamp the voltage developed during charging in the vertical sweep generator 223 to the value it had when the electron beam 216 crossed the image being scanned. This voltage while it is building up in the vertical sweep generator 223 during the vertical sweep of the electron beam 216 is amplified in a sweep amplifier 228 and then impressed upon one of the gated sweep cut-offs 214 in the $-nT_p$ circuit.

Each gated sweep cut-off 214 (FIGURES 17 and 18) comprises a gated amplifier 230 connected to a diode circuit 231 and having its screen grid connected to a bistable trigger circuit 232 incorporated as part of said cut-off, and its control grid connected to the output of the sweep amplifier 228. One of the triode tubes 233 of the trigger circuit 232 has its grid connected to the output of the sampler gate generator 212 and is conductive in stable condition of the trigger circuit, while the other triode tube 234 of said trigger circuit has its grid connected to the output of the trigger circuit 226 and is non-conductive in stable condition of the trigger circuit 232. As soon as a gated amplifier 213 is rendered conductive by an impulse from a corresponding multi-vibrator unit in the sampler gate generator 212, this impulse is sent at the same time to the corresponding gated sweep cut-off 214 and through the conducting triode tube 233 in the trigger circuit 232 of said cut-off, as a positive impulse upon the screen grid of the gated amplifier 230. When a voltage is impressed upon the control grid of a gated amplifier 230 by an impulse from the sweep amplifier 228 generated when the electron scanning beam 216 starts its vertical scanning sweep, the gated amplifier 230 in the cut-off 214 becomes conductive, so that a linearly increasing voltage is conducted through said gated amplifier and through the diode circuit 231. When the electron scanning beam 216 during its vertical sweep crosses the image, the resulting impulse from the buffer amplifier 224 impressed upon the trigger circuit 226 causes said circuit to send out a negative impulse to the grid of the triode tube 234 in the trigger circuit 232 of the gated sweep cut-off 214, and causes thereby the tube 233 of said trigger circuit 232 to become non-conductive and the other tube 234 to become conductive. The resulting negative impulse impressed upon the screen grid of the gated amplifier 230 of the cut-off 214 renders said amplifier non-conductive, so that the charging voltage in the diode circuit 231 which has been increasing is clamped at the value it had upon the image crossing. The difference between this clamped voltage and a reference voltage is available at the outlet of the diode circuit 231 and this output value which is proportional to $P_{-np}$ as indicated in FIGURE 15 is smoothed by a network 236, so that a continuous value of $P_{-np}$ is obtained.

The trigger circuit 226 shown in FIGURE 18 is monostable and comprises a triode 240 and a triode 241 having a common cathode resistor 242, so that when triode 240 is conducting, triode 241 is cut off. During normal conditions, the trigger circuit 226 is in stable condition, i.e. the tube 240 is conducting and the tube 241 is not conducting, and no impulse is being sent from the trigger circuit 226 to the gated sweep cut-off 214. When a negative impulse is received from the buffer amplifier 224 as a result of the electron beam 216 crossing the image being scanned, it is amplified by the tube 240 and applied as a positive impulse to the grid of the tube 241. This causes the voltage on grid of the tube 240 to assume negative value, cutting-off tube 240 while tube 241 starts conducting. The output of the trigger circuit 226 to the gated sweep cut-off 214 also assumes a negative value and this serves to freeze or clamp the charging voltage to the value dependent upon the curve image crossover point of the electron beam 216 as described.

Although the five $P_{-np}$ circuits are activated successively through the sequential impulses sent out from the sampler gate generator 212 successively to said circuits, the voltage quantities $P_{-5p}$, $P_{-4p}$, $P_{-3p}$, $P_{-2p}$, and $P_{-p}$ are continuously and simultaneously obtained and these are made available to the pitch prediction computer shown in FIGURES 13 and 14, after being converted into corresponding shaft rotations by follow-up units such as shown in FIGURE 14.

The present pitch angle $P_0$ which is obtained as a shaft rotation from the output of the stable element 21 (FIGURE 3) is made available as a voltage signal for use in connection with the switch 186 in the pitch prediction computer of FIGURE 13, by applying the present pitch angle $P_0$ as a slider displacement to potentiometer 245 (FIGURE 17) and at the same time applying a reference voltage to said potentiometer. The output of this potentiometer 245 will be an electric signal.

*Mathematical solution for determining predicted pitch angle $P_p$ employing other past values of pitch angle*

It is possible to modify the Relation 38, so that it is not necessary to take observations of P so far back in the past. For example, we may write $P_{(k+q)T_p} + P_{(k-q)T_p}$
$= a_1 \sin(w_1[t+(k+q)T_p]+\phi_1)$
$+ a_2 \sin(w_2[t+(k+q)T_p]+\phi_2)$
$+ a_1 \sin(w_1[t+(k-q)T_p]+\phi_1)$
$+ a_2 \sin(w_2[t+(k-q)T_p]+\phi_2)$ and using the formula for the sum of the sines of two angles $P_{(k+q)T_p} + P_{(k-q)T_p}$
$= 2a_1 \sin[w_1(t+kT_p)+\phi_1] \cos qw_1 T_p$
$+ 2a_2 \sin[w_2(t+kT_p)+\phi_2] \cos qw_2 T_p$ (56)

Similarly $P_{(k+m)T_p} + P_{(k-m)T_p}$
$= 2a_1 \sin[w_1(t+kT_p)+\phi_1] \cos mw_1 T_p$
$+ 2a_2 \sin[w_2(t+kT_p)+\phi_2] \cos mw_2 T_p$ (57)

$P_{(k+n)T_p} + P_{(k-n)T_p}$
$= 2a_1 \sin[w_1(t+kT_p)+\phi_1] \cos nw_1 T_p$
$+ 2a_2 \sin[w_2(t+kT_p)+\phi_2] \cos nw_2 T_p$ (58)

In these equations, $k$, $q$, $m$ and $n$ are constant multipliers for the prediction time intervals.

The two quantities $-2a_1 \sin[w_1(t+kT_p)+\phi_1]$ and $-2a_2 \sin[w_2(t+kT_p)+\phi_2]$ may be eliminated from the three Equations 56, 57, and 58 to produce the relation $$\begin{vmatrix} P_{(k+q)T_p}+P_{(k-q)T_p}, & \cos qw_1 T_p, & \cos qw_2 T_p \\ P_{(k+m)T_p}+P_{(k-m)T_p}, & \cos mw_1 T_p, & \cos mw_2 T_p \\ P_{(k+n)T_p}+P_{(k-n)T_p}, & \cos nw_1 T_p, & \cos nw_2 T_p \end{vmatrix} = 0 \quad (59)$$

Two relations similar to (59) can be obtained by replacing $k$ by $k'$ and $k''$.

Thus a generalization of the Equation 38 is obtained by eliminating the expressions involving $w_1$ and $w_2$ from the relation 59 and the two similar relations. The result is finally $$\begin{vmatrix} P_{(k+q)T_p}+P_{(k-q)T_p}, & P_{(k+m)T_p}\\ \quad +P_{(k-m)T_p}, & P_{(k+n)T_p}+T_{(k-n)T_p} \\ P_{(k'+q)T_p}+P_{(k'-q)T_p}, & P_{(k'+m)T_p}\\ \quad +P_{(k'-m)T_p}, & P_{(k'+n)T_p}+P_{(k'-n)T_p} \\ P_{(k''+q)T_p}+P_{(k''-q)T_p}, & P_{(k''+m)T_p}\\ \quad +P_{(k''-m)T_p}, & P_{(k''+n)T_p}+P_{(k''-n)T_p} \end{vmatrix} = 0$$

(60)

Relation 38 is the special case of 60 with $k=-1 \quad q=+2$
$k'=-2 \quad m=+1$
$k''=-3 \quad n=0$ It is apparent that we must have $k'' < k' < k < 0$ since if $k=0$, then $P_q$ or $P_{-q}$ and $P_m$ or $P_{-m}$ are both unknown future values of P whereas only one future value of P is desired and can be determined from the Relation 60 alone. We also have the simple relations $k+q=1 \quad q-m=1$
$k+m=0$ or $k-k'=1$
$k'+q=0$ If, for example, $k=-\frac{1}{2}$ then $q=\frac{3}{2}$, $m=\frac{1}{2}$, $k'=-\frac{3}{2}$.

In addition, we might take $n=0$, $k''=-2$ and let $T_p$ be represented by $p$, so that the Relation 60 becomes $$\begin{vmatrix} P_p+P_{-2p} & , & P_0+P_{-p} & , & 2P_{-1/2p} \\ P_0+P_{-3p} & , & P_{-p}+P_{-2p} & , & 2P_{-3/2p} \\ P_{-1/2p}+P_{-7/2p}, & P_{-3/2p}+P_{-5/2p}, & 2P_{/2p} \end{vmatrix}=0 \quad (61)$$

It should be noted that observations are required at the past intervals given by $-\frac{1}{2}T_p$, $-T_p$, $-\frac{3}{2}T_p$, $-2T_p$, $-\frac{5}{2}T_p$, $-3T_p$, and $-\frac{7}{2}T_p$ as well as the present, making eight observations in all. This number is two more than the minimum number of observations required as dictated by the 6 parameters involved. Using the Relation 61, the time interval required for past sampling is reduced from $-5T_p$ to $-\frac{7}{2}T_p$ or by 30 percent.

Another such relation requiring nine observations is $$\begin{vmatrix} P_p+P_{-3/2p} & , & P_0+P_{-1/2p} & , & P_{-1/4p} \\ P_0+P_{-5/2p} & , & P_{-p}+P_{-3/2p} & , & P_{-5/4p} \\ P_{-1/4}+P_{-11/4p}, & P_{-5/4p}+P_{-7/4p}, & P_{-3/2p} \end{vmatrix}=0$$

and here the reduction in time interval is 45 percent.

The means for obtaining the values of pitch angle in the past at the special intervals indicated is similar to that shown in FIGURES 15–18, and the mechanism for predicting the pitch angle $P_p$ from these past quantities would be similar to that shown in FIGURES 13 and 14.

Mathematical solution for determining predicted pitch angle $P_p$, knowing derivatives or integrals of the present pitch angle $P$.

It is mechanically feasible to obtain accurate values of derivatives or integrals of $P$ (present pitch angle). Having available the value of $P$ and the values of five derivatives or integrals of $P$, it is possible to determine the angular velocities, $w_1$ and $w_2$, of the two sine wave components composing the assumed motion of $P$. From the quantities $w_1$ and $w_2$, it is then possible either mathematically or mechanically to determine the amplitudes and phase angles of the two sine wave components which approximate the actual motion. This process is carried out continuously so that the approximation is continuously being revised.

Adopting, as before, the Formula 20 for the pitch angle of a carrier deck as follows $$P=a_1 \sin(w_1t+\phi_1)+a_2 \sin(w_2t+\phi_2) \quad (20)$$

we can write the series of equations representing integrals and derivatives of $P$, namely $$\int[\int P dt]dt = P_{-2} = -\left(\frac{a_1}{w_1^2}\right)\sin(w_1t+\phi_1)$$
$$-\left(\frac{a_2}{w_2^2}\right)\sin(w_2t+\phi_2) \quad (63)$$

$$\int P dt = P_{-1} = -\left(\frac{a_1}{w_1}\right)\cos(w_1t+\phi_1)$$
$$-\left(\frac{a_2}{w_2}\right)\cos(w_2t+\phi_2) \quad (64)$$

$$P = P_0 \text{ (zero derivative)} = a_1 \sin(w_1t+\phi_1)$$
$$+a_2 \sin(w_2t+\phi_2) \quad (65)$$

$$\frac{dP}{dt}=P_1=(a_1w_1)\cos(w_1t+\phi_1)+(a_2w_2)\cos(w_2t+\phi_2) \quad (66)$$

$$\frac{d^2P}{dt^2}=P_2=-(a_1w_1^2)\sin(w_1t+\phi_1)-(a_2w_2^2)\sin(w_2t+\phi_2) \quad (67)$$

$$\frac{d^3P}{dt^3}=P_3=-(a_1w_1^3)\cos(w_1t+\phi_1)-(a_2w_2^3)\cos(w_2t+\phi_2) \quad (68)$$

We may eliminate $a_1 \sin(w_1t+\phi_1)$ and $a_2 \sin(w_2t+\phi_2)$ from Equations 63, 65, and 67 and likewise $a_1 \cos(w_1t+\phi_1)$ and $a_2 \cos(w_2t+\phi_2)$ from Equations 64, 66, and 68 thereby obtaining the two relations $$P_{-2}w_1^2w_2^2+P_0(w_1^2+w_2^2)+P_2=0 \text{ and} \quad (69)$$
$$P_{-1}w_1^2w_2^2+P_1(w_1^2+w_2^2)+P_3=0 \quad (70)$$

where the $P$'s are observed quantities, while $w_1$ and $w_2$ are the required unknown angular velocities.

An automatic mechanism suitable for the continuous determination of $w_1$ and $w_2$ from variable input $P$'s is shown schematically in FIGURE 20. The stability of action of the feedback employed in this mechanism may be analyzed in the following manner. Suppose initially that the mechanism values of $w_1^2$ and $w_2^2$ are such that the Relations 69 and 70 are not satisfied, so that $$P_{-2}w_1^2w_2^2+P_0(w_1^2+w_2^2)+P_2=\epsilon_1 \quad (69a)$$
$$P_{-1}w_1^2w_2^2+P_1(w_1^2+w_2^2)+P_3=\epsilon_2 \quad (70a)$$

where $\epsilon_1$ and $\epsilon_2$ represent error signals which must be used in some manner to continuously readjust the mechanism values of $w_1^2$ and $w_2^2$ so that the Relations 69 and 70 are always more exactly satisfied. Thus we require that the feed-back be such that $\epsilon_1$ and $\epsilon_2$ rapidly approach zero with increasing time. One method of achieving stable feed-back operation, is as follows: Let us assume the auxiliary quantity $$\mu=\epsilon_1^2+\epsilon_2^2 \quad (71)$$

Then $$\frac{d\mu}{dt}=\frac{\partial\mu}{\partial(w_1^2)}\cdot\frac{d(w_1^2)}{dt}+\frac{\partial\mu}{\partial(w_2^2)}\cdot\frac{d(w_2^2)}{dt}$$

We may then design the mechanism, so that the adjusting feed-backs are $$\frac{d(w_1^2)}{dt}=-k_1\frac{\partial\mu}{\partial(w_1^2)} \quad (72)$$

and $$\frac{d(w_2^2)}{dt}=-k_2\frac{\partial\mu}{\partial(w_2^2)} \quad (73)$$

where $k_1$ and $k_2$ are positive sensitivity constants. Hence $$\frac{d\mu}{dt}=-k_1\left[\frac{\partial\mu}{\partial(w_1^2)}\right]^2-k_2\left[\frac{\partial\mu}{\partial(w_2^2)}\right]^2$$

so $$\frac{d\mu}{dt}$$

is always negative or zero. Under the conditions existing in the mechanism, the limit of $\mu$ is zero with increasing time. From the Relations 69a and 70a and the expression $\mu=\epsilon_1^2+\epsilon_2^2$, we get $$\frac{\partial\mu}{\partial(w_1^2)}=2\epsilon_1\frac{\partial\epsilon_1}{\partial(w_1^2)}+2\epsilon_2\frac{\partial\epsilon_2}{\partial(w_1^2)}$$

or $$\frac{\partial\mu}{\partial(w_1^2)}=2\epsilon_1(P_{-2}w_2^2+P_0)+2\epsilon_2(P_{-1}w_2^2+P_1) \quad (74)$$

and $$\frac{\partial\mu}{\partial(w_2^2)}=2\epsilon_1(P_{-2}w_1^2+P_0)+2\epsilon_2(P_{-1}w_1^2+P_1) \quad (75)$$

The condition that $$\frac{\partial\mu}{\partial(w_1^2)} \text{ and } \frac{\partial\mu}{\partial(w_2^2)}$$

both be equal to zero with $\epsilon_1$ and $\epsilon_2$ not equal to zero is $$(P_{-1}w_1^2+P_1)(P_{-2}w_2^2+P_0)$$
$$-(P_{-1}w_2^2+P_1)(P_{-2}w_1^2+P_0)=0$$

or $$(w_1^2-w_2^2)(P_1P_{-2}-P_0P_{-1})=0 \quad (76)$$

Here if $w_1 \neq w_2$, then $$(P_1P_{-2}-P_0P_{-1})=0 \quad (77)$$

That is, $P_1P_{-2}-P_0P_{-1}$ can be zero only momentarily if $w_1 \neq w_2$. Accordingly, the solution in this case is not prevented from converging. However, when $w_1=w_2$, we may have $$\frac{d(w_1^2)}{dt} \text{ and } \frac{d(w_2^2)}{dt}$$

both equal to zero when $\epsilon_1$ and $\epsilon_2$ are both not equal to zero. In this case $\epsilon_1$ and $\epsilon_2$ would not converge to zero as required, since the adjusting feedback would be zero. The conditions of 76, namely $w_1=w_2$ or $P_1O_{-2}=P_0P_{-1}$ do not imply that $$\frac{\partial \mu}{\partial (w_1^2)} \text{ and } \frac{\partial \mu}{\partial (w_2^2)}$$

must both be equal to zero but simply that they both could be equal to zero with appropriate non-zero values of $\epsilon_1$ and $\epsilon_2$. Thus, failure of the mechanism to converge due to $w_1=w_2$ would appear to be a very remote contingency. Furthermore, if $w_1 \neq w_2$, then it is impossible that $$\frac{\partial \mu}{\partial (w_1^2)} \text{ and } \frac{\partial \mu}{\partial (w_2^2)}$$

be both equal to zero for more than an instant, unless $\epsilon_1$ and $\epsilon_2$ are both zero. Accordingly $$\frac{d\mu}{dt}$$

or $\dot{\mu}$ does not vanish unless $\epsilon_1$ and $\epsilon_2$ vanish and therefore $\mu$, $\dot{\mu}$, $\epsilon_1$ and $\epsilon_2$ approach zero together.

Once the angular velocities $w_1$ and $w_2$ of the component sine waves comprising the pitch motion have been determined, the amplitude and phase angle of these sine waves can also be obtained. For example, from Equations 65 and 67, we may eliminate $a_1 \sin(w_1t+\phi_1)$ and get the relation $$P_0w_1^2+P_2a_2(w_1^2-w_2^2)\sin(w_2t+\phi_2) \quad (78)$$

Adopting as before, the Formula 20 for the pitch angle of a carrier deck as follows $$P_0=a_1 \sin(w_1t+\phi) + a_2 \sin(w_2t+\phi_2)$$

this Formula 20 for purpose of mechanization is written as follows:

$$P_0 - a_2 \sin(w_2t+\phi_2) = a_1 \sin(w_1t+\phi_1) \quad (79)$$

and when applied to the predicted pitch angle, it becomes $$P_p = a_1 \sin[w_1(t+T_p)+\phi_1]$$
$$+a_2 \sin[w_2(t+T_p)+\phi_2] \quad (80)$$

*Mechanisms for determining the values of predicted pitch angle $P_p$ employing derivatives and integrals of the value P*

FIGURE 19 is a diagram showing a pitch angle integrator and differentiator for obtaining the different integrals and derivatives of P; FIGURE 20 is a diagram of an angular velocity solver for obtaining the values of the angular velocities $w_1$ and $w_2$ of the two sine wave components constituting the assumed motion of P by mechanization of the Equations 69 and 70 or more specifically 69a and 70a. FIGURE 21 is a diagram of a sine wave component synthesizer for obtaining the values $a_1$ and $a_2$ and $\phi_1$ and $\phi_2$, corresponding to the amplitudes and phase angles of the sine wave components of the motion P by mechanization of Equations 78 and 79; and FIGURE 22 is a diagram of a pitch prediction computer for mechanizing the Equation 80 after the different values necessary for solution of said equation have been obtained from the mechanisms of FIGURES 19, 20, and 21. In all of the drawings of FIGURES 19-22, the full lines indicate mechanical motions and especially shaft rotations.

Referring to FIGURE 19, the quantity representing the pitch angle P derived as a shaft rotation from the stable element 21 (FIGURE 3) is introduced into a comparison differential 250 in conjunction with the quantity $P_0$ representing the zero derivative of P, to obtain the value $P-P_0=\epsilon$ (error) which is equal to $$(k_1k_2k_3k_4p^4+k_2k_3k_4p^3+k_3k_4p^2+k_4p)P_0$$
$$-(k_2k_3k_4p^3+k_3k_4p^2+k_4p)P$$

in which $k_1$, $k_2$, $k_3$ and $k_4$ are sensitivity constants or coefficients associated with the four integrators 251, 252, 253 and 254 respectively and $$p=\frac{d}{dt}(\quad)$$

According to the well known Stability Criteria of Routh and Hurwitz, the values of $k_1$, $k_2$, $k_3$ and $k_4$ must always be positive and must conform with these criteria as to the relationship of their magnitudes, according to the degree of equation involved, the degree depending on the number of integrators employed.

The output from the integrator 254 goes into a stabilizing differential 255 in conjunction with the error $\epsilon$ and the output of this differential is employed to set the carriage of the integrator 253. In a similar manner, stabilizing differentials 256 and 257 are employed to obtain the proper feed quantities for the integrators 252 and 251 respectively. As a result, there is obtained the approximate derivative quantities $$P_3=\frac{d^3P}{dt^3}, \quad P_2=\frac{d^2P}{dt^2}; \quad P_1=\frac{dP}{dt}$$

and $P_0$=zero derivative. The difference between P and $P_0$ is a very small error, $\epsilon$.

The quantity $P_0$, fed into stabilizing differential 258 in conjunction with the output of an integrator 260, results in an output from said differential which is fed into said integrator to obtain the quantity $\int P_0 dt=P_{-1}$ from said integrator. This quantity $P_{-1}$ fed into a stabilizing differential 261 in conjunction with the output of integrator 262 results in an output from said differential which is fed into said integrator to obtain the quantity $\int [\int P_0 dt] \, dt = P_{-2}$ from said integrator.

The values $P_{-2}$, $P_{-1}$, $P_0$, $P_1$, $P_2$ and $P_3$ obtained as shaft rotations from the mechanism of FIGURE 19 as described, are fed into the angular velocity solver shown in FIGURE 20 to solve Equations 69 and 70 and more specifically Equations 69a and 70a.

$$P_{-2}w_1^2w_2^2+P_0(w_1^2+w_2^2)+P_2=\epsilon_1 \to 0$$
$$P_{-1}w_1^2w_2^2+P_1(w_1^2+w_2^2)+P_3=\epsilon_2 \to 0$$

to obtain the values $w_1$ and $w_2$. For that purpose, the quantity $P_{-2}$ and the feed-back quantity $w_1^2w_2^2$ obtained in a manner to be described are multiplied together in a unit 270 to obtain the product $P_{-2}w_1^2w_2^2$ which is fed into a differential 271 in conjunction with the quantity $P_0(w_1^2+w_2^2)$ obtained from a multiplier 272, to obtain the quantity $P_{-2}w_1^2w_2^2+P_0(w_1^2+w_2^2)$. This latter quantity is added to the quantity $P_2$ in a differential 273 to obtain the sum of these quantities, which in the absence of error would be equal to zero according to Equation 69, but which is equal to $\epsilon_1$ according to Equation 69a due to the presence of error, and approaches zero as the revised values of $w_1^2$ and $w_2^2$ are fed back into the system as will be described.

Similarly, the quantity $P_{-1}$ and the feed-back quantity $w_1^2w_2^2$ are multiplied together in a unit 274 and the output of this unit is fed into a differential 275 in conjunction with the quantity $P_1(w_1^2+w_2^2)$ obtained from a multiplier 276 to obtain the quantity $$P_{-1}w_1^2w_2^2+P_1(w_1^2+w_2^2)$$

This latter quantity is added to the quantity $P_3$ in a differential 277 to obtain the sum of these which in the absence of error would be equal to zero according to Equation 70 but which is equal to $\epsilon_2$ according to Equation 70a due to the presence of error.

To obtain the necessary feed-back for elimination of the errors $\epsilon_1$ and $\epsilon_2$, $P_{-2}$ and $w_2^2$ obtained as will be described, are multiplied together in a unit 278 and the product in conjunction wtih the quantity $P_0$ (zero derivative of the present pitch angle P) are fed into a differential 280 to obtain $P_{-2}w_2^2+P_0$ which is fed into a multiplier 281 with $\epsilon_1$ to obtain $\epsilon_1(P_{-2}w_2^2+P_0)$. Similarly, $P_{-1}$ and $w_2^2$ obtained as will be described are multiplied together in unit 282 and the resulting product and $P_1$ are added in differential 283 to obtain $P_{-1}w_2^2+P_1$. The multiplication of the latter quantity by $\epsilon_2$ in unit 284 results in $\epsilon_2(P_{-1}w_2^2+P_1)$. The sum obtained from differential 285 of this latter quantity and the quantity $\epsilon_1(P_{-2}w_2^2+P_0)$ obtained as described when multiplied by two by appropriate gear ratios results in the quantity $$\frac{\partial \mu}{\partial(w_1^2)}$$

according to Equation 74. This latter quantity $\frac{\partial \mu}{\partial(w_1^2)}$ which is equal to $-\frac{1}{k_1}d\frac{w_1^2}{dt}$ from Equation 72 is integrated in unit 286 to attain the quantity $w_1^2$ which is one of the outputs of the angular velocity solver of FIGURE 20 desired.

Similarly, $P_{-1}$ and $w_1^2$ obtained as the output of integrator 286 as described, are multiplied together in unit 287 and the product and $P_1$ are added in differential 288 to obtain $P_{-1}w_1^2+P_1$ which is fed into multiplier 290 with $\epsilon_2$ to obtain $\epsilon_2(P_{-1}w_1^2+P_1)$. Also, $P_{-2}$ and $w_1^2$ obtained as the output of integrator 286 as described, are multiplied together in unit 291 and the product and $P_0$ are added in differential 292 to obtain $P_{-2}w_1^2+P_0$. This latter quantity multiplied by $\epsilon_1$ in unit 293 results in $\epsilon_1(P_{-1}w_1^2+P_0)$. The sum obtained by differential 294 of this latter quantity and the quantity $\epsilon_2(P_{-1}w_1^2+P_1)$ obtained as described, when multiplied by two by appropriate gear ratio results in the quantity $$\frac{\partial \mu}{\partial(w_2^2)}$$

according to Equation 75. This quantity $\frac{\partial \mu}{\partial(w_2^2)}$ which is equal to $-\frac{1}{k_2}\frac{d(w_2^2)}{dt}$ from Equation 73 is integrated in unit 295 to obtain the value $w_2^2$ constituting the other output of the angular velocity solver of FIGURE 20 desired.

For feed-back, the quantities $w_1^2$ and $w_2^2$ are multiplied together in the unit 296 and the product $w_1^2w_2^2$ is fed to the multipliers 270 and 274. At the same time, the quantities $w_1^2$ and $w_2^2$ are added in a differential 297 and the sum fed into the multipliers 272 and 276.

The quantities $w_1^2$ and $w_2^2$ obtained from the angular velocity solver of FIGURE 20 are then fed into the sine wave component synthesizer of FIGURE 21 to mechanize Equations 78 and 79 and to obtain the values $a_1 a_2$, $\phi_1$ and $\phi_2$ therefrom. In this system, $w_1^2$ and $w_2^2$ are fed into cams 300 and 301 respectively to obtain the square roots of these quantities and the resulting values $w_1$ and $w_2$ are then introduced into integrators 302 and 303 respectively to obtain the quantities $w_1 t$ and $w_2 t$ therefrom. The quantity $w_1 t$ is then added in differential 304 to the quantity $\phi_1$ obtained in a manner to be described, to produce the sum $w_1 t+\phi_1$, and the quantity $w_2 t$ is added in differential 305 to the quantity $\phi_2$ obtained in a manner to be described, to produce the sum $w_2 t+\phi_2$. The quantity $w_2 t+\phi_2$ and the quantity $a_2$ obtained in a manner to be described are fed into a resolver 306 to combine these quantities and obtain the quantity $$a_2 \sin(w_2 t+\phi_2)$$

This latter quantity is multiplied in unit 307 by the quantity $w_1^2-w_2^2$ obtained from a differential 308 to obtain the quantity $a_2(w_1^2-w_2^2)\sin(w_2 t+\phi_2)$. This latter quantity is subtracted in a differential 309 from the quantity $P_0 w_1^2+P_2$ obtained from a differential 310 in a manner to be described, to obtain a difference which should be zero according to Equation 78 but which actually is an error signal representing lack of balance in said equation. This error signal is first integrated in an integrator 311 and then apportioned into appropriate corrections of amplitude $a_2$ and phase angle $\phi_2$ by a component integrator 312 of standard known type. The other input into the integrator 312 is the quantity $w_2 t+\phi_2$ from the differential 305.

The phase angle $\phi_2$ from the integrator 312 goes into the differential 305 and the amplitude $a_2$ from said integrator goes into the resolver 306, to obtain from said resolver the quantity $a_2 \sin(w_2 t+\phi_2)$. Since we now consider $a_2 \sin(w_2 t+\phi_2)$ to be continuously known, this is added in a differential 313 to the quantity $$a_1 \sin(w_1 t+\phi_1)$$

obtained from a resolver 314, and the sum subtracted from $P_0$ in a differential 315 to obtain in accordance with Equation 79 an error signal which is integrated in unit 316 and then apportioned by a component integrator 317, into which is also fed the quantity $w_1 t+\phi_1$, to obtain the component value $\phi_1$ which goes into differential 304 and component value $a_1$ which goes into resolver 314.

The input $P_0$ goes into multiplier 318 in conjunction with $w_1^2$ to obtain a product which is added to $P_2$ in the differential 310. The quantities $w_1^2$ and $w_2^2$ are subtracted in differential 308 and the difference delivered to the multiplier 307 as described.

The action of the mechanism of FIGURE 21 requires further consideration when $w_1=w_2$. In that case $$P_0 w_1^2+P_2=0$$

and $w_1^2-w_2^2=0$ so that we have no error signal. As a result, the values of $a_2$ and $\phi_2$ are indeterminate and may have any values whatever depending on the conditions holding, as $w_2$ approaches $w_1$. We will have therefore a sine wave $a_2 \sin(w_2 t+\phi_2)$ in which $w_2$ only is necessarily correct. Nevertheless, when $a_2 \sin(w_2 t+\phi_2)$ is subtracted from $P_0$ to give $a_1 \sin(w_1 t+\phi_1)$, the mechanism will still determine correct values of $a_1$ and $\phi_1$. The sum of the two sine waves of equal angular velocity will then of necessity be the same as the single sine wave which represents pitch when $w_1=w_2=w$. That is $P_0=a_1 \sin(wt+\phi_1)+a_2(\sin wt+\phi_2)$
$=(a_1 \cos\phi_1+a_2 \cos\phi_2)\sin wt+(a_1 \sin\phi_1+a_2 \sin\phi_2)\cos wt$
$=a \cos\phi \sin wt+a \sin\phi \cos wt=a \sin(wt+\phi)$ where $$a=[a_1^2+a_2^2+2a_1 a_2 \cos(\phi_1-\phi_2)]^{\frac{1}{2}}$$

and $$\phi=\tan^{-1}\left[\frac{a_1 \sin\phi_1+a_2 \sin\phi_2}{a_1 \cos\phi_1+a_2 \cos\phi_2}\right]$$

All the quantities necessary for obtaining the pitch prediction are now available from the mechanisms of FIGURES 19, 20 and 21. FIGURE 22 shows the mechanization of the Formula 80

$$P_p=a_1 \sin[w_1(t+T_p)+\phi_1]+a_2 \sin[w_2(t+T_p)+\phi_2]$$

In the pitch prediction computer of FIGURE 22, the quantities $w_1$ and $w_2$ obtained from cams in the mechanism of FIGURE 21, are fed into two multipliers 325 and 326 respectively, and multiplied therein by the quantity $T_p$ obtained from the prediction time computer 35 of FIGURES 3 and 8 to obtain the products $w_1 T_p$ and $w_2 T_p$. The quantity $w_1 T_p$ is added in a differential 327 to the quantity $w_1 t + \phi_1$ obtained from the mechanism of FIGURE 21, to obtain the quantity $w_1(t+T_p)+\phi_1$. Similarly, the quantity $w_2 T_p$ is added in a differential 328 to the quantity $w_2 t + \phi_2$ obtained from the mechanism of FIGURE 21 to obtain the quantity $w_2(t+T_p)+\phi_2$. The quantity $w_1(t+T_p)+\phi_1$ and the quantity $a_1$ obtained from the mechanism of FIGURE 21 are fed into a resolver 330 to obtain the quantity $a_1 \sin[w_1(t+T_p)\phi_1]$ and the quantity $w_2(t+T_p)+\phi_2$ and the quantity $a_2$ obtained from the mechanism of FIGURE 21 are fed into a resolver 331 to obtain the quantity $a_2 \sin[w_2(t+T_p)+\phi_2]$. The outputs of the two resolvers 330 and 331 when added in a differential 332 produce the desired predicted pitch angle $P_p$ in accordance with Equation 80.

*Pitch prediction computer for determining the value of $P_p$ employing manual tracking means*

If the assumption is made that the frequency of pitch movement is constant during the prediction period and also equal to the frequency of pitch movement in the immediate past, then we may track the recorded present pitch angle $P_i$ by means of the output $P_0$ of a component solver which is rotating at the same frequency as the pitch angle. That is, we must manually adjust the two inputs to the component solver, namely $a_0$ (average amplitude of the pitch angle) and $w_2$ (angular velocity of one of the assumed sine wave components of the pitch angle variation), so that $P_0$ is equal to $P_i$ at all times by visual observation. In addition, by recording the quantity $P_i$ on a contracted time scale, we may also take into account any evident systematic trends in the magnitude of the amplitude of $P_i$. Thus, if the envelope curve of the contracted recording of $P_i$ is constructed, then the ordinate of this curve will be the amplitude of $P_i$ at any desired time in the past. For purposes of prediction, the equation of this envelope can be approximated by the expression $$a_s = a_0 + a_v \sin(w_1 t + \phi_1) \qquad (82)$$

where $a_0$ equals the average amplitude of the pitch angle, $a_v$ equals the amplitude of the variation of the pitch angle and $a_s$ equals the sum of the amplitudes resulting from the Formulation 82 as indicated. Therefore, we manually adjust continuously the quantities $w_1$ and $a_v$, so that the recorded quantity $a_s$ traces a curve enveloping approximately the contracted recording of $P_i$. The quantity $a_0$ is introduced by tracking the expanded $P_i$ recording, this tracking being aided by the envelope tracking. Thus we have in accordance with the recognized formula for amplitude modulation $$P_0 = [a_0 + a_v \sin(w_1 t + \phi_1)] \sin(w_2 t + \phi_2) \qquad (83)$$
$$P_p = [a_0 + a_v \sin(w_1 t + w_1 T_p + \phi_1)] \sin(w_2 t + w_2 T_p + \phi_2) \qquad (84)$$

The manner in which Equations 83 and 84 may be mechanized together with the appropriate recording is shown diagrammatically in FIGURE 23, the full lines therein indicating mechanical motion and especially shaft rotations.

Referring to FIGURE 23, the recording of the present pitch angle $P_i$ is shown effected by means of a shaft screw 340 rotated automatically in response to variations in pitch angle from the stable element 11 (FIGURE 3) and having threaded thereon a collar 341 carrying a marker 342 such as a pen. As the shaft screw 340 rotates in accordance with the pitch angle, the pen 342 held against rotation is carried therealong, while a record sheet 343 moves behind said pen towards the left at a constant rate $t$, thereby generating a curve C on said sheet constituting past and present records of the pitch movement. For manually tracking the curve C as it is generated, there is provided a shaft screw 345 located parallel to and alongside of the shaft screw 340 and threadedly carrying a non-rotatable collar 346 with a marker or pointer 347 adapted to be maintained by manual control in coincidental position with the marker 342 generating the curve C. This shaft screw 345 is manually controlled in a manner to be described from a pair of manual control members 348 and 350, shown in the form of handcranks, and in the operation of determining the predicted pitch angle $P_p$, should be rotated in a manner to match the rate of automatic rotation of the shaft screw 340, and so maintain the curve generating point of marker 347 in registry with marker 342.

To determine the accuracy of prediction, there is provided a shaft screw 351 located parallel to the shaft screws 340 and 345 and threadedly carrying a non-rotatable collar 352 with a marker 353 for recording on the record sheet 343. The marker 353 is horizontally located with respect to the indicators or markers 342 and 347 a distance corresponding to the time $T_p$ and said marker 353 is adapted to generate a predicted pitch curve D preferably of a color different than the color of the marker 342. The shaft screw 351 is rotated by the output $P_p$ of the predicting mechanism, so that the curve C generated by the markers or indicators 342 and 347 should follow the curve D traced in advance by the marker 353, if the operation of the mechanism is proper. The marker 353 therefore acts as a check to determine if the operations are correct and if the predictions are accurate.

Another marking and tracking device constituting part of the pitch predicting system comprises a shaft screw 355 rotated automatically by the quantity $P_i$ and having threaded thereon a non-rotatable collar 356 with a marker 357 for recording on a record sheet 358 moved at a continuous constant rate proportional to $t$ but at a slower rate than the rate of movement of the record sheet 343, to generate a curve C' similar to the curve C but contracted. For manually tracking the envelope of the curve C', there is provided another shaft screw 360 located parallel to and alongside of the shaft 355 and threadedly carrying a non-rotatable collar 361 with a marker or pointer 362 adapted to be maintained by manual control in position to generate the envelope E of the pitch curve C'. This shaft screw 360 is manually controlled in a manner to be described from a pair of manual control members 363 and 364, shown in the form of handcranks.

The mechanism of FIGURE 23 is so set up that the quantities $w_2$, $a_0$, $w_1$ and $a_v$ are manually fed into the system by the handcranks 348, 350, 363 and 364 respectively, the proper values fed being assured by the proper tracking of the curves C and C' as described. The two curves C and C' are located in position to be easily visible to two operators respectively controlling the cranks 348, 350, 363 and 364. One operator handles the two cranks 348 and 350 while he is watching the recorded curve C. If for example, he finds that the tracking curve being generated by the marker 347 varies in frequency from the curve C generated by the marker 342, he adjusts the rate and direction of rotation of the crank 348 to make the frequency of the tracking curve correspond to that of the curve C. Similarly, he adjusts the rate and direction of rotation of the crank 350, if he finds that the tracking curve generated by the marker 347 varies in amplitude from that of curve C.

The other operator handles the two cranks 363 and 364 while he is watching the recorded curve C', to cause the tracking curve to generate the envelope E of said recorded curve, the crank 363 being rotated at the right rate and direction to obtain the necessary frequency in his tracking curve and the crank 364 being rotated at the right rate and direction to obtain the necessary amplitude in his tracking curve.

The quantity $w_2$ fed manually into the mechanism by the crank 348 is fed into an integrator 370 and the output of this integrator is added in a differential 371 to a quantity derived from the crank 348 through a connection 369. The integrator 370 and the differential 371 constitute what is known as an aided tracking unit. In this unit, the connection 369 between the crank 348 and the input of the differential 371 has a proper gear ratio which is determined experimentally by the ease of tracking to arrive at an optimum gear ratio suitable for all conditions encountered. With such a gear ratio, there is produced at the output of the differential 371 the quantity $w_2t+\phi_2$ when the curve C is accurately tracked.

The quantity $w_2t+\phi_2$ and the quantity $$a_0+a_v \sin (w_1t+\phi_1)$$

corresponding to the value of one side of the Equation 82 of the envelope curve obtained in a manner to be described, are fed into a component resolver 372 to obtain the quantity $P_0$. This quantity $P_0$ rotates the shaft screw 345 at a rate and direction to track the curve C in the manner described.

The quantity $w_1$ fed manually into the mechanism by the crank 363 is applied to a mulitplier 377 in conjunction with the quantity $T_p$ (predicted time) derived from the prediction computer 35 of FIGURE 8 to obtain $w_1T_p$ which is applied to a differentail 378. At the same time $w_1$ applied to an aided tracking unit similar to the aided tracking unit 369, 370 and 371, and comprising an integrator 380 and a differential 381 with a connection 379 of proper gear ratio between the crank 363 and the differential 381 results in the quantity $w_1t+\phi_1$. The latter quantity is added to $w_1T_p$ in the differential 378, and the output $w_1t+w_1T_p+\phi_1$ is applied to a component resolver 382 in conjunction with the quantity $a_v$ manually fed into the mechanism by the crank 364, to obtain from said component resolver the quantity $$a_v \sin (w_1t+w_1T_p+\phi_1)$$

The quantity $w_1t+\phi_1$ is also fed into a component resolver 383 in conjunction with the manually applied quantity $a_v$ to produce $a_v \sin (w_1t+\phi_1)$ and this latter quantity is added to the manually applied quantity $a_0$ in a differential 384 to produce the quantity $$a_0+a_v \sin (w_1t+\phi_1)$$

corresponding to the value of one side of the Equation 82 of the envelope. This latter quantity is applied to the component resolver 372 as already described and also to the shaft screw 360 to rotate said screw and thereby generate the tracking envelope E.

The quantity $T_p$ is fed into multiplier 385 in conjunction with the quantity $w_2$ and the product is applied to a differential 386 with the quantity $w_2t+\phi_2$ to obtain the quantity $w_2t+w_2T_p+\phi_2$ which is fed into a component resolver 387. The output $$a_0+a_v \sin (w_1t+w_1T_p+\phi_1)$$

obtained from the component resolver 382 as described, is added to the manually applied quantity $a_0$ in a differential 388 and the resulting sum is applied to the component resolver 387 as the other input to obtain the quantity $$[a_0+a_v \sin (w_1t+w_1T_p+\phi_1)] \sin (w_2t+w_2T_p+\phi_2)$$

which is equal to the desired predicted pitch angle $P_p$ in accordance with Equation 84. This quantity applied to the shaft screw 351 generates the predicted pitch curve D, by which the accuracy of pitch prediction can be determined, as the recorded curve C catches up with said curve D.

*Mechanisms for determining the values of predicted pitch angle $P_p$ employing an oscillating system*

The pitch angle prediction mechanisms to be described, employing an oscillating system, bear some relation to that described and shown in FIGURES 19–22 in that both are based on the observed pitch angle and the derivatives of its present value. However, the previous method and mechanisms illustrated in FIGURES 19–22 require a separate determination of $w_1^2$ and $w_2^2$, the angular velocities of the assumed sine wave components of the motion, whereas here a determination of the values of the symmetric functions of the angular velocities, namely $w_1^2w_2^2$ and $w_1^2+w_2^2$ is sufficient. Moreover, in the previous method illustrated in FIGURES 19–22, the values of $w_1^2$ and $w_2^2$ are obtained continuously and the values of the predicted pitch angle $P_p$ are derived continuously therefrom while in the method and mechanisms to be described, the operation of determining values of the angular velocity functions and the operation of determining predicted pitch angle therefrom are carried out alternately as part of an oscillating system to obtain predicted pitch angle values of progressively increasing accuracy.

The modified prediction method is essentially based on establishing an oscillating system whose differential equation of motion is $$(p^2+w_1^2)(p^2+w_2^2)\theta=0$$

or $$p^4\theta+(w_1^2+w_2^2)p^2\theta+w_1^2w_2^2\theta=0 \qquad (85)$$

from which we obtain by differentiation, $$p^5\theta+(w_1^2+w_2^2)p^3\theta+w_1^2w_2^2p\theta=0 \qquad (86)$$

where $p^n$ equals the differential operator $$\frac{d^n}{dt^n}$$

( ) and $\theta$ equals pitch angle in terms of angular displacement of shaft. Equations 85 and 86 when integrated will give the basic formula for an oscillating system of two simple harmonic components in the form $$\theta=a_1 \sin (w_1t+\phi_1)+a_2 \sin (w_2t+\phi_2) \qquad (20b)$$

similar to Equation 20 previously discussed. The Equations 85 and 86 are derived from Equation 20b) as follows:

$$p^4\theta=a_1w_1^4 \sin (w_1t+\phi_1)+a_2w_2^4 \sin (w_2t+\phi_2)$$
$$(w_1^2+w_2^2)p^2\theta=-a_1(w_1^4+w_1^2w_2^2)$$
$$\sin (w_1t+\phi_1)-a_2(w_1^2w_2^2+w_2^4) \sin (w_2t+\phi_2)$$
$$(w_1^2w_2^2)\theta=a_1w_1^2w_2^2 \sin (w_1t+\phi_1)$$
$$+a_2w_1^2w_2^2 \sin (w_2t+\phi_2)$$

By adding the quantities on the left side of the equations and the quantities on the right side of the equations (the latter quantities cancelling out to zero), Equation 85 will result.

If at any arbitrary time $t$, we set the system oscillating with initial conditions given by the rates of the quantity $\theta$, namely, $\theta_t$, $p\theta_t$, $p^2\theta_t$, etc., and arrange the system so that Equation 85 necessarily holds, then the output of the system will be given by Equation 20b. Therefore, the predicted pitch angle $\theta_t+\tau_p$ or $\theta_p$ will be given when the system has run for the interval $T_p$ from the starting point with all initial conditions set. Here it should be noted that the mechanism time scale can be made much faster than the actual time scale, so that many $\theta_p$ readings can be obtained. Thus we may obtain a series of discrete values of $\theta_p$ by repeatedly resetting the oscillating system to new sets of initial conditions. The resulting values of $\theta_p$ may be smoothed by well known methods to obtain a continuous output.

The prediction system just described consists essentially of three mechanisms, namely, (1) rate measuring device for determining the rates of the quantity $\theta$, i.e. $\theta_t$, $p\theta_t$, $p^2\theta_t$ etc., (2) angular velocity function computer for determining $w_1^2w_2^2$ and $w_1^2+w_2^2$ and (3) oscillating prediction mechanism for determining the value $\theta_p$ from the quantities derived from the angular velocity function computer and the derivatives of $\theta_t$.

A mechanical form of rate measuring device 394 is illustrated diagrammatically in FIGURE 24 in which the full lines indicate shaft rotations, and is similar to the differentiating part of the mechanism illustrated in FIGURE 19. This rate measuring device comprises a comparison differential 395 into which are fed the quantity $\theta_i$ corresponding to the present pitch angle obtained as $P_0$ from the stable element 21 (FIGURE 3) in the manner described, and the quantity $\theta_0$ or $\theta$ which is one of the outputs of the device, to obtain an error signal $\epsilon$ equal to $\theta_1-\theta_0$, this error signal being fed successively into a series of integrators 396, 397, 398, 399, 400 and 401 through successive stabilizing differentials 402, 403, 404, 405 and 406. By means of the arrangement described, there is obtained therefrom the output quantities $p^5\theta$, $p^4\theta$, $p^3\theta$, $p^2\theta$, $p\theta$ and $\theta$, as shaft rotations, the latter quantity constituting the zero derivative value of $\theta_1$ and being the same as $\theta_0$.

In connection with the rate measuring device of FIGURE 24 described, it should be noted that $p^n\theta$ is not exactly equal to $p^n\theta_i$. An analysis of the deviations involved show how small and insignificant these deviations are.

$$\theta = \theta_0 = \theta_i - \epsilon$$
$$K_1 p\theta = K_1 p\theta_i - (K_1 p + 1)\epsilon$$
$$K_1 K_2 p^2\theta = K_1 K_2 p^2\theta_i - (K_1 K_2 p^2 + K_2 p + 1)\epsilon$$
$$K_1 K_2 K_3 p^3\theta = K_1 K_2 K_3 p^3\theta_i - (K_1 K_2 K_3 p^3 + K_2 K_3 p^2 + K_3 p + 1)\epsilon$$
$$K_1 K_2 K_3 K_4 p^4\theta = K_1 K_2 K_3 K_4 p^4\theta_i - (K_1 K_2 K_3 K_4 p^4 + K_2 K_3 K_4 p^2 + K_3 K_4 p^2 + K_4 p + 1)\epsilon$$
$$K_1 K_2 K_3 K_4 K_5 p^5\theta = K_1 K_2 K_3 K_4 K_5 p^5\theta_i - (K_1 K_2 K_3 K_4 K_5 p^5 + K_2 K_3 K_4 K_5 p^4 + K_3 K_4 K_5 p^3 + K_4 K_5 p^2 + K_5 p + 1)\epsilon$$
$$K_1 K_2 K_3 K_4 K_5 K_6 p^6\theta = K_1 K_3 K_3 K_4 K_5 K_6 p^6\theta_i - (K_1 K_2 K_3 K_4 K_5 K_6 p^6 + K_2 K_3 K_4 K_5 K_6 p^5 + \ldots + K_5 K_6 p^2 + K_6 p)\epsilon = \epsilon$$

Here, the K's are constants associated with the integrator given by the subscript. Thus, if the integrator output is $p^{n-1}\phi$, the input is $K_n p^n \phi$.

Furthermore, from the last equation of the set above $$\frac{\theta_0}{\theta_i} = \frac{K_2 K_3 K_4 K_5 K_6 p^5 + K_3 K_4 K_5 K_6 p^4 + \ldots + K_5 K_6 p^2 + K_6 p + 1}{K_1 K_2 K_3 K_4 K_5 K_6 p^6 + K_2 K_3 K_4 K_5 K_6 p^5 + \ldots + K_5 K_6 p^2 + K_6 p + 1}$$

Accordingly for a periodic operation $K_1 K_2 K_3 K_4 K_5 K_6 = K^6$ and $K_1 = 1/6K$
$K_2 K_3 K_4 K_5 K_6 = 6K^5$ $K_2 = 2/5K$
$K_3 K_4 K_5 K_6 = 15K_4$ $K_3 = 3/4K$
$K_4 K_5 K_6 = 20K^3$ $K_4 = 4/3K$
$K_5 K_6 = 15K^2$ $K_5 = 5/2K$
$K_6 = 6K$ $K_6 = 6K$ Hence $$\frac{\theta_0}{\theta_i} = \frac{(Kp+1)^6 - K^6 p^6}{(Kp+1)^6} = 1 - \frac{K^6 p^6}{(Kp+1)^6}$$

$$\epsilon = \theta_i - \theta_0 = \theta_i\left(1 - \frac{\theta_0}{\theta_i}\right) = \left[\frac{Kp}{Kp+1}\right]^6 \theta_i$$

Figure 25 is a diagram of a rate measuring device 394a which is an electrical equivalent of the mechanical rate measuring device 394 illustrated in FIGURE 24, the solid lines in said diagram representing electric signals and specifically voltages proportional to the values of the quantities indicated, in this electric rate measuring device, there is provided an adding network 395a corresponding to the comparison differential 395 of FIGURE 24, integrating networks 396a, 397a, 398a, 399a, 400a and 401a corresponding to the integrators 396, 397, 398, 399, 400 and 401, respectively of FIGURE 24, and stabilizing resistances or feed-back elements 402a, 403a, 404a, 405a and 406a corresponding to the stabilizing differentials 402, 403, 404, 405 and 406 respectively of FIGURE 24. The input $\theta_1$ into the rate measuring device will be a voltage obtained by impressing the shaft rotation from the stable element 21 (FIGURE 3) as a slider movement upon a potentiometer, while a reference voltage is also impressed on the resistance of said potentiometer to obtain the output $\theta_1$ as a voltage proportional to said shaft rotation.

The potentiometer for this purpose is similar to the potentiometer 245 in the apparatus of FIGURE 17. The voltage outputs of the electrical rate measuring device of FIGURE 25 are $p^5\theta$, $p^4\theta$, $p^3\theta$, $p^2\theta$, $p\theta$ and $\theta$.

FIGURE 26 shows diagrammatically an angular velocity function computer 409 for obtaining the values of $w_1^2 w_2^2$ and $w_1^2 + w_2^2$, the solid lines indicating electric signals and specifically voltages and the dotted lines indicating shaft displacements. The inputs into this computer 409 are the outputs $p^5\theta$, $p^4\theta$, $p^3\theta$, $p^2\theta$, $p\theta$ and $\theta$ of the rate measuring device of FIGURE 24 or 25. If the outputs from the mechanical device of FIGURE 24 are employed, these must be converted into corresponding voltages before they can be used in the angular velocity function computer of FIGURE 26.

The computer of FIGURE 26 is divided into two sections F and G. Section F mechanizes equation $$p^4\theta + (w_1^2 + w_2^2)p^2\theta + w_1^2 w_2^2\theta = \epsilon_1 \to 0 \quad (84a)$$

and section G mechanizes equation $$p^5\theta + (w_1^2 + w_2^2)p^3\theta + w_1^2 w_2^2 p\theta = \epsilon \to 0 \quad (86a)$$

The computer 409 of FIGURE 26 employs a stabilizing feedback similar to that used in the angular velocity solver of FIGURE 20. For that purpose, there is formed the auxiliary quantity:

$$\mu = \epsilon_1^2 + \epsilon_2^2$$

$$\frac{\partial \mu}{\partial(w_1^2 w_2^2)} = 2\epsilon_1 \frac{\partial \epsilon_1}{\partial(w_1^2 w_2^2)} + 2\epsilon_2 \frac{\partial \epsilon_2}{\partial(w_1^2 w_2^2)}$$

$$\frac{\partial \mu}{\partial(w_1^2 w_2^2)} = 2\epsilon_1 \theta + 2\epsilon_2 p\theta \quad (87)$$

$$\frac{\partial \mu}{\partial(w_1^2 w_2^2)} = 2\epsilon_1 p^2\theta + 2\epsilon_2 p^3\theta \quad (88)$$

The mechanism is designed so that the adjusting feedbacks are $$\frac{\partial \mu}{\partial(w_1^2 w_2^2)} = -\frac{1}{k_1}\frac{d(w_1^2 w_2^2)}{dt} \quad (89)$$

$$\frac{\partial \mu}{\partial(w_1^2 + w_1^2)} = -\frac{1}{k_2}\frac{d(w_1^2 + w_2^2)}{dt} \quad (90)$$

Referring to the angular velocity function computer 409 of FIGURE 26 and especially to its section F, the input $\theta$ as a voltage is imposed on a potentiometer 410, having its slider adjusted by the mechanical output quantity $w_1^2 w_2^2$ to produce an output voltage $w_1^2 w_2^2 \theta$. This latter voltage, the input voltage $p^4\theta$, and the voltage $(w_1^2 + w_2^2)p^2\theta$ obtained from a potentiometer 411 as will be described are fed into an adding network 412 to obtain an output voltage corresponding to the error $\epsilon_1$ in Equation 85a. This voltage $\epsilon_1$ is amplified and converted into a shaft rotation by a servo follow-up control system 413 similar to the unit 93 in the heave meter of FIGURE 10. The shaft displacement $\epsilon_1$ from the control system 413 is imposed upon a potentiometer 414 in conjunction with the input voltage $\theta$ to obtain an output voltage equal to $2\epsilon_1\theta$. This voltage $2\epsilon_1\theta$ and the voltage $2\epsilon_2 p\theta$ obtained from the output of a potentiometer 415 in a manner to be described are fed to an adding network 416 to obtain a voltage output equal to $2\epsilon_1\theta + 2\epsilon_2 p\theta$. This latter quantity is converted into a corresponding shaft displacement by means of a servo follow-up control system 417 similar to the control system 413 and to the control system 93 in the heave meter of FIGURE 10. The output of this control system 417 is a shaft displacement corresponding to the quantity $2\epsilon_1\theta + 2\epsilon_2 p\theta$ which is equal to $$\frac{\partial \mu}{\partial (w_1^2 w_2^2)}$$

under the Relationship 87 developed to obtain a stabilizing feed-back. This partial differential is equal to $$-\frac{1}{k_1} \frac{d(w_1^2 w_2^2)}{dt}$$

as indicated in the Relationship 89 due to the selected design of the mechanism, and when this quantity is integrated in a unit 418, there results an output quantity $w_1^2 w_2^2$ from the section F of the mechanism embodied in a shaft displacement.

The quantity $w_1^2 + w_2^2$ is obtained from section G of the angular velocity function computer of FIGURE 26 in a similar manner. For that purpose, the input $p\theta$ as a voltage is imposed on a potentiometer 420 having its slider adjusted by the mechanical output quantity $w_1^2 w_2^2$ to produce an output voltage $w_1^2 w_2^2 p\theta$. This latter voltage, the input voltage $p^5\theta$, and the voltage $(w_1^2 + w_2^2) p^3\theta$ obtained from a potentiometer 421 as will be described are fed into an adding network 422 to obtain an output voltage corresponding to the error $\epsilon_2$ in Equation 86a. This voltage $\epsilon_2$ is amplified and converted into a shaft displacement by a servo follow-up control system 423 similar to the unit 413. This shaft displacement $\epsilon_2$ is imposed upon the potentiometer 415 in conjunction with the input voltage $p\theta$ to obtain the voltage quantity $2\epsilon_2 p\theta$ for supply to the adding network 416 as described, and is also imposed upon a potentiometer 424 in conjunction with the input voltage $p^3\theta$ to obtain an output voltage equal to $2\epsilon_2 p^3\theta$. An input voltage $p^2\theta$ and the mechanical error displacement $\epsilon_1$ are imposed upon a potentiometer 425, and the output voltage $2\epsilon_1 p^2\theta$ from said potentiometer and the output voltage $2\epsilon_2 p^3\theta$ from the potentiometer 424 are added in an adding network 426 to produce the voltage quantity $2\epsilon_1 p^2\theta + 2\epsilon_2 p^3\theta$. This latter quantity is converted into a corresponding shaft displacement by means of a servo followup control system 427 similar to the control system 413. The output of this control system 427 is a shaft displacement corresponding to the quantity of $2\epsilon_1 p^2\theta + 2\epsilon_2 p^3\theta$ which is equal to $$\frac{\partial \mu}{\partial (w_1^2 + w_2^2)}$$

under the Relationship 88 developed to obtain a stabilizing feedback. This partial differential is equal to $$-\frac{1}{k_2} \frac{d(w_1^2 + w_2^2)}{dt}$$

as indicated in the Relationship 90 due to the selected design of the mechanism, and when this quantity is integrated in a unit 428, there results an output quantity $w_1^2 + w_2^2$ from the section G of the mechanism embodied in a shaft displacement. This quantity $w_1^2 + w_2^2$ is fed into the potentiometer 411 in conjunction with the input voltage $p^2\theta$ to obtain the voltage quantity $(w_1^2 + w_2^2) p^2\theta$ for supply to the adding network 412, and is also fed into the potentiometer 421 in conjunction with the input voltage $p^3\theta$ to obtain an output voltage corresponding to the quantity $(w_1^2 + w_2^2) p^3\theta$ for supply to the adding network 422, as already described.

The quantities $w_1^2 w_2^2$ and $w_1^2 + w_2^2$ obtained as the mechanical outputs of the angular velocity function computer 409 of FIGURE 26 are adapted to be employed in an oscillating prediction mechanism for determining the value $\theta_p$ from these outputs.

FIGURE 27 shows a mechanical oscillating prediction mechanism 439 adapted to apply to the mechanism as initial settings, at spaced time intervals during the predicted time period $T_p$ of the run, the angular velocity functions obtained from the computer 409 (FIGURE 26) and the quantities $\theta$, $p\theta$, $p^2\theta$, and $p^3\theta$ obtained from the rate measuring device 394 (FIGURE 24) and to be operated with said settings through oscillating cycles following the equational Relationships 85 and 86 but at a speeded time scale for $T_p$. From these oscillating cycles, a succession of predicted values for the pitch angle $\theta_p$ at the predicted time $T_p$, to the speeded time scale, is obtained. These predicted values are close to the value $\theta_p$ desired, and since the known initial conditions for the oscillating cycle are reset in the system for the successive cycles, the predictions become successively more accurate, as the predicted time $T_p$ approaches zero. The predicted values therefore approach successively closer to the value of the desired pitch angle $\theta_p$.

In the diagram of the oscillating prediction mechanism 439 shown in FIGURE 27, the solid lines indicate mechanical displacements and more specifically shaft rotations. This mechanism comprises in general four initial value resetting devices 440, 441, 442 and 443, each adapted to store up mechanical quantities during each of a succession of cycles during a $T_p$ run and to release or unload them after each cycle, so as to set up at the beginning of each integration cycle the quantities $p\theta$, $p^2\theta$, $p^3\theta$ and $p^4\theta$ as initial values for integration through successive integrators 447, 446, 445 and 444 constituting part of the oscillating prediction mechanism 439. All of these devices 440, 441, 442 and 443 are similar in certain respects, so that device 440 alone will be described.

The storing and unloading device 440 comprises a differential 450 with an input $\theta$ which is one of the present or current mechanical outputs of the rate measuring device 394 (FIGURE 24), another input which is designated as $\theta_t$ indicating the pitch angle at a future time $t$, and an output equal to the difference between these inputs and connected to a heart cam 451 of the type well-known for storing and releasing rotational displacements at time intervals. Such heart cams are constructed in the well-known manner, to cause the reaction of spring-pressed followers thereagainst, to displace in the absence of restraint the cams and the followers relatively into centered position with the followers in the valleys of the cams.

The heart cam 451 has a follower secured to a shaft 452 having a locking clutch connection 453 to a fixed frame 454 and carrying a heart cam 455. The follower of the heart cam 455 is connected to an element of a clutch 456 and to a heart cam 457 having its follower spring-pressed during certain phases towards the cam 457 and controlled by a solenoid 458. The other element of the clutch 456 is rigidly connected by an unloading connector 460 to an input of a differential 461 and is also connected to one element of another locking clutch 462, the other element of which is anchored to a fixed frame 463. The other input into the differential 461 comes from the output of the integrator 447 and the output from said differential is fed as an input into the differential 450.

In the operation of a storing and unloading cycle of the device 440, when a storing phase of said cycle is beginning, an integrating cycle with values initially set for integration as a result of a previous unloading phase is also just beginning. Under these conditions, the clutches and heart cams of the device are in the positions shown in FIGURE 27. During this initial storing phase, the input into the differential 450 will be $\theta$, while the other input will be $\theta_t$, and the integrators 444, 445, 446 and 447 will have their timing discs just beginning to run. The output of the differential 450 will cause the heart cam 451 to rotate, and since the clutch 453 is open or disengaged, the follower of said heart cam will move with said cam and will move the heart cam 455 therewith. The clutch 456 is disengaged, so that the follower of the heart cam 455 moves with said cam and the heart cam 457 is rotatively displaced in relation to its follower and without interference therefrom, since the latter follower is withdrawn into inactive position away from said cam 457 by energization of the solenoid 458. The angular displacement of the heart cam 457 corresponds to the differences in the inputs into the differential 450 or $$\theta_t - \theta = J\theta_t$$

During the storing phase described, the clutch 456 is disengaged and the clutch 462 is in engaged or locked position, so that the connector 460 is locked against rotation. At the end of the storing interval, and at the end of the contemporaneous integrating cycle, the timing discs of the integrators 444, 445, 446 and 447 are shut-off, so that the integration cycle is ended and at the same time, or a short time thereafter, the clutches 453 and 456 are closed or engaged, the clutch 462 is unlocked or disengaged, and the solenoid 458 is deenergized or released, thereby causing the follower of the heart cam 457 to be spring-pressed against said cam, and said cam to be centered with respect to its follower. This causes the heart cam 457 to rotate to its original setting an amount which corresponds to the accumulated displacement thereof up to the period just prior to the shift in the conditions of the clutches 453, 456 and 462 and which is designated by the quantity $J\theta_t$. With the clutch 456 now engaged and the clutch 462 unlocked, the return or unloading movement of the heart cam 457 is transmitted through the connector 460 to an input of the differential 461 and this causes the output of said differential to rotate an amount equivalent to the input value $\theta$ of the differential 450 just prior to the unloading cycle.

The mechanism is set up in assembly, so that the cams and the integrator carriages are in zero or centered position when the two inputs to each of the differentials 450 and the other corresponding differentials 465, 466 and 467 to be described are equal to zero. Under these conditions of assembly, during an integration period, while the value of the input into the differential 461 through the connector 460 is clamped or locked at a value $J\theta_t$, the output of the integrator 447 fed into the other input of the differential 461 will be $\theta_t - J\theta_t$, so that the output of the differential 461 fed into the differential 450 is $\theta_t$ and at the end of the speeded period $T_p$ will be equal to one of the predicted values $\theta_p$ to sampled. When the displacement which has been storing up in the cam 457 is unloaded through the connector 460 into the differential 461 in the manner described, the output of the differential 461 by this unloading action will, because of the initial zero setting at assembly, be equal to the input $\theta$ of the differential 450 just prior to said unloading action, as already described.

The unloading movement of the heart cam 457 moves the follower of the heart cam 455 relative to said heart cam 455, since said heart cam 455 is locked in position through clutch 453, while the follower of the heart cam 451 remains stationary, and the heart cam 451 is permitted to rotate.

As soon as the unloading is completed, the clutches 462, 456 and 453 are returned to the conditions shown in FIGURE 27, and the solenoid 458 is energized to release the follower of the heart cam 457 from the influence of said cam. This operation restores the follower of the heart cam 451 into centered position with respect to said cam, thereby causing the heart cam 455 to move into corresponding position, the follower of the heart cam 455 to be centered with respect to said cam, and the heart cam 457 to be moved into corresponding position. The device 440 is thereby set in the condition shown in FIGURE 27 for the next storing and unloading cycle.

The storing and unloading devices 441, 442 and 443 operate in certain respects in a manner similar to the unit 440 described, with inputs $p\theta$, $p^2\theta$ and $p^3\theta$ from the rate measuring device 394 (FIGURE 24) feeding into differentials 465, 466 and 467 respectively of said devices, corresponding to the differential 450 of the unit 440, to obtain the unloaded quantities $Jp\theta_t$, $Jp^2\theta_t$ and $Jp^3\theta_t$. These unloaded quantities constitute changes in the values of $p\theta_t$, $p^2\theta_t$ and $p^3\theta_t$ with respect to the values $p\theta$, $p^2\theta$ and $p^3\theta$ respectively, just prior to the unloading operation, i.e.

$$Jp\theta_t = p\theta_t - p\theta; \quad Jp^2\theta = p^2\theta_t - p^2\theta \text{ and } Jp^3\theta_t = p^3\theta_t - p^3\theta$$

The storing and unloading devices 441, 442 and 443 include differentials 468, 469 and 470 respectively having one set of inputs arranged to receive the unloaded quantities $Jp\theta_t$, $Jp^2\theta_t$ and $Jp^3\theta_t$, having another set of inputs for receiving quantities from the output of preceding integrators and having outputs arranged to adjust the carriages of the integrators 447, 446 and 445 with revised initial values $p\theta$, $p^2\theta$ and $p^3\theta$ respectively at the beginning of each integration cycle. Immediately after each unloading cycle, the initial resetting quantity imposed upon the carriage of the integrator 447 is equal in value to the input $p\theta$ of the differential 465 just prior to the unloading cycle; the initial resetting quantity imposed upon the carriage of the integrator 446 is equal in value to the input $p^2\theta$ of the differential 466 just prior to the unloading cycle; and the initial resetting quantity imposed upon the carriage of the integrator 445 is equal in value to the input $p^3\theta$ of the differential 467 just prior to the unloading cycle.

After the output of the differential 461 is fed into the differential 450 and the outputs of the differentials 468, 469 and 470 are imposed upon the carriages of the integrators 447, 446 and 445 respectively for initial value resetting purposes, the timing discs in the integrators 444, 445, 446 and 447 are started to initiate the integrating cycle. These discs are rotated at increased speeds through a number of revolutions corresponding to the value of $T_p$ but for an actual period which is a small fraction of the actual time $T_p$. During this integrating cycle, the angular velocity functions $w_1^2 w_2^2$ and $w_1^2 + w_2^2$ are fed into the system and combined with the values of $p^2\theta_t$ and $\theta_t$ to obtain the value $p^4\theta_t$ for introduction into the carriage of the first integrator 444.

It is desirable that the angular velocity functions $w_1^2 w_2^2$ and $w_1^2 + w_2^2$ be smoothed out to the values indicated as $\overline{w_1^2 w_2^2}$ and $\overline{w_1^2 + w_2^2}$ before these functions are fed into the oscillating prediction mechanism shown in FIGURE 27. For that purpose, there is provided an integrator type follow-up unit 475 for smoothing the quantity $w_1^2 w_2^2$ coming from the output of the angular velocity function computer 409 (FIGURE 26) to the value $\overline{w_1^2 w_2^2}$ and a similar integrator type follow-up unit 476 for smoothing the quantity $w_1^2 + w_2^2$ also derived from said computer to the value $\overline{w_1^2 + w_2^2}$. Each of these units 475 and 476 comprises an integrator having its carriage set from the output of a differential into which the angular velocity function to be smoothed out is fed and having its output returned as an input into said differential. The operational performance of the integrator unit 475 is as follows:

$$w_1^2 w_2^2 - \overline{w_1^2 w_2^2} = k_1 d\frac{\overline{(w_1^2 w_2^2)}}{dt} = \overline{k_1(w_1^2 w_2^2)}$$

where $k_1$ equals the constant of the integrator.

Employing operational notation, in which $$p = \frac{d(\ )}{dt}$$

we obtain $$\overline{w_1^2 + w_2^2} = \frac{w_1^2 + w_2^2}{k_1 p + 1}$$

$$\frac{1}{k_1 p + 1}$$

constituting the performance operator of the unit 475 Similarly, it is seen that $$\overline{w_1^2 + w_2^2} = \frac{w_1^2 + w_2^2}{k_2 p + 1}$$

is the performance equation of the integrator unit 476, $k_2$ being the constant of the integrator in said unit.

It is also desirable that the quantities $w_1^2 w_2^2$ and $w_1^2 + w_2^2$ be locked in value during the integrating prediction period, so that no change in these quantities can occur during this period and the oscillating angle prediction mechanism will be concerned with constant angular velocities $w_1$ and $w_2$. For that purpose, each of the output connections from the integrator units 418 and 428 in the angular velocity computer 409 (FIGURE 26) has a clutch 477 which will slip when the driven element of the clutch is locked against rotation. For locking this driven clutch element, there is provided a second clutch 478 one element of which is connected to the driven element of the clutch 477, the other element being secured to a fixed frame 479. At the proper time, after the initial values have been set into the oscillating prediction mechanism of FIGURE 27 and before the integration prediction cycle starts, the clutches 477 (FIGURE 26) are closed or engaged, thereby locking the driven elements of the clutches 477 and fixing the inputs into the corresponding integrator type smoothing units 475 and 476 (FIGURE 27). At the same time, the drives of the integrator discs in these units 475 and 476 are stopped.

The following differential equation $$p^4 \theta_t = -(\overline{w_1^2 + w_2^2}) p^2 \theta_t - \overline{w_1^2 w_2^2} \theta_t \quad (85b)$$

derived from Relation 85 must be solved for the quantity $\theta_t$ by the oscillating prediction mechanism of FIGURE 27 during the integration cycle. For that purpose, the output $\overline{w_1^2 w_2^2}$ from the smoothing unit 475 is fed into a multiplier 480 in conjunction with the quantity $\theta_t$ to obtain the product $(\overline{w_1^2 w_2^2}) \theta_t$. At the same time, the output $\overline{w_1^2 + w_2^2}$ from the smoothing unit 476 is fed into a multiplier 481 in conjunction with the quantity $p^2 \theta_t$ to obtain the product $(\overline{w_1^2 + w_2^2}) p^2 \theta_t$. The two products described are then fed into a differential 482 to obtain the output quantity $p^4 \theta_t$ according to Relation 85b. This quantity $p^4 \theta_t$ is set in the carriage of the first integrator 444 of the oscillating prediction mechanism and then integrated through succesive stages by means of the integrators 444, 445, 446 and 447 to obtain the quantity $\theta_t$. The successive integration take place and are completed with the drive discs of the integrators 444, 445, 446 and 447 speeded up, so that the discs make the required number of revolutions corresponding to the peirod $T_p$ in a shortened time. The sampled value of $\theta_t$ obtained thereby will approximate the true predicted value of $\theta_p$ required and will get closer thereto during succeeding oscillating prediction cycles, until the predicted instant of landing has been reached. Since the value of $T_p$ becomes progressively smaller as the predicted instant of landing approaches, the time required for each integration and prediction cycle becomes correspondingly smaller.

The quantity $\theta_t$ is sampled during each integration cycle, as hereinafter described, at the particular time $t = T_p$. At this instant, $\theta_t = \theta T_p = \theta_p$, which is the predicted angle required. On successive integration cycles the magnitude of $T_p$ will decrease in successive steps by an amount which is approximately equal to the actual time required for the preceding integration cycle. The sequential values of $\theta_p$, obtained by sampling $\theta_t$ at $t = T_p$ on each successive integration cycle, should all be equal in value provided the conditions on which the prediction is based remain unchanged. Normally, however, these conditions will change and accordingly the sequence of values of $\theta_p$ will differ by small amounts.

The output $\theta_t$ at the end of a speeded $T_p$ period in each integration cycle is equal approximately to the predicted $\theta_p$, but may be changed in value by the next integration cycle because of the new initial values set into the carriages of the integrators 445, 446 and 447 and because of the time factor $T_p$. Therefore, to assure a substantially continuous output of the predicted $\theta_p$ quantity without material variations, the quantity $\theta_t$, varying during the integration cycle, is stored during this cycle by means of a storing, sampling and smoothing device 483, is sampled at the end of the speeded $T_p$ period when $\theta_t$ approximates $\theta_p$ in value, and is smoothed out for substantially continuous delivery by said device. For the purpose of obtaining a continuous $\theta_p$ output from a sequence of discrete values of $\theta_p$, the storing, sampling and smoothing device 483 is used, which is similar to the initial value resetting device 440. This device 483 comprises a shaft connected to the output of the differential 461 to carry the quantity $\theta_t$, a differential 450' with the input $\theta_t$, the input $\theta_p$ and an output equal to the difference between these inputs and connected to a heart cam 451' for storing and releasing rotational displacements at time intervals. The heart cam 451' has a follower secured to a shaft 452' having a locking clutch connection 453' to a fixed frame 454' and carrying a heart cam 455'. The follower of the heart cam 455' is connected to an element of a clutch 456' and to a heart cam 457' having its follower spring-pressed during certain phases towards the cam 457' and controlled by a solenoid 458'. The other element of the clutch 456' is rigidly connected by an unloading connector 460' to the input of the differential 450' and to the input of an integrator type smoothing unit 488 and is also connected to one element of another locking element 462', the other element of which is anchored to a fixed frame 463'.

The storing, sampling and smoothing device 483 is shown in FIGURE 27 at the instant immediately after the value of $\theta_p$ has been sampled. At that instant, the clutches 453' and 456' are unlocked or disengaged, the clutch 462' is locked or engaged, the heart cams 451', 455' and 457' are in centered position, and the solenoid 458' is energized, so that the follower controlled by said solenoid is withdrawn from the heart cam 457'. During integration while the clutches 453', 456' and 462' are in the position shown in FIGURE 27, the quantity $\theta_t$ is being stored in the heart cam 457' by angular displacement thereof, through the operation of the heart cams 451' and 455'. At the end of a speeded $T_p$ integration period, the clutches 453' and 456' are locked or engaged, the clutch 462' is disengaged or unlocked and the solenoid 458' is deenergized to permit the follower of the heart cam 457' to be spring-pressed against said cam 457' to rotate said cam 457' into centered position with respect to said follower. This operation unloads the stored sample quantity $\theta_p$ through the engaged clutch 456', through the connector 460' and into the integrator type smoothing unit 488, where it is smoothed to produce the quantity $\theta_p$. After the sampling operation described, the clutches 453', 456' and 462' are restored to the condition shown in FIGURE 27.

FIGURE 28 shows diagrammatically a timing and control arrangement for the angular velocity computer 409 (FIGURE 26) and for the oscillating prediction mechanism 439 of FIGURE 27, by which the different cycles and phases of operation are initiated and terminated at the proper time, the solid lines indicating mechanical movements and the dotted lines electrical impulses. This arrangement comprises a $T_p$ storing and unloading device 489 similar to the $J_p{}^n\theta_t$ storing and unloading devices of the prediction mechanism 439 of FIGURE 27 and including heart cams 490, 491 and 492, the latter being solenoid controlled, a coupling clutch 493, locking clutches 494 and 495 and a differential 496. The $T_p$ storing and unloading device 489 is shown in condition at the beginning of the $J_p{}^n\theta_t$ storing cycle of the oscillating prediction mechanism 439 of FIGURE 27 and at the beginning of the integrating cycle operating with the settings of the quantities obtained from the previous $J_p{}^n\theta_t$ storing and unloading cycle. During this phase of the operation of the device 489, the quantity $T_p$ (predicted time) derived from the output of the time prediction computer 35 of FIGURE 8 is continuously being fed into the differential 496 to cause corresponding rotational displacement of the heart cam 492, while its controlling solenoid 499 is energized to withdraw the follower of said cam into inoperative position. At a proper time, after the previous integrating cycle has been completed, the clutches 493, 494 and 495 are reversed from the condition shown in FIGURE 28 and the solenoid 499 is deenergized, causing thereby the follower of the heart cam 492 to be spring-pressed against said heart cam and said heart cam to be centered with respect to said follower. The resulting rotative return movement of the heart cam 492 is transmitted through an unloading connector 497 as another input of the differential 496 and also to an input of a second differential 498. The shaft of a motor 500 connects through a speed reduction gearing (not shown) and through a clutch 501 into the other input side of the differential 498 to feed the quantity $t$. A brake 502 is mounted for action upon the shaft of the motor 500 and a connection 503 leads from the output of said motor to drive the timing discs on the integrators 444, 445, 446 and 447 of the oscillation prediction mechanism of FIGURE 27.

Connected to the driven side of the clutch 501 is a heart cam 504 having a spring-pressed follower controlled from a solenoid 505. The output of the differential 498 operates a switch 506 which controls the circuit of this solenoid 505, the circuit of the motor 500, and the operation of the brake 502 and also controls the clutches 493, 494 and 495 in the $T_p$ storing and unloading device 489 of FIGURE 28, and the clutches 453, 456 and 462 and the solenoids 458 of the heart cams 457 in all the $J_p{}^n\theta_t$ storing and unloading devices 440, 441, 442 and 443 of the mechanism of FIGURE 27. A motor 507 driving the timing discs in the smoothing integrator units 475 and 476 of FIGURE 27 and a brake 508 for the shaft of said motor and the clutches 478 (FIGURES 26 and 28) for locking the angular velocity function quantities at appropriate times are also controlled from the switch 506. This switch 506 serves when closed, to effect operations of the motor 500 and release of the brake 502 and to energize the solenoid 505 by closing the circuits of these devices, and serves by appropriate electrical control expedients such as relays and the like, well-known in the art, to effect when the switch 506 is opened and/or closed, switch-overs in the clutches 493, 494 and 495 of the $T_p$ storing and unloading device 489 of FIGURE 28 and in the clutches 453, 456 and 462 of the $J_p{}^n\theta_t$ storing and unloading devices 440, 441, 442 and 443 of FIGURE 27, control of the circuit or circuits of the solenoids 458 of the heart cams 457 in said $J_p{}^n\theta_t$ storing and unloading devices, control of the circuit of the brake 508 and of the motor 507 driving the timing discs of the smoothing integrator units 475 and 476 in the mechanism of FIGURES 27 and 28, switch-overs in the clutches 478 (FIGURES 26 and 28) for locking the angular velocity function quantities at appropriate times, switch-overs in the clutches 453', 456' and 462' of the sampling device 483 of FIGURE 27 and control of the circuit of the solenoid 458' in said sampling device. If desired the switch 506 may operate to open one circuit or set of circuits and close another circuit or set of circuits alternately to control the different devices therefrom. The particular electrical hook-up between the switch 506 and the different devices it controls is well within the compass of those skilled in the art, and need not be described herein with any further particularity.

In operation, while the device 489 is storing $T_p$ displacement, the timing system is in the condition shown in FIGURE 28, with the motor 500 operating, so that the integrators 444, 445, 446 and 447 in the oscillating prediction mechanism of FIGURE 27 are operating; the clutch 501 is engaged, so that drive from the motor 500 is transmitted to the $t$ input of the differential 498; the other $T_p'$ input of the differential 498 is locked into the unloaded condition of the previous cycle by the engaged clutch 495; the solenoid 505 is energized, so that the heart cam 504 is free to rotate with the $t$ input to the differential 498; the device 489 is going through the phase of loading up the displacement of the $T_p$ input through the differential 496 for the next integrating cycle; the clutches 478 for locking the angular velocity function quantities fed into the mechanism of FIGURE 27 periodically are engaged; so that the mechanism of FIGURE 27 is operating with these quantities constant; the motor 507 for driving the drive discs of the smoothing integrator units 475 and 476 of FIGURE 27 is not operating and the brake 508 for said motor 507 is applied; the clutches 453', 456' and 462' in the sampling device 483 are in the condition shown in FIGURE 27 and the solenoid 458' is energized to render the follower for the heart cam 457' inoperative, so that the $\theta_t$ output quantity is being stored. The switch 506 is such as to be closed when there is a difference in the inputs to the differential 498, and since the $t$ input starts operating from a zero setting, this difference becomes progressively smaller, until the $t$ input of said differential is equal to the other input $T_p'$ which has been unloaded from the device 489 and locked by the clutch 495. The input $t$ to the differential 498 is operated at a speeded rate to turn through a number of revolutions equivalent to the predicted time $T_p$ within a period which is a small fraction of the actual $T_p$ period. When the $t$ input to the differential 498 has made the required number of turns equivalent to the other $T_p'$ input to said differential, the switch 506 opens, and this opens the circuit of the motor 500, applies the brake 502, disengages the clutch 501, deenergizes the solenoid 505, so that the follower of the heart cam 504 is permitted to be spring-pressed against said heart cam, thereby causing said heart cam to be centered with respect to said follower and the $t$ input to the differential to be adjusted back to its zero setting. At the same time, the clutches 478 (FIGURES 26 and 28) for locking the angular velocity function quantities fed into the mechanism of FIGURE 27 are disengaged, the brake 508 on the motor 507 driving the timing discs of the smoothing integrator units 475 and 476 in said mechanism is released, the motor 507 is started, the clutches 453', 455' and 462' in the sampling device 483 of FIGURE 27 are switched over from the condition shown, the solenoid 458' in said sampling device is deenergized to sample the $\theta_t$ output, the clutches 493, 494 and 495 in the timing system of FIGURE 28 are switched over from the $T_p$ storing condition shown to a $T_p'$ unloading condition and the solenoid 499 of the heart cam 492 is deenergized to permit the follower of said cam to be released into spring-pressed position to center the cam and thereby return it into original position. Because of the disengagement of the locking clutch 495, this cam centering operation causes unloading of the displacement of the heart cam 492 to the connector 497 through the engaged clutch 493 and imposes the resulting unloaded displacement $T_p'$ as inputs upon the differentials 496 and 498. The difference between the zero $t$ setting and the unloaded quantity $T_p'$ imposed upon the differential 498, closes the switch 506 after a delay period sufficient to permit the full unloading of the input quantity $T_p'$ into said differential and the resetting of the other input $t$ to said differential to zero and thereby releases the brake 502, starts the motor 500, engages the clutch 501, energizes the solenoid 505, so that the follower of the heart cam 504 is withdrawn into inoperative position and reverts the control elements in the mechanism of FIGURE 27 back to the condition shown. This delay in the closing of the switch 506 may be effected through a time delay relay built into said switch, this relay being operative when the switch is being closed but inoperative when the switch is being opened, to effect instantaneous opening of said switch immediately upon the $t$ input of the differential 498 of FIGURE 28 attaining the value of the other input $T_p'$ into said differential. The cycle is then repeated as described.

FIGURE 29 shows diagrammatically a prediction oscillating mechanism electrically operated and controlled in a manner similar to the mechanical device of FIGURES 27 and 28 and adapted to be used in conjunction with the rate measuring device 394a of FIGURE 25 and the angular velocity function computer 409 of FIGURE 26, the solid lines in said diagram indicating electric impulses and the dotted lines indicating mechanical displacements, as for example shaft rotations. FIGURE 30 shows diagrammatically a form of electronic switch employed as part of the prediction oscillating mechanism of FIGURE 29. FIGURE 31 shows diagrammatically another form of electronic switch which may be employed as part of the prediction oscillating mechanism of FIGURE 29. FIGURE 32 shows diagrammatically the multivibrator and trigger circuit constituting the timing device for the oscillating prediction mechanism of FIGURE 29, the solid lines indicating electric impulses and the dotted lines indicating mechanical displacements.

Referring to FIGURE 29, there are provided four similar main networks 520, 521, 522 and 523 for setting initial values into integrating devices and for integrating with said initial settings to obtain prediction $\theta_t$ samples. Each of these main networks comprises a comparison or adding network 525 equivalent to a mechanical differential, an amplifier 526 at the output of said comparison network, an electronic switch 527 shown more fully in FIGURES 30 and 31 and controlled from a free-running multivibrator 528 shown more fully in FIGURE 32, an integrating network designed with the proper constant to speed up integration so that an integration corresponding to a $T_p$ period is carried out therewith within a small fraction of this period and including a grounded condenser 531 and a resistance 532 for integrating the voltage output of the preceding main network starting from the initial settings derived from the output of the comparison network 525, the condenser corresponding to the output roller of a mechanical integrator, an amplifier 533 on the output side of the integrating network 531, 532 for the purpose of repeating the voltage $p^n\theta$ from the condenser 531 of the integrating network and for supplying integrator circuit load power without condenser drain, an integrator input voltage repeater comprising an adding network 537, a feed-back resistor 536, an unloading amplifier 535 and an inverter 534 to correct polarity of the feedback. The feed-back leg of the adding network 537 from the amplifier 533 is necessary for system stabilization.

The values $\theta$, $p\theta$, $p^2\theta$ and $p^3\theta$ are fed as input voltages from the electrical rate measuring device 394a of FIGURE 25 into the comparison networks 525 respectively of the four main networks 520, 521, 522 and 523 arranged as a chain. Current of predetermined square wave voltage characteristics is sent out by the multivibrator 528 to the switches 527 to close said switches for periods corresponding to the duration of certain selected phases (zero potential) of the voltage wave, as will be more fully described. This switch closing time interval is made sufficient to charge the condensers 531 in the integrating networks 531, 532 with voltages equal to $\theta$, $p\theta$, $p^2\theta$ and $p^3\theta$ respectively as initial settings. These initial settings are obtained by the comparison networks 525 having as one set of inputs the quantities $\theta$, $p\theta$, $p^2\theta$ and $p^3\theta$ obtained from the electrical rate measuring device 394a of FIGURE 25 as described and having as the other set of input the quantities $\theta_t$, $p\theta_t$, $p^2\theta_t$ and $p^3\theta_t$ obtained as the outputs of the integrating circuits 531, 531 respectively during the previous integrating cycle, as will be more fully described. The comparison networks 525 thereby give outputs $\theta-\theta_t$, $p\theta-p\theta_t$, $p^2\theta-p^2\theta_t$ and $p^3\theta-p^3\theta_t$ respectively, which are amplified by the units 526, fed through the corresponding closed resetting switches 527 and supplied to the integrating circuit condensers 531 only as long as there is a difference in the voltages between the inputs of each of the comparison networks. When, as a result of closing the switches 527, $\theta_t$ becomes equal to $\theta$, $p\theta_t$ becomes equal to $p\theta$, etc., the resetting action on the integrating circuits 531, 532 is complete, and we have initial voltages $\theta$, $p\theta$, $p^2\theta$ and $p^3\theta$ on the integrating condensers 531. At that time, the voltge from the multivibrator 528 passes through a phase (non-zero potential) to cause the switches 527 to open simultaneously, as will be more fully described, so that no further charging of the integrating circuit condensers 531 from the comparison networks 525 takes place, while successive integrations are initiated with the initial known $\theta$, $p\theta$, $p^2\theta$ and $p^3\theta$ settings in the integrating circuits.

Each of the main networks 520, 521 and 522 receives a voltage $p^n\theta_t$ from the output of the integrating network 531, 532 next in the chain as well as a voltage from the inverter 534 in said network which is stabilizing feedback of the unloading amplifier 535 and a system stabilizing voltage from said main network output. The integrated results $\theta_t$, $p\theta_t$, $p^2\theta_t$ and $p^3\theta_t$ are incidentally fed back into the comparison networks 525 respectively, where no effect is produced since the switches 527 are open.

The differential equation satisfied by $\theta_t$ is $$p^4\theta_t = -\overline{w_1^2+w_2^2}\theta_t - \overline{w_1^2w_2^2}p^2\theta_t \qquad (85b)$$

To solve this equation for the quantity $\theta_t$, the quantity $\overline{w_1^2w_2^2}$ obtained from the output of the angular velocity function computer 409 of FIGURE 26, after being smothed by a unit (not shown) similar to the unit 475 of FIGURE 27, is supplied as a slider movement to a potentiometer 540 at the same time the voltage $\theta_t$ is imposed on the coils thereof, to obtain the product $\overline{w_1^2w_2^2}\theta_t$. At the same time, the quantity $\overline{w_1^2+w_2^2}$ obtained as the other output of the angular velocity function computer 409 of FIGURE 26, after being smoothed in a manner described is supplied as a slider movement to a potentiometer 541 in conjunction with the quantity $p^2\theta_t$ to obtain the product $\overline{(w_1^2+w_2^2)}p^2\theta_t$. The two products are added together in an adding network 542 to obtain the quantity $p^4\theta_t$ which after amplification in a unit 543 is imposed upon the main network 523 for the first integration step.

The angular velocity function quantities are fed into the device of FIGURE 29 while the switches 527 are closed and the integrator network condensers 531 are being charged to the initial values $\theta$, $p\theta$, $p^2\theta$ and $p^3\theta$, and are locked at the same time the switches 527 are opened, so that no changes in these quantities in the system during the integrating cycle or prediction time can occur. This periodic locking of the angular velocity function quantities is accomplished by providing slip clutches and lock-out clutches (not shown) in the smoothing integrator set-ups for these quantities, similar to the clutches 477 and 478 of the smoothing integrator set-ups 475 and 476 employed in the mechanisms of FIGURES 27 and 28 and by interrupting the motor drive to the timing discs of the smoothing integrator setups, as in said mechanisms of FIGURES 27 and 28.

The predicted value of $\theta_t$ obtained at the end of each speeded $T_p$ integration period is sampled, stored and smoothed by a device 483a comprising an electronic sampling switch 545 operated from a trigger circuit 546 controlled from the multi-vibrator 528 in a manner to be described, a storing condenser 547, an unloading amplifier 548 and a smoothing network 550. At intervals at the end of each speeded $T_p$ integration period, the switch 545 is closed, and the predicted quantity $\theta_p$ is stored in the condenser 547, repeated therefrom by isolation amplifier 548 and smoothed by network 550. When the switches 527 are closed, the sampling switch 545 is open, but the voltage across the storing condenser 547 still continues to be repeated to the input of the smoothing network 550, so that a substantially continuous output is assured.

FIGURE 30 shows a new and improved form of electronic switch which embodies certain features of the present invention and which may be employed not only for the switches 527 in the circuits for resetting initial values into the integrating circuits of the oscillating prediction mechanism shown in FIGURE 29, but also for the sampling switch 545 in the storing, sampling and smoothing device 483a of said mechanism shown in FIGURE 29. This switch comprises a pair of diodes 553 and 554 and a pair of diodes 555 and 556, the two pairs being arranged back to back to define a bidirectional conducting path from lead A to lead B and/or lead B to lead A. If the lead A is positive with respect to lead B, the conducting path is through the diodes 553 and 555 and if the lead A is negative with respect to lead B, the conducting path is through the diodes 554 and 556. To employ this diode configuration as a switch, a control voltage is imposed on the circuit at points $C_1$ and $C_2$ through resistors $R_1$ and $R_2$ respectively connected to two leads $D_1$ and $D_2$ at their control ends. These leads $D_1$ and $D_2$ in the case of the rate resetting switches 527 are connected to the multi-vibrator 528 and in the case of the sampler switch 545 are connected to the controlled multivibrator 571 in the trigger circuit 546 as shown in FIGURES 29 and 32.

Resistor $R_1$ is connected to the negative potential of a source of square wave voltage through its lead $D_1$ and resistor $R_2$ is connected to the positive potential of this source of square wave voltage through its lead $D_2$. When the square wave voltage of the source is at the phase to impose a negative potential on the lead $D_1$ and a positive potential on the lead $D_2$, the diodes 555 and 556 are not conducting and the lead B is completely isolated from lead A. Diodes 553 and 554 on the other hand are conducting and a circulating current exists in the loop $D_2$, $R_2$, $C_2$, 554, A, 553, $C_1$, $R_1$, $D_1$. Since the leads $D_1$ and $D_2$ are of opposite polarity but equal in amplitude, a virtual ground exists at A when the switch is open.

When the voltage in the leads $D_1$ and $D_2$ is zero due to the corresponding phase of the square wave voltage of the source, either the diode 555 or the diode 556 becomes conducting, so that the switch is closed from lead A through the diodes 553 and 555 to lead B or from lead A through the diodes 554 and 556 to the lead B, according to the sign of the potential of the lead A with respect to the lead B.

FIGURE 31 shows another new and improved form of electronic switch which embodies certain features of the present invention and which may be employed for the resetting switches 527 and the sampler switch 545 in the oscillating prediction mechanism of FIGURE 29. This modified form of switch designated by the numerals 545b, 597, 598, 600 and 601 in the oscillating prediction mechanism of FIGURES 38 and 38a to be described, is similar to the switch shown in FIGURE 30, except that the two resistors $R_1$ and $R_2$ have a common lead or connection D at their control end connected to a source of square wave voltage through a multivibrator as in the case of the switch of FIGURE 30. If this lead D is at a high positive potential, diodes 553 and 556 are nonconductive and the circuit from A to B is thus open and if the lead D is highly negative, diodes 555 and 554 are nonconductive and the circuit from A to B is open. The switch is closed in either case by driving D to ground or zero potential. If resistors $R_1$ and $R_2$ are high (megohms), points $C_1$ and $C_2$ assume a potential approximating the mean of the potential of the leads A and B and the switch is thereby closed.

While the switch of FIGURE 31 is open (high potential at D) one pair of diagonally opposite diodes are non-conducting as indicated above. Simultaneously, however, the other pair of diagonally opposite diodes are conducting, and thus serve to define part of a conducting path from A to D and from B to D through resistors $R_1$ and $R_2$ respectively. Since $R_1$ and $R_2$ are resistors of high value, these paths do not detract in general from the operation of the diode circuit as a switch. If, however, circuit considerations at A and B are such as to make such a condition undesirable, the circuit shown in FIGURE 30 is more desirable.

FIGURE 32 shows the circuits of the multivibrator 528 and of the trigger circuit 546 for controlling the resetting switches 527 and the sampler switch 545 in the prediction oscillating mechanism of FIGURE 29 and for thereby controlling the timing and sequencing of the different operations of the oscillating prediction system. FIGURE 33 is a chart indicating the different cycles of operation of the oscillating prediction mechanism and the corresponding voltage wave and pulse characteristics emanating from different parts of the multivibrator 528 and of the trigger circuit 546. FIGURE 32 shows in conjunction with the parts in full lines for electric impulses and dotted lines for mechanical displacements, one form of multivibrator to be used to control directly only one set of electronic switches of the type indicated in FIGURES 30 and 31 simultaneously into open and closed position as in the circuit of FIGURE 29 and in conjunction with the added summing network parts indicated in dot and dash lines, shows an alternative form to control directly two sets of electronic switches of the type shown in FIGURES 30 and 31 alternately, so that one set is open and the other set is closed, as in the circuit of FIGURES 38 and 38a to be described.

The multivibrator 528 is of the well-known free running type operating at natural frequency, and considering the form shown without the summing network indicated in dot and dash lines, has two output leads $D_1'$ and $D_2'$ connecting to the control leads $D_1$ and $D_2$ of the electronic rate resetting switches 527 shown in FIGURES 29 and 30 to control said switches. The output voltage of this multivibrator 528 has square wave characteristics varying from zero to positive potential and back to zero, as shown by the curve G of FIGURE 33, the wave having equal periods, g of zero potential separated by equal periods g' of positive potential. The output lead $D_2'$ of positive potential is connected through a condenser 560 to the trigger circuit 546 to translate the voltage wave into positive and negative pulses of short duration occurring whenever the wave G goes through a reverse phase, as indicated by the curve H.

The trigger circuit 546 includes a pair of triodes 561 and 562, a sweep gating tube 563, a pair of charging condensers 564 and a boot strap circuit including a triode 566 and a condenser 567, to cause the condensers 564 to charge linearly instead of exponentially. The output of the triode 562 feeds through a condenser 568 and an amplifier 570 and branches off from the output of this amplifier, with one branch going to a controlled multivibrator 571 having output leads $D_1''$ and $D_2''$ corresponding to the control leads $D_1$ and $D_2$ in the electronic sampling switch 545 shown in FIGURES 29 and 30 to control said sampling switch, and with the other branch going to a controlled multivibrator 572. The output of the condenser 560 feeds into this multivibrator 572 and the output of said multivibrator connects to the control grid of the sweep gating tube 563.

The predicted time period $T_p$ determined as a shaft rotation or mechanical displacement from the prediction time computer 35 (FIGURE 8) as already described is imposed as a slider movement upon the resistance coils of a potentiometer 573 excited by a reference voltage and since the value of $T_p$ progressively decreases as the predicted time approaches, the output voltage of potentiometer 573 will have a linear decreasing characteristic indicated by the downwardly sloping line A, A′, A″ etc. in FIGURE 33. This progressively decreasing voltage is constantly impressed on the grid of the triode 561. This causes the triode 561 to conduct and in so doing furnishes a cut-off bias for triode 562 through the common cathode resistor 561a.

During the periods when the rate resetting switches 527 in the prediction oscillating mechanism of FIGURE 29 are to be closed, the wave G (FIGURE 33) corresponding to the output of the multivibrator 528 is passing through the zero potential phases $g$, so that said switches are closed, as already described in connection with FIGURE 30. During these $g$ phases of operation, no pulses are being sent to the multivibrator 572 of the trigger circuit 546, as indicated by the curve H (FIGURE 33), the triode 562 is non-conducting and the sweep gating tube 563 is conducting to ground, so that no current reaches the condensers 564. As soon as the voltage G from the free running multivibrator 528 changes from zero potential towards positive potential at the end of a zero potential period $g$, the rate resetting switches 527 in the oscillating prediction mechanism of FIGURE 29 are simultaneously opened, and the rate resetting interval thereby terminated. At the same time, this changeover from zero potential to positive potential, creates a positive pulse $h$ (FIGURE 33) at the output of the condenser 560, which is fed into the input of the controlled multivibrator 572 (FIGURE 32) to produce at the output thereof a square wave voltage of varying periods, as shown by the curve J in FIGURE 33. The negative phases of this voltage J impressed upon the grid of the tube 563 causes said tube to become non-conducting, allowing a voltage, modified by the boot strap circuit 566, 567 to be built up in the condensers aA, a′A′, a″A″, etc. (FIGURE 33) until the charged voltages indicated by the points A, A′, A″ etc. are the same as the voltages derived from the output of the $T_p$ potentiometer 573. While the condensers 564 are charging, the triode 562 is non-conducting but the potential of its grid is varying as indicated by the curve K (FIGURE 33) following a varying saw-tooth wave pattern. When the voltage impressed upon the grid of the triode 562 is the same as the voltage impressed on the grid of the triode 561 from the output of the $T_p$ potentiometer 573, the triode 562 becomes conducting and there is created a voltage drop at the plate of triode 562, which when amplified (and differentiated) in the unit 570 has the characteristic shown by the curve L in FIGURE 33. The pulse 1 created at the instant the voltages on the grids of the two triodes 561 and 562 become equal is impressed upon the controlled multivibrator 571 and causes the voltage emanating from said multivibrator to go to zero potential, thereby causing the sampling switch 545 of the oscillating prediction mechanism of FIGURE 29 controlled from said multivibrator to be closed as already described, so that the predicted $\theta_t$ quantity is sampled at the time $T_p$ of the prediction integration interval. The voltage at point M of FIGURE 32 remains at zero for periods $m$ indicated in the curve M (FIGURE 33), these periods being long enough to permit proper sampling and storing of the sampled quantity $\theta_t$ in the condenser 547 of the sampling, storing and smoothing device 483a of FIGURE 29.

The pulse 1 from the output of the amplifier 570 at the same time it is impressed upon the controlled multivibrator 571 to close the sampling switch 545 (FIGURE 29) is also impressed upon the controlled multivibrator 572 and causes the output voltage from said multivibrator 572 to switch from a negative potential to a positive potential, as indicated by the curve J, and this restores the sweep gating tube 563 to quiescent state until the next rate resetting cycle, when the cycle is again initiated by the next positive pulse $h$ (FIGURE 33) impressed upon the controlled multivibrator 572 from the free running multivibrator 528. Although negative pulses $h'$ are discharged from the condenser 560, during the switchover from a positive potential to zero potential in the input to said condenser, these negative pulses have no effect on the controlled multivibrator 572.

The integrating networks 531, 532 in the oscillating prediction mechanism of FIGURE 29 are designed with the proper constant to speed up integration, so that an integrating operation corresponding to a full $T_p$ period at the beginning of a $T_p$ run is carried out within a small fraction of this period indicated by the periods $T_p'$ in FIGURE 33, as already described. The speeded integration periods $T_p'$, $T_p''$, $T_p'''$ etc. become progressively smaller, as the end of the $T_p$ run is reached, since each speeded up integration period corresponds to a progressively smaller $T_p$ period. The trigger circuit 546 is designed so that the intervals during the charging of the condensers 564 to the points A, A′, A″ etc. indicated by the periods $T_p'$, $T_p''$, $T_p'''$ etc. in FIGURE 33 correspond to the periods required for integration by networks 531, 532 (FIGURE 29) at the speeded rate to cover the actual $T_p$ periods.

The rate resetting periods may be measured in terms of milliseconds, as for example one millisecond, and the maximum $T_p'$ period may also run into milliseconds, as for example 9 or 10 milliseconds. Therefore, during the full $T_p$ run, the oscillating prediction mechanism goes through many hundreds of rate resetting and integrating cycles.

The multivibrator 528 of FIGURES 29 and 32 is not only operable to control the rate resetting switches 527 (FIGURE 29) through the leads $D_1'$ and $D_2'$ (FIGURE 32) of said multivibrator as already described, but is also operable to control other similar electronic switches (not shown) for controlling the lock-out clutches (not shown) if such are used, in the smoothing integrator units for the angular velocity function quantities $w_1^2 w_2^2$ and $w_1^2 + w_2^2$, similar to the clutches 477 and 478 of the smoothing integrator units 475 and 476 employed in the system of FIGURES 27 and 28 and to control similar electronic switches (not shown) for interrupting the motor drive to the timing discs of the smoothing integrator units and for at the same time applying a brake to the shaft driving said discs, as in said system of FIGURES 27 and 28. These locking, drive interrupting and brake applying control switches may be controlled either through the leads $D_1'$ and $D_2'$ in the multivibrator 528 or if one set of electronic switches is to be closed, while another set is to be opened, and if the condition of these two sets of switches is to be reversed at the same time, then summing networks may be added to the circuit of the multivibrator 528, as indicated in dot and dash lines in FIGURE 32, to provide the multivibrator 528 with the proper bias, so that while one set of output leads is at zero, the other set of leads is at positive or negative potential. One set of these leads is connected to one set of electronic switches to be opened and closed simultaneously and the other set of leads is connected to the other set of electronic switches. By means of this arrangement, the angular velocity function quantities $w_1^2 w_2^2$ and $w_1^2 + w_2^2$ are fed into the device of FIGURE 29, while the rate setting switches 527 are closed and the integrator network condensers 531 are being charged to initial values and are locked at the same time the switches 527 are opened, so that no changes in these quantities in the device during the integrating predicting cycle can occur. It may not be necessary for the quantities $w_1^2w_2^2$ and $w_1^2+w_2^2$ to be locked in position during the very short time required for the electrical integration and prediction period, since the change in these quantities during a time of the order of milliseconds would be entirely negligible.

FIGURE 34 shows diagrammatically one manner in which the principal devices of the oscillating system are assembled to predict the pitch angle. In this assembly, the value $\theta_1$ which corresponds to the value $P_0$, the present pitch angle and which is derived as the shaft output of the stable element 21, FIGURE 3, is fed into the rate measuring device 395 shown in FIGURE 24, to obtain the quantities $\theta$, $p\theta$, $p^2\theta$, $p^3\theta$, $p^4\theta$ and $p^5\theta$ as shaft rotations. These latter quantities fed into the angular velocity function computer 409 of FIGURE 26 result in rotational quantities $w_1^2w_2^2$ and $w_1^2+w_2^2$. These angular velocity functions are smoothed out in the smoothing devices 475 and 476 of FIGURE 27, and the resulting quantities $\overline{w_1^2w_2^2}$ and $\overline{w_1^2+w_2^2}$ in conjunction with the quantities $\theta$, $p\theta$, $p^2\theta$ and $p^3\theta$ are fed into the mechanical oscillating prediction mechanism 439 shown in FIGURE 27 or the electrical oscillating prediction mechanism 439a shown in FIGURE 29. If the oscillating prediction mechanism is of the mechanical type shown in FIGURE 27 as device 439, then the quantities $\theta$, $p\theta$, $p^2\theta$ and $p^3\theta$ fed therein, are mechanical or rotational shaft displacements and the sequencing and timing device for controlling the sequences and periods of operation of the cycles is of the mechanical type shown as the device 489 in FIGURE 28. If the oscillating prediction mechanism is of the electrical type shown in FIGURE 29 as device 439a, then the mechanical displacement quantities $\theta$, $p\theta$, $p^2\theta$ and $p^3\theta$ must be converted into corresponding voltages before they can be delivered to the oscillating prediction mechanism 439a, and the sequencer and timer device for controlling the sequences and periods of operation of the cycles is of the electrical type represented by the multivibrator 528 and trigger circuit 546 in FIGURES 29 and 32.

The quantity $\theta_t$ obtained from the output of the oscillating prediction system is stored, sampled and smoothed for continuous delivery in a prediction storing, sampling and smoothing device. If the oscillating prediction mechanism employed is of the mechanical type represented by the mechanism 439 of FIGURE 27, the prediction storing, sampling and smoothing device is similar to the mechanical device 483 illustrated in FIGURE 27. If the oscillating prediction mechanism employed is of the electrical type as shown in FIGURE 29, then the prediction storing, sampling and smoothing device is similar to the electrical device 483a illustrated in FIGURE 29.

FIGURE 35 shows diagrammatically another manner in which the principal devices of the oscillating system are are assembled to predict the pitch angle. The assembly of FIGURE 35 is similar to that shown in FIGURE 34 and the component devices of the assembly of FIGURE 35 are similar to those of FIGURE 34, except that the rate measurement is aided and averaged by means of a feed-back of the quantity $p^6\theta'$ equal to $$-\overline{w_1^2w_2^2}p^2\theta - \overline{w_1^2+w_2^2}p^4\theta$$

back to the carriage of the integrator 396 of the rate measuring device 394b supplying the quantity $p^5\theta$ as shown in FIGURE 36, to give more accurate values of $\theta$, $p\theta$, $p^2\theta$, $p^3\theta$ used in setting initial conditions of the oscillating system.

The relationship $$p^6\theta = -w_1^2w_2^2p^2\theta - (w_1^2+w_2^2)p^4\theta$$

is a further derivative of the Relationship 85. Employing smoothed values of the angular velocity functions, we obtain the feed-back value $$p^6\theta' = -\overline{w_1^2w_2^2}p^2\theta - \overline{w_1^2+w_2^2}p^4\theta \qquad (85c)$$

The rate measuring device 394b to receive the feed-back $p^6\theta'$ is shown partially in FIGURE 36, the rest of this device being the same as the rate measuring device 394 shown in FIGURE 24. The rate measuring device 394b has a differential 585 having an input derived from output of comparison differential 395 (FIGURE 24) and an input $p^6\theta'$ derived in a manner to be described. The output of this differential 585 is fed into the carriage of the integrator 396 (FIGURE 36).

To obtain the necessary feed-back quantity $p^6\theta'$, the smoothed quantities $\overline{w_1^2w_2^2}$ and $\overline{w_1^2+w_2^2}$ from the output of the smoothers 475 and 476 (FIGURE 27) are fed to multipliers 586 and 587 (FIGURE 35) respectively. Into the multiplier 586 is also fed the quantity $p^2\theta$ from the output of the rate measuring device 394b to obtain the product $\overline{w_1^2w_2^2}p^2\theta$ and into the multiplier 587 is fed the quantity $p^4\theta$ from the output of the rate measuring device 394b to obtain the product $(\overline{w_1^2+w_2^2})p^4\theta$. These two products are algebraically added in a differential 588 to obtain the feed-back quantity $p^6\theta'$ according to Relationship 85c. This feed-back quantity $p^6\theta'$ is then employed to modify the setting of the carriage of the integrator 396 of FIGURE 36.

In all other respects, the construction and operation of the oscillating system of FIGURE 35 is similar to that of FIGURE 34.

FIGURES 37, 38, 38a and 39 show a modified form of oscillating system in which the rate measuring device and the oscillating prediction mechanism are combined to permit the rate measuring circuit to be employed during the rate measuring interval for determining the quantities $\theta$, $p\theta$, $p^2\theta$, $p^3\theta$, $p^4\theta$ and $p^5\theta$ as well as to permit part of the rate measuring circuit to be employed during the integrating period for determining the prediction quantity $\theta_t$. FIGURE 37 shows the general assembly of the oscillating system in block diagrammatic form; FIGURES 38 and 38a are adapted to be combined along the dot and dash break lines A, and when so combined conjointly show the oscillating system in greater detail, the solid lines indicating electric impulses, the dotted lines indicating mechanical displacements such as shaft rotations; and FIGURE 39 shows the oscillating prediction mechanism isolated from the remainder of the rate measuring part of the oscillating system, the solid lines indicating electric impulses, the dotted lines indicating mechanical displacements such as shaft rotations.

Referring to FIGURES 38 and 38a, the oscillating system comprises a combined rate measuring device and oscillating predicting mechanism 595 and an angular velocity function computer 409b similar to the angular velocity computer 409 of FIGURE 26. Like numbers indicate similar parts in the angular velocity function computer 409 of FIGURE 26 and in the angular velocity function computer 409b of FIGURE 38a.

The output quantities $w_1^2w_2^2$ and $w_1^2+w_2^2$ from the angular velocity function computer 409b (FIGURE 38a), before being delivered to the oscillating prediction mechanism of FIGURE 38 are smoothed to values $\overline{w_1^2w_2^2}$ and $\overline{w_1^2+w_2^2}$ respectively by means of the integrator type smoothing units 475b and 476b, similar to units 475 and 476 respectively of FIGURE 27.

It may be desirable that the quantities $w_1^2w_2^2$ and $w_1^2+w_2^2$ be locked in value during the integration prediction period, as in the mechanism of FIGURE 27. For that purpose, the arrangement of FIGURE 38a is similar to that of FIGURE 27, the input connection from the angular velocity function computer 409b to the differential of each follow-up unit 475b and 476b (FIGURE 38) having a clutch 477b (FIGURE 38a), which will slip when the driven element of the clutch is locked against rotation. For locking this driven element, there is provided a second clutch 478b, one element of which is connected to the driven element of the slip clutch 477b, the other element being secured to a fixed frame 479b. The clutches 478b may be solenoid controlled through an electronic switch 596 of the type shown in FIGURES 30 and 31 regulated and sequenced from a free running multivibrator 528b similar to the multivibrator 528 shown in FIGURES 29 and 32 and from a trigger circuit 546b similar to the trigger circuit 546 of FIGURES 29 and 32 and similarly controlled from a $T_p$ potentiometer 573b.

It may not be necessary for the quantities $w_1^2w_2^2$ and $w_1^2+w_2^2$ to be locked in position during the very short time required for the electrical integration and prediction period, since the change in these quantities during a time of the order of milliseconds would be entirely negligible.

The rate measuring device in FIGURE 38 is similar to that shown as 394a in FIGURE 25, similar numbers in the two figures, except for the letters a and b, corresponding to similar parts. This rate measuring device in FIGURE 38 comprises a comparison network 395b, integrating networks 396b, 397b, 398b, 399b, 400b and 401b and system stabilizing resistances or feed-back elements 402b, 403b, 404b, 405b and 406b.

In order to convert the rate measuring device into an oscillating prediction mechanism, the stabilizing resistances 403b, 404b, 405b and 406b are grounded at the proper time. For that purpose, the circuit of these resistances is connected to the output of the comparison network 395b by an electronic switch 597 and is connected to ground through an electronic switch 598, and the circuit of the integrating networks 396b and 397b is connected to the circuit of the integrating networks 398b, 399b, 400b and 401b by electronic switches 600 and 601 so that said integrating networks 396b and 397b may be isolated from said integrating networks 398b, 399b, 400b and 401b during the prediction integrating cycle. These electronic switches 597, 598 600 and 601 may be of the type shown in FIGURE 31, each with a single control lead, as indicated in FIGURE 38, regulated from the multivibrator 528b, which may be similar to the multivibrator 528 shown in FIGURE 32 but with the summing networks added as shown in dot and dash lines in FIGURE 32, to provide the multivibrator output with a proper bias, and therefore with two sets of output leads alternating in voltage at predetermined intervals to and from zero potential. These electronic switches 597, 598 600 and 601 may also be of the double control lead type shown in FIGURE 30, in which case the ground switch 598 may be dispensed with, and the grounding of the stabilizing resistances 403b, 404b, 405b and 406b, achieved through the electronic switch 597 grounding through the circuit of the multivibrator 528b, when the proper voltage phase is reached for such action.

When the stabilizing resistances 403b, 404b, 405b and 406b, are grounded for conversion of the rate measuring device into the oscillating prediction mechanism, the integrating networks 398b, 399b, 400b and 401b of the rate measuring device, with the initial rate values charged or set into their condensers, correspond to the integrating networks 531, 532 in the oscillating prediction mechanism of FIGURE 29, as shown in FIGURE 39.

The oscillating prediction mechanism in the system shown in FIGURE 38 comprises as in the oscillating prediction mechanism shown in FIGURE 29, a potentiometer 540b corresponding to the potentiometer 540 of FIGURE 29, for obtaining the product $\overline{w_1^2w_2^2}\,\theta_t$, a potentiometer 541b corresponding to the potentiometer 541 of FIGURE 29 for obtaining the product $\overline{(w_1^2+w_2^2)}p^2\theta_t$, an adding network 542b corresponding to the adding network 542 of FIGURE 29 for adding the two products to obtain the quantity $p^4\theta_t$ and an amplifier 543b corresponding to the amplifier 543 of FIGURE 29 for amplifying this quantity $p^4\theta_t$ before it is fed thru the electronic switch 601 to the first integrating network 398b of the oscillating prediction mechanism.

The circuits of the potentiometers 540b and 541b, of the adding network 542b and of the amplifier 543b may be cut-off or isolated from the integrating networks 396b, 397b, 398b, 399b, 400b and 401b of the rate measuring device during the rate measuring interval by the electronic switch 601 controlled from the multivibrator 528b.

The predicted value $\theta_p$, obtained by sampling $\theta_t$ at time $T_p$ during each successive integration of a set, is sampled, stored and smoothed by a device 483b similar to the device 483a of FIGURE 29 and comprising an electronic sampling switch 545b, similar to the sampling switch 545 of FIGURE 29, except that it is shown as the single control lead type shown in FIGURE 31. This sampling switch 545b is controlled by the trigger circuit 546b, as in the case of the mechanism of FIGURE 29.

Referring further to the system of FIGURES 38 and 38a, it is assumed the circuits in the system are connected up to measure the rates as derivatives of $\theta_1$ the present pitch angle. During this part of the cycle, the electronic switches 597 and 600 are closed and the electronic switches 598, 601 and 545b are open. The rate measuring device is therefore connected as shown in FIGURE 25. This condition lasts long enough for the angular velocity functions $w_1^2w_2^2$ and $w_1^2+w_2^2$ to be determined from $\theta$ and its first five derivatives by means of the angular velocity function computer 409b in the manner described in connection with the computer 409 of FIGURE 26.

The second part of the cycle is then initiated by isolating the section of the rate measuring device which constitutes part of the oscillating prediction mechanism and by connecting the potentiometers 540b and 541b, the adding network 542b and the amplifier 543b into the circuit of said oscillating prediction mechanism to complete said mechanism. This is accomplished by opening switches 597 and 600 and closing switches 598 and 601. At the same time, the electronic switch 596 is closed to energize the clutches 478b and lock the quantities $w_1^2w_2^2$ and $w_1^2+w_2^2$ to the frames 479b. Accordingly, no changes in these quantities can occur during the prediction time and the oscillating prediction mechanism will have the constant angular velocities $w_1$ and $w_2$ set therein. At the end of the time interval $T_p$, measured at a speeded rate $T_p'$, a pulse is triggered from the trigger circuit 546b to close the sampler switch 545b. This pulse is of sufficient duration to allow charging of the storage condenser in the storing, sampling and smoothing device 483b. At proper intervals, the pulse from the multivibrator 528b restores the circuits to their original rate measuring condition and the whole cycle of operation is repeated.

*Determination of the predicted deck height $H_p$ of the carrier deck at predicted time $T_p$*

Having determined the values $H_0$ (present deck height) by means of the heave measuring device 22 of FIGURE 10, and having determined the value of $T_p$ (predicted time of landing) from the prediction time computer 35 of FIGURE 8, the value of $H_p$ (predicted deck height at predicted time $T_p$ of landing) can be determined exactly as was the value $P_p$ (predicted pitch angle of the carrier at the predicted time $T_p$) by means of the devices shown in FIGURES 11 to 39, the Equations 18 to 91 discussed being equally applicable to the determination of the value $H_p$ through said devices. In the claims herein directed to the determination of deck height $H_p$, some of the Equations 18 to 91 have been employed, but it must be understood that in these claims, $P_p$ designates deck height instead of pitch angle.

*Determination of the error in plane's present elevation $W=E_c-E$*

Having determined the values $P_p$ (predicted pitch angle of the carrier at the predicted time $T_p$ of landing) and the value $H_p$ (predicted deck height at predicted time $T_p$), the next step is to determine the value $W=E_c-E$ (FIGURES 2 and 3) which is the error in plane's present elevation. From this value, the pilot can determined the correct elevational position he should have to make the proper approach at the required glide angle of $E_p$ with respect to the predicted position of the deck (FIGURE 2).

Having obtained $P_p$ and $H_p$ as described, these quantities are used in the elevational guidance of the approaching plane. Referring to the geometric elevation diagram of FIGURE 2, the angle $E_p$ is a predetermined quantity set into the mechanism of the guidance computer 610 (FIGURE 40) to be described, and might be preset at approximately six degrees, as for example for normal conditions, or at a larger value if the wind velocity over the deck was unusually high. To convert the angle $E_p$ to the angle $E_c$ representing the correct elevation of the plane above the present deck position, we have the relation $$\lambda = (E_c - P_0) - (E_p - P_p) \qquad (92)$$

where $\lambda$, the elevation parallax angle due to change in deck height from present position to predicted position, is given by $$R \sin \lambda = (H_p - H_0) \cos (E_p - P_p) \qquad (93)$$

R being the range of the plane corrected for parallax by reference to the touchdown point as the observation origin.

Having obtained the angle $E_c$ from Equation 92 and 93, we now compare $E_c$ with the present elevation angle E of the approaching plane. The difference $E_c = E$ then becomes the elevation guidance signal transmitted to the plane. Equation 92 is solved for $\lambda$ by the combined elevation guidance and warn-off device 610 of FIGURE 40, as will be more fully described.

On the elevation diagram of FIGURE 2, it will be noted that the sides of the angle $E_c - E$ intersect at a reference point at the distance $D_5$ above the "touchdown" point on a vertical line passing through the point, that is, the point where the plane can safely start to land on the carrier deck. This distance $D_5$ is sufficient to assure the location of the wheels of the plane above the "touchdown" point, when the plane is directly above this point and is set at a safe figure, as for example, fifteen feet above the deck.

It can be shown from the elevation diagram of FIGURE 2 that $$D_4 E - P_0 + P_p) - (H_p - H_0) = D_6 - D_5 \qquad (94)$$

where $D_6$=the fan-tail clearance, that is the distance between the predicted position of the fan-tail of the carrier deck at predicted time $T_p$ and the line to the present plane position from the reference point referred to above, and $D_4$ is the distance from the "touchdown" point to the fan-tail. In deriving the Relation 92, it was assumed that all angles were sufficiently small to use the approximation $\sin A = A$. This approximation is permissible, since the angle $E_p$ is taken as about six degrees.

If it is desired that the fan-tail distance $D_6$ be at least equal to the distance $D_5$, then the distance $D_6 - D_5$ will constitute excess clearance. If at any time the excess clearance should become zero or negative, this occurrence will operate a warn-off signal transmitted to the plane. This excess clearance is determined by the combined elevation guidance and warn-off device 610 of FIGURE 40.

*Elevation guidance and warn-off device for determining plane's present elevation error $W = E_c - E$ and for giving warning when excess clearance becomes zero or negative*

FIGURE 40 shows the combined elevation guidance and warn-off device 610, the full lines indicating mechanical displacements, as for example shaft rotations, the dotted lines indicating electric signals or impulses. In this device, the quantity $E_p$ (the glide approach angle of the plane with respect to the predicted deck position) is preset at a selected angle, as for example six degrees, and fed into a differential 611 through a hand wheel 612 or other suitable control member. At the same time, the quantity $P_p$ (predicted pitch angle) derived from any of the devices described and shown in FIGURES 11 to 39 is also fed into the differential 611, and the output $E_p - P_p$ of this differential is fed into a resolver 613. Also fed into this resolver 613 is the quantity $H_p - H_0$ obtained from a differential 614 having the input quantity $H_p$ (predicted deck height) obtained as described from any of the devices of FIGURES 11–39, and the input quantity $H_0$ (present deck height) obtained from the heave measuring device 21 of FIGURE 10. There is obtained thereby from the resolver 613, the quantity $(H_p - H_0) \cos (E_p - P_p)$ which is fed into a differential 615. Also fed into the differential 615 is the quantity $R \sin \lambda$ obtained from a resolver 616 into which is fed the quantity R from the parallax corrector 23 (FIGURE 6), the other quantity fed into said resolver being the quantity $\lambda$ obtained in a manner to be described. The difference between the outputs of the resolvers 613 and 616 obtained from the output of the differential 615, when non-zero is made to operate follow-up electrical contacts 617 controlling a servo-motor 618, driving the quantity $\lambda$ as a feed-back. When this difference is zero, the contacts 617 are open and the servo-motor 618 will stop, having rotated its output shaft an amount corresponding to the correct value of $\lambda$, as represented by Equation 92.

The quantities $\lambda$ and $E_p - P_p$ are fed into a differential 620 and the output $E_c - P_0$ of this differential (see Equation 92) is fed into a differential 621 in conjunction with the quantity $E - P_0$ obtained from a differential 622, having as inputs the quantity $P_0$ (present pitch angle) obtained from the stable element 21 (FIGURE 3) and the quantity E (elevation angle of the plane corrected for parallax by reference to the touchdown point as the observation origin) obtained from the parallax correction 23 (FIGURE 6). The output from the differential 621 is $E_c - E$, the error in plane's present elevation. This quantity is sent as an electric signal to the plane and impressed upon the zero reader on the plane, so that the pilot can be guided thereby in changing his elevational position until $E_c - E = 0$, and in making thereby the proper approach with respect to the predicted position of the deck.

To determine the values for a warn-off signal, the quantities $P_p$ and $E - P_0$ are fed into a differential 623, and the resulting output $E - P_0 + P_p$ is fed into a multiplier 624 in conjunction with the quantity $D_4$ set into the mechanism by means of a hand crank 625 or other suitable hand controlled shaft rotating device. The resulting product $D_4(E - P_0 + P_p)$ in conjunction with the quantity $H_p - H_0$ are fed into a differential 626 to obtain the quantity $D_4(E - P_0 + P_p) - (H_p - H_0)$ which from the Relation 92 is equal to the excess clearance. This quantity as long as it is positive sends no signal to the plane. When this excess clearance quantity becomes zero or negative, a warn-off signal is sent to the plane by an automatic device of any suitable type controlled by this excess clearance quantity. The plane under these conditions can move out of line if too close to the deck to correct its position or can adjust its elevational position to permit safe landing.

What is claimed is:

1. A system for guiding a plane in its landing approach to the touchdown point of a floating deck, comprising means for determining quantities corresponding respectively to the plane's true air speed, the wind speed relative to the deck, the wind direction relative to the deck and the position of the plane with respect to the deck, equation mechanizing means responsive to said quantities for producing a quantity corresponding to the predicted time interval required for the plane to reach the touchdown point assuming that the plane followed a selected course, equation mechanizing means responsive to said predicted time quantity for producing a quantity corresponding to the pitch angle of the deck at the end of said interval, and means responsive to said predicted pitch angle quantity for producing signals by which the plane may be guided in its approach towards the touchdown point.

2. A system for guiding a plane in its landing approach to the touchdown point of a floating deck, comprising means for tracking the plane to determine its bearing angle with respect to a predetermined axis of the deck, its range and its elevation, means for correcting said tracking data for parallax by reference to the touchdown point as the observation origin, means for determining quantities corresponding respectively to the plane's true air speed, the wind speed relative to the deck and the wind direction relative to the deck, equation mechanizing means responsive to said quantities and to the corrected data obtained from said correcting means for predicting the time interval required for the plane to reach the touchdown point, assuming that the plane followed a selected course in its approach to the touchdown point, equation mechanizing means responsive to said predicted time interval for predicting the pitch angle and the height of the deck at the end of said predicted time interval, and means for producing signals for the plane in response to said predicted pitch angle and height of the deck by which the plane may be guided in its approach towards the touchdown point.

3. A system for guiding a plane in its landing approach to the touchdown point of a floating deck, comprising means for tracking the plane to determine its bearing angle with respect to a predetermined axis of the deck and its range, means for determining quantities corresponding respectively to the plane's true air speed, the wind speed relative to the deck and the wind direction relative to the deck, equation mechanizing means responsive to the data determined by said tracking means and to said quantities for predicting the time interval required for the plane to reach the touchdown point assuming that the plane follows a selected non-linear course in its approach to the touchdown point, and equation mechanizing means responsive to said bearing angle and to said predicted time interval for producing for transmittal to the plane a signal corresponding to the actual rate of turn of the plane compared with the correct rate of turn it would have if the plane was approaching the deck along said selected course.

4. A system for guiding a plane in its landing approach to the touchdown point of a floating deck, comprising means for tracking the plane to determine its bearing angle with respect to a predetermined axis of the deck and its range, means for determining quantities corresponding respectively to the plane's true air speed, the wind speed relative to the deck and the wind direction relative to the deck, equation mechanizing means responsive to the data determined by said tracking means and to said quantities for predicting the time interval required for the plane to reach the touchdown point assuming that the plane follows a selected non-linear course in its approach to the touchdown point, and equation mechanizing means responsive to said bearing angle and to said predicted time interval for producing for transmittal to the plane, a warn-off signal when the correct rate of turn the plane would have if it followed said course is greater than a miximum turning rate of which the plane is capable.

5. A system for guiding a plane in its landing approach to the touchdown point of a floating deck, comprising equation mechanizing means for predicting the time interval required for the plane to reach the touchdown point assuming that the plane followed a selected course in its approach towards the touchdown point, equation mechanizing means for predicting from said predicted time interval, the pitch angle of the deck at the end of said predicted time interval, and means operable in response to the predicted pitch angle obtained from said last-mentioned equation mechanizing means for producing signals by which the plane may be guided in its approach towards the touchdown point.

6. A system for guiding a plane in its landing approach to the touchdown point of a floating deck, comprising equation mechanizing means for predicting the time interval required for the plane to reach the touchdown point assuming that the plane followed a selected course in its approach towards the touchdown point, equation mechanizing means for predicting from said predicted time interval, the pitch angle and height of the deck at the end of said predicted time interval, and means operable in response to said predicted pitch angle and said predicted height for producing signals by which the plane may be guided in its approach towards the touchdown point.

7. A system for guiding a plane in its landing approach to the touchdown point of a floating deck, comprising means for determining the elevational angle E of the plane with respect to the present position of the deck, means for determining the present position of the deck, means for predicting the time interval required for the plane to reach the touchdown point assuming that the plane folowed a predetermined angle of approach and a predetermined course in its approach to the touchdown point, equation mechanizing means responsive to said predicted time interval for predicting the position of the deck at the end of said predicted time interval, and means responsive to said present and predicted deck positions, to said predicted time interval and to said assumed angle of approach for producing a signal for transmittal to the plane equivalent to $E_c-E$, in which $E_c$ is the correct elevational angle the plane should have with respect to the present deck position for safe landing and E is the actual elevational angle the plane has with respect to the present deck position.

8. A system for guiding a plane in its landing approach to the touchdown point of a floating deck, comprising means for determining the elevational angle E of the plane with respect to the present position of the deck, means for determining the present position of the deck, equation mechanizing means for predicting the time interval required for the plane to reach the touchdown point assuming that it followed a selected angle of approach and a selected course in its approach to the touchdown point, and means responsive to said predicted time interval and to said selected angle of approach for producing a warn-off signal indicating the possibility of interference with the tail of the deck as the plane passes over the tail in its approach to the touchdown point.

9. A system for guiding a plane in its approach to a floating deck for landing near a touchdown point at a distance $D_4$ from the fantail of the deck, comprising means for determining the elevational angle E of the plane with respect to the present position of the deck, means for determining the present pitch angle $P_0$ and present height $H_0$ of the deck, means for predicting the time interval required for the plane to reach the touchdown point, assuming that the plane followed a predetermined course in its approach to the touchdown point, means for predicting the pitch angle $P_p$ and the height $H_p$ of the deck at the end of said predicted time interval, means for producing the quantity $$D_4(E-P_0+P_p)-(H_p-H_0)$$

and means for producing a warn-off signal for the plane, when said quantity is zero or is negative.

10. A system for guiding a plane in its landing approach to the touchdown point of a floating deck for landing, comprising means for determining the time interval required for the plane to reach the touchdown point assuming that the plane followed a selected non-linear course towards the touchdown point, means for predicting the position of the deck at the end of said predicted time interval, means for producing for transmittal to the plane a signal indicating the actual rate of turn of the plane compared with the correct rate of turn it would have if the plane was approaching the deck along said course, means for producing for transmittal to the plane a warn-off signal when the correct rate of turn for the plane is greater than a maximum turning rate of which the plane is capable, means for producing for transmittal to the plane a signal indicating the error in the plane's present elevation if it is to land safely at the end of said predicted time interval, and means for producing for transmittal to the plane a warn-off signal indicating that the plane will be too close to the end of the deck when the plane crosses the deck end in landing, if it continues its present course.

11. A device for guiding a plane along a selected non-linear course in its approach towards a predetermined position, comprising means for continuously determining the difference in the actual rate of turn of the plane and the correct rate of turn of the plane when approaching said predetermined position along said course, and means for translating said difference into a guide signal for continuous transmittal to the plane.

12. A device for guiding a plane along a selected course in its approach towards a predetermined position, comprising means for determining the actual bearing angle of the plane with respect to a reference line, and means responsive to said bearing as an input quantity for producing a guide signal for transmittal to the plane corresponding to the difference between the rate of change in said bearing angle and the correct rate of change of the bearing angle of the plane when approaching said position along said course.

13. A device for guiding a plane along a selected course in its approach towards a predetermined position, comprising means for continuously determining the actual bearing angle of the plane with respect to a reference line, and the predicted time required for the plane to reach said position when following said course, and means responsive to said bearing angle and to said predicted time as input quantities for continuously producing a guide signal for transmittal to the plane, corresponding to the difference between the rate of change in said bearing angle and the correct rate of change of the bearing angle of the plane when approaching said position along said course.

14. A device for guiding a plane along a selected course in its approach towards a predetermined position, comprising means for determining the predicted time it would take for the plane to reach said predetermined position if it followed said course, means for determining the bearing angle A of the plane with respect to a reference line, and means responsive to the determined data as input quantities for creating for transmittal to the plane a guide signal corresponding to the value $$\frac{d}{dt}A - \frac{d}{dt}A_c$$

wherein $A_c$ is the correct bearing angle of the plane with respect to said reference line, when said plane is on said course.

15. A device for guiding a plane along a selected course in its approach towards a predetermined position, comprising means for determining the bearing angle A of the plane with respect to a reference line, means for determining the time $T_p$ required by the plane to each said predetermined position from its present position, when following said course, and means for mechanizing with said determined data as input quantities the equation $$\frac{d}{dt}A_c T_p = A$$

wherein $A_c$ is the correct bearing angle of the plane with respect to said reference line when following said course, to obtain a guide signal corresponding to the quantity $$\frac{d}{dt}A - \frac{d}{dt}A_c$$

for transmittal to the plane.

16. A device for guiding a plane along a selected course in its approach towards a predetermined position, comprising means for determining the predicted time $T_p$ required for the plane to reach said predetermined position when following said course, means for determining the actual bearing angle A of the plane with respect to a reference line, means for multiplying the quantity $T_p$ and a feedback quantity $$\frac{d}{dt}A_c$$

in which $A_c$ is the correct bearing angle of the plane with respect to the reference line when following said course, means for mechanizing the equation $$T_p \frac{d}{dt}A_c = A$$

to obtain the quantity $$\frac{d}{dt}A_c$$

means for integrating said quantity $$\frac{d}{dt}A_c$$

to obtain the quantity $A_c$, means for subtracting the quantities $A_c$ and A to obtain the quantity $A - A_c$, and means for differentiating the quantity $A - A_c$ to obtain a guide signal for transmission to the plane.

17. A device for guiding a plane along a selected non-linear course in its approach towards a predetermined position, comprising means for determining the correct rate of turn for the plane when approaching said position along said selected course, and means for creating a warning signal for transmittal to said plane when the correct rate of turn exceeds a predetermined value.

18. A device for guiding a plane along a selected non-linear course in its approach towards a predetermined position, comprising means for determining the actual bearing angle A of the plane with respect to a reference line when approaching said predetermined position, means for determining the time $T_p$ required for the plane to reach said predetermined position when following said course, means responsive to said bearing angle and said time as input quantities for determining the correct rate of turn $$\frac{d}{dt}A_c$$

for the plane when approaching said predetermined position along said course according to the relation $$T_p \frac{d}{dt}A_c = A$$

and means for creating a warning signal for transmittal to said plane when the correct rate of turn exceeds a predetermined value.

19. A device for guiding a plane along a selected course in its approach towards a predetermined position, comprising means for determining the actual bearing angle of the plane with respect to a reference line when approaching said predetermined position, means for determining the time required for the plane to reach said predetermined position when following said course, means responsive to said bearing angle and said time as input quantities for obtaining the correct rate of turn for the plane when following said course, means for integrating said correct rate of turn to obtain the correct bearing angle of the plane with respect to said reference point when approaching said predetermined position along said selected course, means for differentiating the difference in the two bearing angles to obtain a guide signal for transmittal to the plane, and means for sending a warning signal to said plane when said correct rate of turn exceeds a predetermined amount.

20. A device for computing data for the guidance of a plane in its approach towards the touchdown point of a floating deck, comprising means for determining a computed quantity corresponding to the predicted time required for the plane when following a selected course to reach said touchdown point, means for determining another input a quantity corresponding to the present pitch angle of the deck, and means responsive to said quantities as inputs for determining the pitch angle of said deck at said predicted time.

21. A device for computing data for the guidance of a plane in its approach towards the touchdown point of a floating deck, comprising means for determining a computed quantity corresponding to the predicted time required for the plane when following a selected course to reach said touchdown point, means for determining another quantity corresponding to the present height of the deck, and means responsive to said quantities as inputs for determining the height of the deck at said predicted time.

22. A device for predicting the time $T_p$ required for an airplane to fly from its present position to a predetermined position with respect to a surface, assuming that the projection of the course of the plane on a horizontal plane which passes through said predetermined position and which carries the projection of the airplane's present position on said plane is an arc of a circle, comprising means for determining the quantity $B_{wra}$ symbolizing the wind direction relative to said surface, means for determining the bearing angle A of the airplane with respect to the tangent to said arc passing through said predetermined position, means responsive to the quantities $B_{wra}$ and A as inputs for mechanizing the equation $$\psi = B_{wra} - 2A$$

to obtain the quantity $\psi$ representing the angle between the vector $S_{wr}$ representing the wind speed relative to said surface and the normal to the vector S representing the speed of the airplane relative to said surface, means for determining the quantity $S_{wr}$, means for determining the quantity $S_a$ respresenting the airplane's true airspeed, means responsive to the quantities $\psi$, $S_{wr}$ and $S_a$ as inputs for mechanizing the equation $$S_a \sin \phi - S_{wr} \cos \psi = 0$$

to obtain the quantity $\phi$ representing the angle between the vectors S and $S_a$, means responsive to the quantities $S_a$, $\phi$, $S_{wr}$ and $\psi$ as inputs for mechanizing the equation $$S_a \cos \phi - S_{wr} \sin \psi = S$$

to obtain the quantity S, means for determining the quantity R representing the range of the airplane between said positions, and means reponsive to the quantities R, A, and S as inputs for mechanizing the equation $$T_p = \frac{RA}{S \sin A}$$

to determine the quantity $T_p$.

References Cited in the file of this patent
UNITED STATES PATENTS

| | | |
|---|---|---|
| 2,404,011 | White | July 16, 1946 |
| 2,408,081 | Lovell | Sept. 24, 1946 |
| 2,425,317 | Harris | Aug. 12, 1947 |
| 2,426,584 | Baker | Sept. 2, 1947 |
| 2,539,616 | Gehman | Jan. 30, 1951 |
| 2,539,901 | Ewing | Jan. 30, 1951 |
| 2,541,277 | Omberg | Feb. 13, 1951 |
| 2,555,101 | Alvarez | May 29, 1951 |
| 2,557,085 | Fisk | June 19, 1951 |
| 2,563,902 | Yost | Aug. 14, 1951 |
| 2,603,746 | Burkhart | July 15, 1952 |
| 2,613,071 | Hansel | Oct. 7, 1952 |
| 2,622,193 | Clayden | Dec. 16, 1952 |
| 2,643,869 | Clark | June 30, 1953 |
| 2,646,924 | Schuck | July 28, 1953 |
| 2,657,377 | Gray | Oct. 27, 1953 |
| 2,657,378 | Gray | Oct. 27, 1953 |